United States Patent
Kavounas et al.

(10) Patent No.: US 11,778,058 B1
(45) Date of Patent: *Oct. 3, 2023

(54) ONLINE SERVICE PLATFORM (OSP) GENERATING AND TRANSMITTING ON BEHALF OF PRIMARY ENTITY TO THIRD PARTY PROPOSAL OF THE PRIMARY ENTITY WHILE MAINTAINING THE PRIMARY ENTITY ANONYMOUS

(71) Applicant: Avalara, Inc., Seattle, WA (US)

(72) Inventors: Gregory T. Kavounas, Bellevue, WA (US); Herve Marzio, Seattle, WA (US); Tyler Flora, Houston, TX (US); Winona Dotson, Rocklin, CA (US); William Rau, Mebane, NC (US)

(73) Assignee: Avalara, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/870,548

(22) Filed: Jul. 21, 2022

Related U.S. Application Data

(63) Continuation of application No. 17/365,339, filed on Jul. 1, 2021, now Pat. No. 11,431,812.

(60) Provisional application No. 63/047,860, filed on Jul. 2, 2020.

(51) Int. Cl.
*H04L 67/53* (2022.01)
*H04L 67/562* (2022.01)

(52) U.S. Cl.
CPC ............ *H04L 67/53* (2022.05); *H04L 67/562* (2022.05)

(58) Field of Classification Search
None
See application file for complete search history.

(56) References Cited

U.S. PATENT DOCUMENTS

| 7,783,536 B2 | 8/2010 | William et al. |
| 7,933,803 B1 | 4/2011 | Nadler et al. |
| 8,620,578 B1 | 12/2013 | Brown et al. |

(Continued)

FOREIGN PATENT DOCUMENTS

| WO | 2013/163625 | 10/2013 |

OTHER PUBLICATIONS

International Search Report and Written Opinion, dated Oct. 22, 2021, for International Application No. PCT/US2021/040168, 15 pages.

*Primary Examiner* — Ranodhi Serrao
(74) *Attorney, Agent, or Firm* — Jeremiah J. Bauanch; VLP Law Group LLP

(57) ABSTRACT

An online software platform (OSP) produces, by applying resource digital rules to previous relationship instance data of a primary entity data associated with one or more secondary entities of the domain, a domain resource regarding the domain. The OSP may then determine, by applying an alignment digital rule of the domain to the relationship instance data and the domain resource, whether or not an alignment condition of the domain is met, which indicates whether resources for relationship instances of the primary entity should have been remitted to the domain. If the alignment condition is not met, then the OSP may assemble proposal components, and communicate some of them to the domain on behalf of the primary entity to remit the resources, without initially communicating those proposal components that would reveal the identity of the primary entity.

37 Claims, 37 Drawing Sheets

(56) References Cited

U.S. PATENT DOCUMENTS

| | | | |
|---|---|---|---|
| 8,725,407 B2 | 5/2014 | Hurley et al. | |
| 8,849,862 B2 | 9/2014 | Visscher | |
| 9,613,190 B2 | 4/2017 | Ford et al. | |
| 9,760,915 B2 | 9/2017 | Pavlou et al. | |
| 9,762,553 B2 | 9/2017 | Ford et al. | |
| 10,033,702 B2 | 7/2018 | Ford et al. | |
| 10,332,216 B2 | 6/2019 | Barsade et al. | |
| 10,445,818 B1 | 10/2019 | Chowdhary | |
| 10,572,684 B2 | 2/2020 | LaFever et al. | |
| 10,764,254 B2* | 9/2020 | Ford | H04W 12/02 |
| 10,769,611 B2 | 9/2020 | McNeel et al. | |
| 10,789,590 B2* | 9/2020 | Tran | H04L 9/3236 |
| 10,872,100 B1 | 12/2020 | Shefferman et al. | |
| 11,176,620 B1 | 11/2021 | Lubczynski et al. | |
| 11,514,448 B1* | 11/2022 | Liberman | G06Q 20/3829 |
| 2002/0138765 A1 | 9/2002 | Fishman et al. | |
| 2007/0136158 A1 | 6/2007 | Rawlings et al. | |
| 2007/0136159 A1 | 6/2007 | Rawlings et al. | |
| 2009/0006467 A1 | 1/2009 | Visscher | |
| 2009/0187500 A1 | 7/2009 | Wilson et al. | |
| 2012/0011518 A1 | 1/2012 | Duan et al. | |
| 2013/0013471 A1 | 1/2013 | Fishman | |
| 2014/0172656 A1 | 6/2014 | Shaw | |
| 2014/0337189 A1 | 11/2014 | Barsade et al. | |
| 2014/0351105 A1 | 11/2014 | Hamm | |
| 2015/0019591 A1 | 1/2015 | Visscher | |
| 2015/0163206 A1* | 6/2015 | McCarthy | H04L 63/104 726/4 |
| 2015/0310188 A1 | 10/2015 | Ford et al. | |
| 2016/0042466 A1 | 2/2016 | Herndon et al. | |
| 2016/0140668 A1 | 5/2016 | Maguire et al. | |
| 2017/0041296 A1 | 2/2017 | Ford et al. | |
| 2017/0142076 A1* | 5/2017 | Ford | H04L 63/061 |
| 2018/0096175 A1* | 4/2018 | Schmeling | G06F 1/3206 |
| 2018/0150647 A1* | 5/2018 | Naqvi | H04L 9/321 |
| 2018/0246479 A1* | 8/2018 | Judd | G06Q 50/06 |
| 2018/0367506 A1* | 12/2018 | Ford | H04L 63/0421 |
| 2019/0114609 A1 | 4/2019 | Burton et al. | |
| 2019/0222560 A1 | 7/2019 | Ford et al. | |
| 2019/0332807 A1 | 10/2019 | LaFever et al. | |
| 2020/0387896 A1* | 12/2020 | Tran | H04L 9/3247 |
| 2021/0158456 A1 | 5/2021 | Morgan et al. | |

* cited by examiner

200

```
202 RECEIVE RELATIONSHIP INSTANCE DATA OF A PRIMARY ENTITY
            │
            ▼
204 IDENTIFY DOMAIN OF AT LEAST ONE OF THE SECONDARY
          ENTITIES FROM THE RECEIVED DATA
            │
            ▼
206 ACCESS PREVIOUSLY STORED RESOURCE DIGITAL RULES FOR
                    THE DOMAIN
            │
            ▼
208 PRODUCE A DOMAIN RESOURCE REGARDING THE DOMAIN
            │
            ▼
210 ACCESS PREVIOUSLY STORED ALIGNMENT DIGITAL RULES FOR
                    THE DOMAIN
            │
            ▼
212 DETERMINE WHETHER OR NOT AN ALIGNMENT CONDITION OF
                  THE DOMAIN IS MET
            │
            ▼
214 ASSEMBLE AT LEAST SOME OF PREVIOUSLY STORED PROPOSAL
                    COMPONENTS
            │
            ▼
216 ACT TO ENABLE THE SPECIFIC PROPOSAL COMPONENTS NOT
        INCLUDING AN IDENTITY OF THE PRIMARY ENTITY
            │
            ▼
218 CAUSE A PROPOSAL NOTIFICATION TO BE TRANSMITTED A
          COMPUTER OF AN AGENCY OF THE DOMAIN
            │
            ▼
220 RECEIVE INPUT FROM A COMPUTER OF THE AGENCY IN
    RESPONSE TO THE TRANSMITTED PROPOSAL NOTIFICATION
            │
            ▼
222 EFFECTUATE ONE OR MORE FOLLOW-UP NOTIFICATIONS
```

| ID | DC | D1 | BX | ... |
| ID | DC | D3 | BX | ... |
| ID | DC | D2 | BX | ... |
| ID | DC | D1 | BX | ... |
| ID | DC | D3 | BX | ... |
| ID | DC | D1 | BX | ... |
| ID | DC | D4 | BX | ... |
| ID | DC | D3 | BX | ... |
| ID | DC | D2 | BX | ... |
| ID | DC | D2 | BX | ... |
| ID | DC | D1 | BX | ... |
| ID | DC | D4 | BX | ... |
| ID | DC | D3 | BX | ... |
| ID | DC | D2 | BX | ... |
| ID | DC | D1 | BX | ... |
| ID | DB | D1 | BX | ... |
| ID | DB | D2 | BX | ... |

Dear customer:

Thank you for uploading your data. Upon reviewing it, we determined there is lack of alignment with [DOMAIN].

We propose you approach the [AGENCY_OF_DOMAIN] anonymously with a proposal to correct the lack of alignment.

We can help:

We can gather proposal components that the [AGENCY_OF_DOMAIN] may agree to, or has even agreed to in the past in similar circumstances with others.

Even better, we can present these components as a proposal, anonymously on your behalf. If they agree, then we will bring you in contact with each other. Either way, we will let you know.

Click here if you want us to proceed for you.

Click here if you want to correct the lack of alignment on your own, or not at all.

1191 SCREEN

[ ] Yes   [ ] No   If this proposed VDA is approved, I will file all past returns due within 90 days, pay all past taxes due within 90 days, pay all interest and penalties, and going forward I will be compliant, BUT WILL NOT BE PROSECUTED FOR ANY PRIOR LACK OF COMPLIANCE FOR THIS TAX TYPE.

[ ] Yes   [ ] No   I recognize that if I misrepresent any of the above, or anything in the subsequent disclosures I make pursuant to the VDA, then the VDA that I am applying for will not protect me in the future.

View the full VDA as it appears now (We auto-filled your Company name and address. Before signing, the tax authority will also be able to view this agreement, but not your Company information or your signature block until after they sign it as well.)

2091 SCREEN

Your company's signature portion – please e-sign this document: :

COMPANY NAME: (autofill)

Name of Company Officer signing: _____

Title of Company Officer signing: _____

Date of Company Officer signing: _____

Click to send the VDA Request anonymously to [STATE_NAME]

2091 SCREEN

VOLUNTARY DISCLOSURE AGREEMENT

VDA Serial Number by Department: TBA
VDA Serial Number by Taxpayer representative: [OSP_SERIAL_NO.]

This Voluntary Disclosure Agreement (this "Agreement") is made and entered into as of the Effective Date by and between [TAX_AUTH_NAME], (hereinafter "Department", "Party"), acting on behalf of [TAX_JDX_NAME], (hereinafter "Jurisdiction"), and [TAX_PAYER_NAME], a corporation organized under the laws of the State of [TAX_PAYER_STATE] and having a place of business at [TAX_PAYER_ADDRESS] (hereinafter "Taxpayer", "Party"), (hereinafter collectively "Parties"), and the affiliated companies of the Parties related to the subject matter of this Agreement.

BACKGROUND

A. Department is an agency authorized to collect taxes on behalf of Jurisdiction.

B. Taxpayer is an entity that believes it has past tax obligations of Tax Type towards Jurisdiction.

C. In the interest of minimizing both audit, administrative, and litigation expenses and expediting the resolution of the liabilities owed to Department, Taxpayer and Department have, as evidenced by this Agreement, entered into settlement of this dispute. The Department and Taxpayer desire to enter into this Agreement.

AGREEMENT

Now therefore, in consideration of the promises and covenants contained herein, the undersigned Parties agree as follows:

1. DEFINITIONS:

1.1 "Effective Date" shall mean the date on which the last of the Parties to sign this Agreement actually signs this Agreement, whether electronically or not.

1.2 "Tax type" shall means sales and use tax.

1.3 "Period" shall mean a period as specified in section 2 of this Agreement.

2. REPRESENTATIONS & WARRANTIES:

2.1 The Department represents that it is the exclusive taxing authority for the Jurisdiction for taxes of the Tax Type.

FIGURE 24A

2.2  Taxpayer represents that it is voluntarily coming forward wishing to become fully tax compliant with respect to its tax obligations of the Tax Type in the Jurisdiction.

2.3  Taxpayer represents that it is not already registered with the Department, and that is has not ever paid any taxes to Department for taxes of the Tax Type.

2.4  Taxpayer represents that it has never been contacted by Department or its representatives in regard to the Period for the Tax Type.

2.5  Taxpayer represents that it is not currently under any audit, collection, or criminal investigation by Department.

2.6  Taxpayer represents that, based on prior Taxpayer activities, Taxpayer owes to file returns for the Tax Type with the Department for a Period starting on [PAST_STARTING_DATE] until the Effective Date.

2.7  Taxpayer represents that, based on prior Taxpayer activities, Taxpayer owes to pay back taxes of the Tax Type to the Department for the Period. Taxpayer represents that these back taxes are in the amount of no more than [2_TIMES_PAST_DUE_AMOUNT].

2.8  Taxpayer represents that it understands that, if any of these representations is proven untrue, then this Agreement will be null and void, and will not protect Taxpayer from legal repercussions by Jurisdiction.

2.9  Each Party represents and warrants that it has the full right and power to enter in this Agreement.

3.  TERMS.

3.1  Within sixty (60) days of the Effective Date, Taxpayer will file with Department all returns due for the Tax Type, covering the Period, and remit to Department all back taxes owed for the Period and for the Tax Type, as evidenced by the returns of the previous subsection.

3.2  Within thirty (30) days of receiving statements of interest due on the filings of the previous subsection, the Taxpayer will remit all such interest due.

3.3  Immediately after the Effective Date, Taxpayer will begin timely filing returns and remitting taxes in the Jurisdiction as required by Jurisdiction.

2400C UI 3.4 Immediately after the Effective Date, Taxpayer will begin, and/or continue to, comply with any other requirement imposed by tax laws, such as the obligation to keep and maintain accurate books and records. This includes submitting tax data in formats requested by Department.

3.5 With regard to adjustments to tax resulting from a change or a correction in federal taxable income that are finally determined by the Internal Revenue Service, nothing in this Agreement shall limit (1) any credit or refund due Taxpayer based upon the change or correction, or (2) the issuance of an assessment notice by Department based upon the change or correction.

3.6 In consideration of the terms, and of the truthfulness – including lack of material omissions – of the representations made above, and of the truthfulness – including lack of material omissions – of returns filed then, for taxes relating to the Period and to Tax Type: Department will not assess any penalties or fees on Taxpayer; Department will not pursue criminal tax prosecution of Taxpayer; Department will not use the information that Taxpayer disclosed in the context of this Agreement as evidence in any proceeding against Taxpayer; and Department will not reveal the contents of Taxpayer's disclosures made under this Agreement to any other agency, including law enforcement agencies. This release applies only to the Period, Tax Type, and disclosures made under this Agreement. The Department may take action against Taxpayer for any tax liability that has not been disclosed.

3.7 The Parties agree that this Agreement is strictly confidential between Department, Taxpayer, and Taxpayer's authorized representatives, and shall not be made known to any other party except taxing jurisdictions with an information exchange agreement.

4. MISCELLANEOUS TERMS:

4.1 All matters arising out of or relating to this Agreement and all of the transactions it contemplates, including, without limitation, its interpretation, construction, performance, and enforcement shall be governed by the laws of Jurisdiction without giving effect to its conflicts of law principles, and the Parties consent to personal jurisdiction of the courts of Jurisdiction, agree to accept service of process by mail, and waive any jurisdictional or venue defenses otherwise available.

4.2 Any notice or payment required to be given pursuant to this Agreement shall be in writing and mailed by certified or registered mail, return receipt requested, or delivered by a national overnight express service. Notices sent by email are deemed received if acknowledged by reply email generated by a human. Either Party may change the address to which notice or payment is to be sent by written notice to the other Party pursuant to the provisions of this paragraph.

FIGURE 24C

If to Department:  
[TAX_AUTH_NAME]  
[TAX_AUTH_ADDRESS]  
Attn: TBA

If to Taxpayer:  
[TAX_PAYER_NAME]  
[TAX_PAYER_ADDRESS]  
Attn: [TAX_PAYER_CONTACT_NAME]

Notices are deemed given on (a) the date of receipt if delivered personally or by express courier or (b) if delivery is refused, the date of refusal. Notice given in any other manner will be deemed to have been given only if, and when received at the address of the person to be notified.

4.3 Any amendments to this Agreement shall be in writing and signed or otherwise acknowledged by all Parties in order to be valid.

4.4 This Agreement sets forth the entire understanding and agreement between the Parties regarding the subject matter of this Agreement, and supersedes and merges any and all prior agreements, proposals or statements between the Parties.

5. ACCEPTANCE:

IN WITNESS WHEREOF, the Parties have caused this instrument to be executed as of the Effective Date.

DEPARTMENT                   TAXPAYER

Date: _____  
\_x_____

Name: _____  
Title: _____

Date: _____  
\_x_____

Name: _____  
Title: _____

2400D UI

GENERAL SAMPLE - MODIFY FOR INDIVIDUAL USE

FIGURE 24D

ONLINE SERVICE PLATFORM (OSP) GENERATING AND TRANSMITTING ON BEHALF OF PRIMARY ENTITY TO THIRD PARTY PROPOSAL OF THE PRIMARY ENTITY WHILE MAINTAINING THE PRIMARY ENTITY ANONYMOUS

TECHNICAL FIELD

The technical field relates to computers in networks, and particularly to networked automated systems for generating and transmitting on behalf of primary entity to a third party a proposal of the primary entity while maintaining the primary entity anonymous.

BRIEF SUMMARY

The present description gives instances of computer systems, devices and storage media that may store programs and methods.

An online service platform (OSP) can be configured to perform one or more predefined services. Such services may include producing respective resources for relationship instances between primary entities and secondary entities by applying digital rules to respective datasets from primary entities that represent the relationship instances. Such resources may be independently remitted to a domain associated with the relationship instances, and/or with the primary entities, and/or with the secondary entities. However, some primary entities may have previous relationship instances, for which resources have not been produced or which have not been remitted to one or more associated domains. In fact, some primary entities may not even be aware that resources for such relationship instances should have been remitted to a particular domain. These processes take extra computing resources to calculate and remit the resources properly for such previous relationship instances, and burden the technological systems of the primary entity and domain to go back and correctly produce and remit the resources to the domain when such omissions go unrecognized for long periods of time.

Thus, to solve the above technical problems, embodiments of the present disclosure include functionality that enables the OSP to produce, by applying resource digital rules to applicable previous relationship instance data of the primary entity data associated with one or more secondary entities of the domain, a domain resource associated with the domain. The OSP may then determine, by applying an alignment digital rule of the domain to the applicable relationship instance data and the domain resource, whether or not an alignment condition of the domain is met, which indicates whether resources for such relationship instances should have been remitted to a particular domain. If the alignment condition is not met, then the OSP may assemble proposal components, and communicate some of them to the domain on behalf of the primary entity to remit the resources without initially communicating those proposal components that would reveal the identity of the primary entity. If the domain accepts the proposal, then the identity of the primary entity may be revealed to the domain. This saves computing resources used to determine, calculate and remit the resources for such previous relationship instances. In particular, the system and methods disclosed herein avoid burdening the technological systems of the primary entity and domain from having to go back and produce and remit the resources to the domain by preventing such omissions going unrecognized and uncorrected for long periods of time. Thus, the automated systems and methods described herein for an OSP generating and transmitting to a third party, on behalf of a primary entity, a proposal of the primary entity while maintaining the anonymity of the primary entity, improve the functioning of computer or other hardware, such as by reducing the processing, storage, and/or data transmission resources needed to perform various tasks, thereby enabling the tasks to be performed by less capable, capacious, and/or expensive hardware devices, enabling the tasks to be performed with less latency and/or preserving more of the conserved resources for use in performing other tasks or additional instances of the same task.

As shown above and in more detail throughout the present disclosure, the present disclosure provides technical improvements in computer networks and to existing computerized systems that facilitate estimation of resources.

These and other features and advantages of the claimed invention will become more readily apparent in view of the embodiments described and illustrated in this specification, namely in this written specification and the associated drawings.

BRIEF DESCRIPTION OF THE SEVERAL VIEWS OF THE DRAWINGS

The components in the drawings are not necessarily drawn to scale relative to each other. Like reference numerals designate corresponding parts throughout the several views.

FIG. 2 is a flowchart for illustrating a sample method for transmitting a proposal notification to a computer of an agency of a domain, according to embodiments of the present disclosure, which is an improvement in automated computerized systems.

FIG. 5 illustrates an example of a plurality of extracted datasets associated with a plurality of domains, according to embodiments of the present disclosure, which is an improvement in automated computerized systems.

FIG. 11A is a sample view of a User Interface (UI) in which a notification is presented to a primary entity regarding a determined lack of alignment with a domain's alignment rules and options for proceeding, according to embodiments of the present disclosure, which is an improvement in automated computerized systems.

FIG. 20C is a sample view of a User Interface (UI) in which a further portion of a questionnaire started in FIG. 20B and an option to view a generated VDA is presented to a seller, according to embodiments of the present disclosure, which is an improvement in automated computerized systems.

FIG. 20D is a sample view of a User Interface (UI) in which options to sign and send the VDA of FIG. 20C is presented to a seller, according to embodiments of the present disclosure, which is an improvement in automated computerized systems.

FIGS. 24A-24D show a sample VDA that could be reached between a seller and a tax authority, according to embodiments of the present disclosure, which is an improvement in automated computerized systems.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, that embodiments of the inventive subject matter may be practiced without these specific details. In general, well-known structures and methods associated with underlying technology have not been shown or described in detail to avoid unnecessarily obscuring descriptions of the preferred embodiments.

Figure 1:
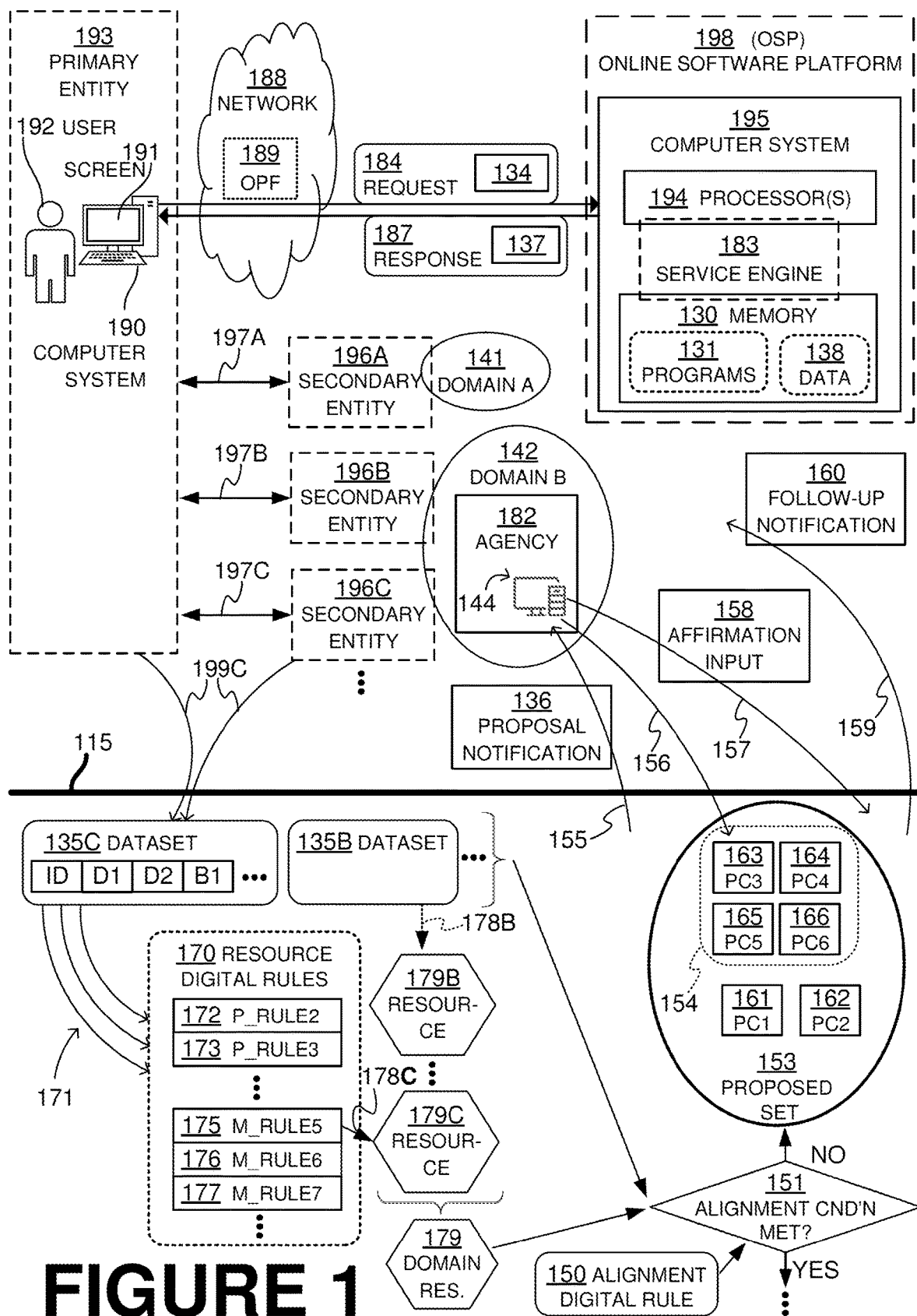
FIG. 1 is a diagram showing sample aspects of embodiments of the present disclosure involving an OSP generating and transmitting to a third party, on behalf of a primary entity, a proposal notification of the primary entity while maintaining the anonymity of the primary entity, according to embodiments of the present disclosure, which is an improvement in automated computerized systems.

FIG. 1 is a diagram showing sample aspects of embodiments of the present disclosure involving an online software platform (OSP) 198 generating and transmitting to a third party, on behalf of a primary entity, a proposal notification on behalf of the primary entity while maintaining the anonymity of the primary entity, according to embodiments of the present disclosure, which is an improvement in automated computerized systems.

A thick line 115 separates this diagram, although not completely or rigorously, into a top portion and a bottom portion. Above the line 115 the emphasis is mostly on entities, components, their relationships, and their interactions, while below the line 115 emphasis is mostly on processing of data that takes place often within one or more of the components above the line 115.

Above the line 115 a sample computer system 195 of OSP 198; a network 188; a primary entity 193; a primary entity computer system 190 of the primary entity 193; example secondary entities 196A, 196B and 196C, and respective relationship instances 197A, 197B and 197C with primary entity 193; a domain A 141; a domain B 142; an agency 182 of the domain B 142, and an example computer system 144 of the agency 182, according to embodiments are shown. The computer system 195 has one or more processors 194 and a memory 130. The memory 130 stores programs 131 and data 138. The one or more processors 194 and the memory 130 of the computer system 195 thus implement a service engine 183. Additional implementation details for the computer system 195 are given later in this document.

The computer system 195 can be located in "the cloud." In fact, the computer system 195 may optionally be implemented as part of the OSP 198. The OSP 198 can be configured to perform one or more predefined services, for example, via operations of the service engine 183. Such services can be, but are not limited to: receiving relationship instance data of a primary entity 193, such as represented by dataset 135B and dataset 135C, and so on, relating to previous relationship instances (relationship instances 197A, 197B and 197C in the present example) of the primary entity 193 with secondary entities (secondary entity 196A, 196B and 196C in the present example); identifying a domain (domain B 142 in the present example) of at least one of the secondary entities (secondary entity 196B and secondary entity 196C in the present example) from the received data; accessing previously stored resource digital rules 170 for the domain (domain B 142 in the present example); producing, by the service engine 183 applying the resource digital rules 170 to the relationship instance data (dataset 135CB and 135C in the present example) of one or more of the secondary entities (secondary entity 196B and secondary entity 196C in the present example) of the domain, a domain resource 179 regarding the domain. As also described below, the domain resource 179 may be formed from individual resources 179B, 179C, . . . e.g. by addition. In turn, the individual resources 179B, 179C, . . . may be produced from respective datasets 135B, 135C, . . . . The individual resources 179B, 179C may be produced by the service engine 183, and may be communicated individually to the primary entity 193, and/or their sum (domain resource 179) may be communicated individually to the primary entity 193. The services of the OSP 198 may then further include: accessing previously stored alignment digital rule 150 for the domain; determining (e.g., at decision point 151), by the service engine 183 applying the alignment digital rule 150 to at least one of the relationship instance data (dataset 135B and 135C in the present example) and the domain resource 179, whether or not an alignment condition of the domain is met; assembling at least some of previously stored proposal components (e.g., the proposed set 153 of proposal components PC1 161, PC2 162, PC3 163, PC4 164, PC5 165, PC6 16,); acting to enable specific ones of the assembled proposal components (e.g., indicated specific proposal components 154) to be viewable by a third party, the specific proposal components 154 not including an identity of the primary entity (such as PC1 161); causing a proposal notification 136 to be transmitted to a computer system 144 of an agency 182 of the domain (domain B 142 in the present example), the proposal notification 136 indicating how the enabled specific proposal components 154 may be viewed by a user of a computer system 144 of the agency 182, the proposal notification 136 further requesting an affirmation input 158 from a computer system 144 of the agency 182; then receiving an affirmation input 158 via an electronic communication 157 from a computer system 144 of the agency 182 in response to the proposal notification 136; and then effectuating one or more follow-up notifications 160 via an electronic communication 159, and so on, including what is described in this document. Such services can be provided as a Software as a Service (SaaS).

A user 192 may be standalone. The user 192 may use a computer system 190 that has a screen 191, on which User Interfaces (UIs) may be shown. Additional sample implementation details for the computer system 190 are given later in this document. In embodiments, the user 192 and the computer system 190 are considered part of a primary entity, such as primary entity 193, which can be referred to also merely as an entity or a client of OSP 198. In such instances, the user 192 can be an agent of the entity 193, and even within a physical site of the entity 193, although that is not necessary. In embodiments, the computer system 190 or other device of the user 192 or the entity 193 are primary entity devices for the computer system 195.

The computer system 190 and/or computer system 144 may access the computer system 195 via a communication network 188, such as the internet. In particular, the entities and associated systems of FIG. 1 may communicate via physical and logical channels of the communication network 188. For example, information may be communicated as data using the Internet Protocol (IP) suite over a packet-switched network such as the Internet or other packet-switched network, which may be included as part of the communication network 188. The communication network 188 may include many different types of computer networks and communication media including those utilized by various different physical and logical channels of communication, now known or later developed. Non-limiting media and communication channel examples include one or more, or any operable combination of: fiber optic systems, satellite systems, cable systems, microwave systems, asynchronous transfer mode ("ATM") systems, frame relay systems, digital subscriber line ("DSL") systems, radio frequency ("RF") systems, telephone systems, cellular systems, other wireless systems, and the Internet. In various embodiments the communication network 188 can be or include any type of network, such as a local area network (LAN), a metropolitan area network (MAN), a wide area network (WAN), or the internet.

Downloading or uploading may be permitted from one of the computer systems of FIG. 1 to the other, and so on. Such accessing can be performed, for instance, with manually uploading files, like spreadsheet files, etc. Such accessing can also be performed automatically as shown in the example of FIG. 1. The computer systems of FIG. 1 may exchange requests and responses with each other. Such can be implemented with a number of architectures.

In one such architecture, a device remote to the service engine 183, such as computer system 190 and/or computer system 144, may have a certain application (not shown) and a connector (not shown) that is a plugin that sits on top of that certain application. The connector may be able to fetch from the remote device the details required for the service desired from the OSP 198, form an object or payload 134, and then send or push a request 184 that carries the payload 134 to the service engine 183 via a service call. The service engine 183 may receive the request 184 with the payload 134. The request 184 may also include particular option selections regarding the one or more predefined services that the OSP 198 can be configured to perform.

The service engine 183 may form a payload 137 that is, for example, an aspect of the domain resource 179, whether or not an alignment condition of a domain is met by the domain resource 179 and/or a proposal notification 136 or aspects thereof, and then push, send, or otherwise cause to be transmitted a response 187 that carries the payload 137 to the connector. The connector reads the response 187 and forwards the payload 137 to the certain application. Thus, the response 187 may be, or may include, for example, the domain resource 179, whether or not an alignment condition of a domain is met by the domain resource 179 and/or a proposal notification 136 or aspects thereof.

In some embodiments, the OSP 198 may generate and deliver a software development kit (SDK) (not shown) including libraries, documentation, code samples, processes, and guides that the primary entity 193 and/or agency 182 can use and integrate with the connector and other applications of the computer system 190 to implement functionality described herein. The SDK may be a collection of software development tools in one package installable by the primary entity computer system 190. The SDK may facilitate the creation of applications by having a compiler, debugger and a software framework. The SDK may include libraries, documentation, code samples, processes, and guides that the primary entity 193 and/or agency 182 can use and integrate with the connector and other applications of the computer system 190 and/or computer system 144 to implement the functionality described herein. In various embodiments, the connector may have been built by the primary entity 193, the agency 182, the OSP 198 or another entity. The primary entity 193 and/or agency 182 may use the SDK for controlling the developing and adjusting, from the primary entity-side or agency-side, operations of the connector.

In an alternative such architecture, a device remote to the service engine 183, such as computer system 190 or computer system 144, may have a particular application (not shown). In addition, the computer system 195 may implement a REST (Representational State Transfer) API (Application Programming Interface) (not shown). REST or RESTful API design is designed to take advantage of existing protocols. While REST can be used over nearly any protocol, it usually takes advantage of HTTP (Hyper Text Transfer Protocol) when used for Web APIs. This alternative architecture enables the primary entity 193 and/or agency 182 to directly consume a REST API from their particular application, without using a connector. The particular application of the remote device may be able to fetch internally from the remote device the details required for the service desired from the OSP 198, and thus send or push the request 184 to the REST API. In turn, the REST API talks in background to the service engine 183. Again, the service engine 183 determines the requested resource 179B, 179C, . . . and sends an aspect of it back to the REST API. In turn, the REST API sends the response 187 that has the payload 137 to the particular application.

Moreover, in some embodiments, data from the computer system 190, computer system 144 and/or the computer system 195 may be stored in an Online Processing Facility (OPF) 189 that can run software applications, perform operations, and so on. In such embodiments, requests and responses may be exchanged with the OPF 189, downloading or uploading may involve the OPF 189, and so on. In such embodiments, the computer system 190, computer system 144 and any devices of the OPF 189 can be considered to be remote devices, at least from the perspective of the computer system 195.

In some instances, the user 192 or the primary entity 193 may have instances of relationships with secondary entities. Only three such secondary entities 196A, 196B and 196C are shown (which may also be referred to herein collectively as secondary entity 196). Examples of such instances of relationships are represented by relationship instance 197A representing a relationship instance with secondary entity 196A, relationship instance 197B representing a relationship instance with secondary entity 196B, and relationship instance 197C representing a relationship instance with secondary entity 196C. However, additional or fewer secondary entities may be present in various other embodiments. For example, the primary entity 193 may have a relationship instance 197B with the secondary entity 196B via an intermediary entity (not shown).

In some instances, the user 192 and the primary entity 193 may have data about one or more secondary entities, for example, via relationship instances of the user 192 or primary entity 193 with the secondary entities 196A, 196B and 196C. The primary entity 193, an intermediary entity and/or the secondary entities 196A, 196B and 196C may be referred to as simply entities. One of these entities may have one or more attributes. Such an attribute of such an entity may be any one of its name, type of entity, a physical or geographical location such as an address, a contact information element, an affiliation, a characterization of another entity, a characterization by another entity, an association or relationship with another entity (general or specific instances), an asset of the entity, a declaration by or on behalf of the entity, and so on. One of these attributes, or an attribute of a relationship instance, may associate one of these entities with one of the domains.

In embodiments, the computer system 190 generates one or more datasets. Sample generated datasets 135C and 135B are shown. The datasets 135C and 135B have values that can be numerical, alphanumeric, Boolean, and so on, as needed for what the values characterize. For example, an identity value ID may indicate an identity of the dataset 135C, so as to differentiate it from other such datasets. At least one of the values of the dataset 135C may characterize an attribute of a certain one of the entities 193 and 196C. (It should be noted that the arrows 199C describe a correspondence, but not the journey of data in becoming the dataset 135C.) For instance, a value D1 may be the name of the certain entity, a value D2 may be for relevant data of the entity, and so on. Plus, an optional value B1 may be a numerical base value for an aspect of the dataset, and so on. The aspect of the dataset may be the aspect of the value that characterizes the attribute, an aspect of the reason that the dataset was created in the first place, an indication of an identity or other characteristic of the primary entity 193 and/or the secondary entity 196C, etc. The dataset 135C may further have additional such values, as indicated by the horizontal dot-dot-dot to the right of the dataset 135C. In some embodiments, the dataset 135C has values that characterize attributes of each of the primary entity 193 and the secondary entity 196C, but that is not required.

In embodiments, stored resource digital rules 170 and an alignment digital rule 150 may be accessed by the computer system 195. These digital rules 170 and 150 are digital in that they are implemented for use by software. For example, these digital rules 170 and 150 may be implemented within programs 131 and data 138. The data portion of these digital rules 170 and 150 may alternately be implemented in memories in other places, which can be accessed via the network 188. These digital rules 170 and 150 may be accessed responsive to receiving a dataset, such as the dataset 135C and/or generation of resources, such as the resources 179B, 179C, . . . , and or domain resource 179, and so on.

The resource digital rules 170 may include main rules, which can thus be accessed by the computer system 195. In this example, three sample digital main rules are shown explicitly, namely M_RULE5 175, M_RULE6 176, and M_RULE7 177. In this example, the digital rules 170 also include digital precedence rules P_RULE2 172 and P_RULE3 173, which can thus be further accessed by the computer system 195. The digital resource rules 170 may include additional rules and types of rules, as suggested by the vertical dot-dot-dots.

In embodiments, a certain one of the digital main rules may be identified from among the accessed stored rules by the computer system 195. In particular, values of the dataset 135C can be tested, according to arrows 171, against logical conditions of the digital main rules, as described later in this document. In an example embodiment, one or more alignment digital rules, including alignment digital rule 150 may be stored that indicate requirements for the domain resource 179 to meet an alignment condition of a particular domain (e.g., domain B 142 in the present example). For example, such requirements may be based on one or more attributes of the relationship instances 197B and 197C and/or the domain resource 179. Thus, values of the domain resource 179 can also be tested against logical conditions of the alignment digital rule 150. Also, alignment digital rule 150 may be identified from other stored alignment digital rules based on the identified domain (domain B 142 in the present example) and/or one or more attributes of the identified domain. In this example, the certain main rule M_RULE5 175 is identified, which is indicated also by the beginning of an arrow 178C that is described in more detail later in this document. Identifying may be performed in a number of ways depending on how the digital main rules are implemented. An example is now described.

Figure 3:
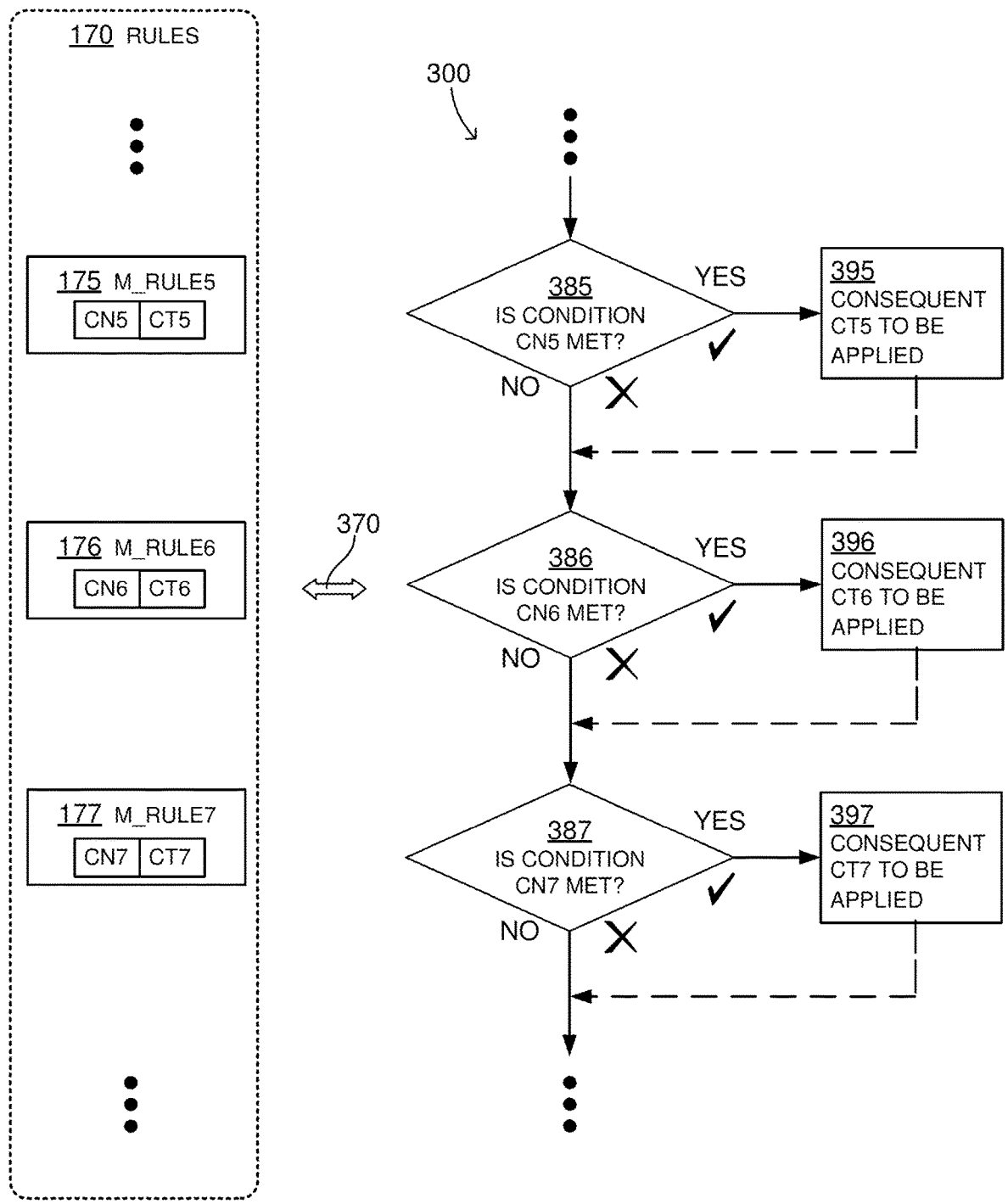
FIG. 3 is a diagram that repeats some of the resource digital main rules of FIG. 1 in more detail, and juxtaposes them with a flowchart portion for a sample method of how it may be recognized that conditions of a certain resource digital main rule can be met for its consequent to be applied, all according to embodiments of the present disclosure, which is an improvement in automated computerized systems.

Referring now to FIG. 3, some of the digital main rules of digital rules 170 are repeated from FIG. 1 in more detail. In addition, according to an arrow 370, these digital main rules are shown juxtaposed with a flowchart portion 300. In embodiments, some of the digital main rules can be expressed in the form of a logical "if-then" statement, such as: "if P then Q". In such statements, the "if" part, represented by the "P", is called the condition, and the "then" part, represented by the "Q", is called the consequent. Therefore, at least some of the digital main rules include respective conditions and respective consequents associated with the respective conditions, respectively. And, for a certain digital main rule, if its certain condition P is met, then its certain consequent Q is what happens or becomes applied. Of course, one or more of the digital rules 170 may have more than one conditions P that both must be met, and so on. And some of these digital rules 170 may be searched for, and grouped, according first to one of the conditions, and then the other. In this example, the digital main rules M_RULE5 175, M_RULE6 176, and M_RULE7 177 of FIG. 1, include respective conditions CN5, CN6, CN7, and respective consequents CT5, CT6, CT7 associated with the respective conditions CN5, CN6, CN7, respectively.

In embodiments, therefore, identifying is performed by recognizing, by the computer system 195, that a certain condition of a certain one of the accessed digital main rules is met by one or more of the values of the dataset. An example of the operations of recognizing that a condition is met and thus identifying an applicable rule is shown by flowchart portion 300 of FIG. 3. According to successive decision diamonds 385, 386, 387, it is determined whether or not conditions CN5, CN6, CN7 are met by at least one of the values of the dataset, respectively. If the answer is NO, then execution may proceed to the next diamond. If the answer is YES then, according to operations 395, 396, 397, it is further determined that the respective consequents CT5, CT6, CT7 are to be applied, and then execution may proceed to the next diamond in the flowchart portion. A consequent that is to be applied could be, for example, flagged as TRUE.

From what was mentioned in connection with FIG. 1, the certain M_RULE5 175 was thus identified. With reference to FIG. 3, the identification may have happened at operation 385 of the flowchart portion 300, at which time it was recognized that condition CN5 was met by a value of the dataset 135C. This made: the condition CN5 be the certain condition, the digital main rule M_RULE5 175 be the certain digital main rule, and the consequent CT5 be the certain consequent of the certain digital main rule M_RULE5 175. Thus, the certain consequent CT5 is associated with the certain condition CN5, since both are included by the certain digital main rule M_RULE5 175.

Therefore, according to operation 395, consequent CT5 is what happens or becomes applied, as described below.

A number of examples are possible for how to recognize that a certain condition of a certain digital rule is met by at least one of the values of the dataset. For instance, the certain condition could define a boundary of a region that is within a space. The region could be geometric, and even be within a larger space and may include political boundaries. For example, the region could be geographic, within the space of a city, a county, a state, a country, a continent or the earth. The boundary of the region could be defined in terms of numbers according to a coordinate system within the space. In the example of geography, the boundary could be defined in terms of groups of longitude and latitude coordinates. In such embodiments, the certain condition could be met responsive to the characterized attribute of the dataset being in the space and within the boundary of the region instead of outside the boundary. For instance, the attribute could be a location of the entity, and the one or more values of the dataset 135C that characterize the location could be one or more numbers or an address, or longitude and latitude. The condition can be met depending on how the one or more values compare with the boundary. For example, the comparison may reveal that the location is in the region instead of outside the region. The comparison can be made by rendering the characterized attribute in units comparable to those of the boundary. For example, the characterized attribute could be an address that is rendered into longitude and latitude coordinates, and so on.

In an example embodiment, the certain condition could define a threshold that needs to be crossed for an activity to be started or stopped. In such embodiments, the certain condition could be met responsive to a value based on one or more of the characterized attributes of one or more datasets, either individually or in aggregate, crossing the threshold.

The above embodiments are only examples, and not limiting. For instance, the example of FIG. 3 suggests that there is a one-to-one correspondence of the conditions with the associated consequents, but that is not necessary. In fact, a single consequent may be associated with two or more conditions, and two or more consequents may be associated with a single condition. Of course, all such can be shown as additional rules, with groups of them having the same condition or consequent.

For another instance, once it is determined that a consequent is to be applied, execution may even exit the flowchart portion 300. Or, as shown, it may be determined that more than one of the digital main rules is to be applied. In particular, operation 385 may give the answer YES such that consequent CT5 is to be applied, and operation 386 may also give the answer YES such that consequent CT6 is to be applied.

Where more than one of the digital main rules are found that could be applied, there are additional possibilities. For instance, the computer system 195 of FIG. 1 may further access at least one stored digital precedence rule, such as P_RULE2 172 or P_RULE3 173. Accordingly, the certain digital main rule may be thus identified also from the digital precedence rule. In particular, the digital precedence rule may decide which one or more of the digital main rules is to be applied. To continue the previous example, if a value of the dataset 135C that characterizes a location, and the location is within multiple overlapping regions according to multiple rules, the digital precedence rule may decide that all of them are to be applied, or less than all of them are to be applied. Equivalent embodiments are also possible, where digital precedence rules are applied first to limit the iterative search of the flowchart portion 300, so as to test the applicability of fewer than all the rules according to arrows 171.

In embodiments, a resource may be produced for the dataset 135C, and/or other activities may be performed, by the computer system 195 applying the certain consequent of the certain digital main rule. The resource can be a computational result, a document, an item of value, a representation of an item of value, etc., made, created or prepared for the user 192, the primary entity 193 and/or the secondary entity 196, etc., on the basis of the attribute. As such, in some embodiments, the resource is produced by a determination and/or a computation. In the example of FIG. 1, a resource 179C is produced for the dataset 135C, by the computer system 195 applying the certain M_RULE5 175, and in particular its certain consequent CT5, as indicated by the arrow 178. In fact, sometimes applying the consequent is more simply stated as "applying the rule".

The resources 179B, 179C, . . . may be produced in a number of ways. For example, for resource 179C, the certain consequent can be applied to one of the values of the dataset 135C. For instance, one of the values of the dataset 135C can be a numerical base value, e.g. B2, that encodes an aspect of the dataset 135C, as mentioned above. In such cases, applying the certain consequent may include performing a mathematical operation on the base value B2. For example, applying the certain consequent may include multiplying the base value B2 with a number indicated by the certain consequent. Such a number can be, for example, a percentage, e.g., 1.5%, 3%, 5%, and so on. Such a number can be indicated directly by the certain rule, or be stored in a place indicated by the certain rule, and so on.

As mentioned above, in some embodiments two or more digital main rules may be applied. For instance, referring again to FIG. 1, the computer system 195 may recognize that an additional condition of an additional one of the accessed digital main rules 170 is met by at least one of the values of the dataset 135C, either alone or in combination with other values of other datasets. In this example there would be no digital precedence rules, or the available digital precedence rules would not preclude both the certain digital main rule and the additional digital main rule from being applied concurrently. Such an additional digital main rule would have an additional consequent.

In such embodiments, the resource 179C may be produced by the computer system applying the certain consequent and the additional consequent. For instance, where the base value B1 is used, applying the certain consequent may include multiplying the base value B1 with a first number indicated by the certain consequent, so as to compute a first product. In addition, applying the additional consequent may include multiplying the base value B1 with a second number indicated by the additional consequent, so as to compute a second product. And, the resource may be produced by summing the first product and the second product.

In embodiments, a notification can be caused to be transmitted, e.g., via the network 188, by the computer system. The notification can be about an aspect of the resource, that a condition is met or no longer met, a warning that a condition is or about to be met or no longer be met, that an activity has been or is about to be automatically started or stopped based on a condition being met or no longer being met, and/or include an option to enable or select a setting regarding a service provided by the OSP 198. In the example of FIG. 1, a proposal notification 136 can be caused to be transmitted by the computer system 195, for example, indicating how the enabled specific proposal components 154 may be viewed by a user of a computer 144 of the agency 182. The proposal notification 136 may further request an affirmation input 158 from a computer of the agency 182. For example, the agency may be requested via a UI to affirm by clicking or checking individual boxes in the UI associated with the proposal notification 136.

In the present example, the service engine 183 computes resources (resource 179C and resource 179B in the present example) for each of the respective datasets (dataset 135C and dataset 135B of the identified domain (Domain B 142 in the present example). The service engine 183 then computes a domain resource 179 based on those resources. For example, the domain resource 179 may be a sum of the base values of dataset 135C and dataset 135B and/or indicate the total number of datasets associated with the identified domain (domain B 142 in the present example). The service engine 183 then identifies and applies the alignment digital rule 150 to the relationship instance data comprising dataset 135C and dataset 135B and/or to the domain resource 179 to determine whether or not an alignment condition of domain B 142 is met. If the alignment condition is not met, then the service engine 183 may assemble a set 153 of proposal components from previously stored proposal components. The service engine 183 may act to enable specific ones (subset 154) of the set 153 of assembled proposal components (e.g., specific proposal components PC3 163, PC4 164, PC5 165 and PC6 166) to be viewable (per arrow 156) by the agency 182 of domain B 142. However, proposal components PC1 161 and PC2 162 are not selected to be viewable by the agency 182 of domain B 142 at least temporarily, because they are intended to remain obscured, hidden, and not revealed to the third party until the proposal is accepted. These proposal components PC1 161 and PC2 162 may be the name and signature of the primary entity.

In the present example, the service engine 183 then transmits a proposal notification 136 to the computer 144 of an agency 182 of the domain B 142. The proposal notification 136 may indicate how the enabled specific proposal components 154 may be viewed by a user of a computer 144 of the agency 182 and further requests an affirmation input 158 from a computer 144 of the agency 182. The proposal notification 136 can be about an aspect of a proposal including the specific proposal components 154. In particular, the proposal notification 136 may inform about the aspect of the specific proposal components 154, namely that they have been determined, where they can be found, what they are, and so on. The proposal notification 136 notification may be formatted and transmitted in a manner such that the recipient of the proposal notification 136 understands what it is being provided.

The service engine 183 may then receive the affirmation input 158 via an electronic communication 157 from a computer system 144 of the agency 182 in response to the proposal notification 136. The service engine 183 may then effectuate one or more follow-up notifications 160 to the primary entity 193 and the agency 182 via an electronic communication 159. An affirmation input may not always be received. Sometimes, instead of the affirmation input 158, a negation input may be received, as described further below.

The proposal notification 136, which is also know more simply as notification 136, can be transmitted to one of an output device and another device. The output device may be the screen of a local user or a remote user. The notification 136 may thus cause a desired image, message, or other such notification to appear on the screen, such as within a Graphical User Interface (GUI) and so on. The other device can be the remote device, from which the dataset 135C was received, as in the example of FIG. 1. In particular, the computer system 195 may cause the notification 136 to be communicated by being encoded as a payload 137, which is carried by a response 187. The response 187 may be transmitted via the network 188 responsive to the received request 184. The response 187 may be transmitted to the computer system 190, or to OPF 189, and so on. As such, the other device can be the computer system 144, computer system 190, or the OPF 189, or the screen 191 of the user 192, and so on. In this example, the single payload 137 encodes the entire notification 136, but that is not required. Similarly with what is written above about encoding datasets in payloads, the notification 136 instead may be provided via two or more payloads, or in other cases the notification 136 and at least one other notification may be included in the same single payload.

In an example embodiment, there may be a plurality of relationship instances between the primary entity 193 and one or more secondary entities, such as secondary entity 196C. In some embodiments, such relationship instances are between the primary entity 193 and one or more secondary entities, such as secondary entity 196C, via one or more intermediary entities (not shown). Each relationship instance may be associated with one or more respective domains of a plurality of domains. In various embodiments, a domain may be a region defined by a boundary as discussed above or may be an entity representing or otherwise associated with the region. For example, the region could be geographic, within the space of a city, a county, a state, a country, a continent or the earth.

For example, in one embodiment, primary entity 193 may have a relationship instance 197C with secondary entity 196C and that particular relationship instance 197C may be associated with one or more domains (e.g., domain B 142). The association of the relationship instance 197C with the one or more domains may be based on a variety of characteristics including, but not limited to: a relationship of one or more of the primary entity and secondary entity with the particular domain; a location of one or more of the primary entity and secondary entity within or associated with the particular domain; a region or location associated with one or more of the primary entity and secondary entity being within or associated with the particular domain; a previous relationship of one or more of the primary entity and secondary entity with the particular domain; a location of items associated with one or more of the primary entity and secondary entity within the particular domain; a number of relationships of one or more of the primary entity and secondary entity with the particular domain; a transfer of items associated with one or more of the primary entity and secondary entity to or from an entity within or associated with the particular domain; a transfer of data associated with one or more of the primary entity and secondary entity to or from an entity within or associated the particular domain, etc. The existence or identification of the relationship instance 197C and/or one or more characteristics of the relationship instance 197C may be defined or represented by values of dataset 135C.

In some embodiments, for each relationship instance of the plurality of relationship instances represented by dataset 135C, the OSP 198 electronically identifies a rate to calculate an amount of resource due to one or more respective domains associated with the relationship instance based on particular attributes of the dataset 135C and the one or more respective domains. For example, the primary entity 193 may send request 184 to the computer system 195 of OSP 198 for services that include producing resources based on the dataset 135C. The request 184 may include the existence or identification of the relationship instance 197C and/or one or more characteristics of the relationship instance 197C as part of payload 134. The service engine 183 may then apply digital rules 170 to the relationship instance 197 and/or one or more characteristics of the relationship instance 197C to identify or otherwise determine the rate to calculate an amount of resource due to one or more respective domains associated with the relationship instance. In the present example, the service engine 183 has calculated resource 179 due to domain B 142.

For example, digital precedence rule P_RULE2 172 may decide that rule M_RULE5 175 is to be applied when a particular condition is met. Digital precedence rule P_RULE2 172 may include a condition that indicates if a particular relationship instance is associated with a particular domain and/or a particular threshold has been crossed due to or otherwise regarding one or more attributes of the relationship instance, either alone or in combination with attributes of other relationship instances, then rule M_RULE5 175 is to be applied. The service engine 183 may determine that the condition is met due to one or more values of dataset 135C indicating the particular relationship instance and that the particular relationship instance is associated with the particular domain and/or a particular threshold has been crossed due to or otherwise regarding one or more attributes of the relationship instance, either alone or in combination with attributes of other relationship instances. Thus, as a consequent of precedence rule P_RULE2 172, the service engine 183 applies rule M_RULE5 175. Rule M_RULE5 175 may include a condition CN5 that indicates if a relationship instance is associated with that particular domain, then, as consequent CT5, a particular rate is to be used to calculate an amount of resource due to that particular domain.

Referring again to FIG. 3, at decision diamond 385 it may be determined that the condition CN5 is met (i.e., that a particular attribute of the dataset is associated with a particular domain) and thus, the particular rate is used to calculate an amount of resource due to that particular domain. Thus, by applying digital rules 170, the service engine 183 identifies the rate to calculate an amount of resource due to one or more respective domains associated with the relationship instance based on one or more attributes of the dataset 135C, and also calculates an amount of resources due to at least one respective domain associated with the relationship instance based on the identified rate. In some embodiments, this calculated amount of resources due may be included by the service engine 183 as part of the resulting produced resource 179C and/or proposal notification 136. The service engine 183 may then form a payload 137 that is an aspect of the resource 179C, and then push, send, or otherwise cause to be transmitted a response 187 that carries the payload 137 to a device remote to the service engine 183, such as computer system 190, computer system 144, a device of secondary entity 196C or another secondary entity. Resource digital rules 170 may include multiple different digital rules for each type of relationship instance and different domains. In various embodiments, the proposal notification 136 may comprise the response 187, or the response 187 may be included in the notification 136.

In various embodiments, the processes of determining which digital rules 170 apply to the dataset 135C and how to apply them as described with reference to FIG. 3 may also be used by the OSP 198 to determine which, if any, of alignment digital rules (e.g., alignment digital rule 150) apply to the dataset 135C, produced resources, such as resource 179C, and domain resource 179, and how to apply them.

FIG. 2 is a flowchart for illustrating a sample method 200 for transmitting a proposal notification to a computer of an agency of a domain, according to embodiments of the present disclosure, which is an improvement in automated computerized systems.

Although, in the present example, the operations and methods described and shown in various flowcharts and diagrams are described as being performed by the OSP 198, in various embodiments, one or more of the operations and methods described with reference to the methods described and shown in various flowcharts and diagrams, or otherwise described herein, may be performed by the primary entity computer system 190 of primary entity 193 and/or the computer system 144 of agency 182.

At 202 the OSP 198 receives relationship instance data of a primary entity relating to previous relationship instances of the primary entity with secondary entities.

At 204 the OSP 198 identifies a domain of at least one of the secondary entities from the received data.

At 206 the OSP 198 accesses previously stored resource digital rules for the domain.

At 208, the OSP 198, produces by the computer system applying the resource digital rules to the relationship instance data of one or more of the secondary entities of the domain, a domain resource regarding the domain.

At 210, the OSP 198 accesses a previously stored alignment digital rule for the domain.

At 212, the OSP 198 determines by a computer system applying the alignment digital rule to at least one of the relationship instance data and the domain resource, whether or not an alignment condition of the domain is met. In some embodiments, the relationship instance data includes datasets for the domain, include respective base values, and the alignment condition is not met if any of: the datasets are more than a threshold number and a sum of the respective base values exceeds a threshold number. In some embodiments, the relationship instance data includes at least one date of at least one of the relationship instances and a due date is determinable form the alignment digital rule and the included date. In such instances, the alignment condition is not met if a report has not been filed with an agency of the domain on behalf of the primary entity by the due date about an aspect of the relationship instances. Also, in such instances, the alignment condition may not be met if the datasets are more than a threshold number and/or a sum of the respective base values of the datasets exceeds a threshold number.

At 214, the OSP 198 may assemble at least some of previously stored proposal components. The assembled proposal components may be part of a proposed set and the proposed set may be for a proposal regarding the primary entity meeting the alignment condition at least in part. The OSP 198 may derive a relevant number from the relationship instance data or the domain resource and the proposed set may include the relevant number. At least one of the proposal components of the proposed set may be assembled by looking up a look-up table listing proposal components for domains that include the domain. In some embodiments, the proposed set includes the identity of the primary entity. Also, in some embodiments, the OSP 198 may access a previously stored correction digital rule for the domain. In such instances, a certain proposal component may thus be assembled by applying the correction digital rule.

At 216, the OSP 198 acts to enable specific ones of the assembled proposal components to be viewable by a third party, the specific proposal components not including an identity of the primary entity. The specific proposal components may further include a promise that the identity of the primary entity will be revealed responsive to the affirmation input being received.

At 218, the OSP 198 causes a proposal notification to be transmitted to a computer of an agency of the domain. The proposal notification may indicate how the enabled specific proposal components may be viewed by a user of a computer of the agency, and may request an affirmation input from a computer of the agency. The acting to enable may include preparing a proposal webpage with the specific proposal components, and the proposal notification then provides a link to the proposal webpage. The acting to enable may include preparing a proposal webpage with the specific proposal components and an indication of a non-shown portion of an identity of the primary entity, and the proposal notification then provides a link to the proposal webpage. The acting to enable may include preparing a proposal document with the specific proposal components, and the proposal notification then provides a link that leads to opening the proposal document. The acting to enable may include preparing a proposal document with the specific proposal components and an indication of a non-shown portion of an identity of the primary entity, and the proposal notification then provides a link that leads to opening the proposal document. The acting to enable may include preparing a proposal document with the specific proposal components, and the proposal notification then includes an email that has the proposal document as an attachment. The proposal notification may include a promise that the identity of the primary entity will be revealed responsive to the affirmation input being received.

In some embodiments, the OSP 198 may cause a permission query to be presented in a User Interface (UI) of a computer of the primary entity that is viewable by a user of the primary entity. The OSP 198 may receive a permission input from the computer of the primary entity in response to the permission query. At least one of the assembling, acting to enable and causing the proposal notification to be transmitted may be performed responsive to receiving the permission input.

In some embodiments, the OSP 198 may receive in response to the transmitted proposal notification, a negation input instead of an affirmation input. The negation input may indicate that the proposal is not being accepted. In such cases, the OSP 198 may then transmit in response to the received negation input, a negation notification to a computer of the primary entity. As such, the primary entity may take other measures. In some embodiments, along with the negation input, a counterproposal indication is included. For instance, as seen with brief reference to FIG. 12B, in sample UI 1200B the third line of text can open an online form for the agency 182 to list a reason, or create a counterproposal indication of what would be acceptable. In such embodiments, the counterproposal indication can be transmitted together with the negation notification. Care should be exercised, however, so that the OSP 198 does not lead the primary entity 193 into thinking that a counterproposal is fair or desirable; rather, along with the counterproposal indication, the OSP 198 may indicate to the user 192 of the primary entity 193 to seek professional advice, and to forward to them the counterproposal indication.

In the example of FIG. 2, at 220, the OSP 198 then receives an affirmation input from a computer of the agency in response to the transmitted proposal notification. The proposal notification may enable a representative of the domain to provide an electronic signature, and, in such instances, the affirmation input includes the provided electronic signature. Also, the acting to enable may include preparing a proposal document that includes the specific proposal components, the proposal notification may enable a representative of the domain to affix an electronic signature to the proposal document, and, in such instances, the affirmation input then includes the proposal document with the affixed electronic signature by the representative.

In some embodiments, the affirmation input includes an electronic signature by a representative of the domain. In some embodiments, the OSP 198 may consult a registry of approved domain representatives and verify that the electronic signature is from one of the approved domain representatives. In such instances, the effectuating is performed automatically responsive to such verification.

At 222, the OSP 198 may then effectuate one or more follow-up notifications. In some embodiments, the OSP 198, causes at least one of the assembled proposal components to be presented in a User Interface (UI) of a computer of a user of the primary entity. Also, in some embodiments, the OSP 198 receives an electronic signature from the user of the primary entity as one more of the assembled proposal components. In such instances, the specific ones of the assembled proposal components that are enabled to be viewable by a third party do not include the received electronic signature from the user of the primary entity. The assembled proposal components are assembled in a proposal document. The OSP 198 may receive an electronic signature to the proposal document from the user. The OSP 198 may verify the received affirmation input against a validity criterion. In such instances, the effectuating may be performed automatically responsive to the verifying.

In some embodiments, at least one of the one or more follow-up notifications is about the received affirmation input and is sent to a computer of the primary entity or is about the identity of the primary entity and is sent to a computer of the agency. At least one of the one or more follow-up notifications may be sent concurrently to both a computer of the primary entity and to a computer of the agency. The OSP 198 may prepare a final document that lists the assembled proposal components, the identity of the primary entity, an electronic signature by a user of a computer of the primary entity, an identity of the domain and an electronic signature by a representative of the domain. The OSP 198 then makes the final document available to a user of a computer of the primary entity and to a user of a computer of the agency.

Figure 4A:
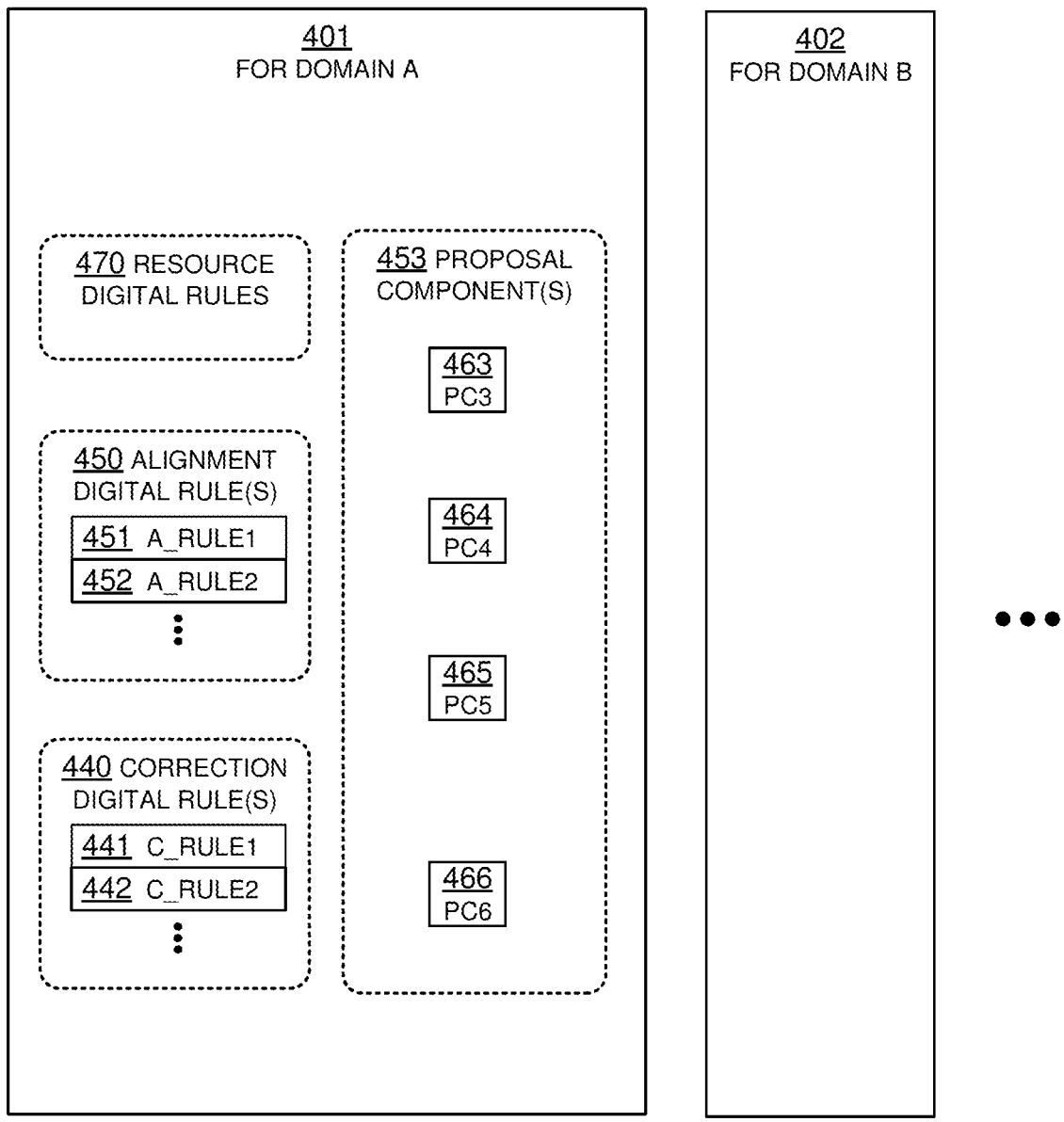
FIG. 4A is a block diagram illustrating an example of memory content of memory of the computer system of an OSP.

FIG. 4A is a block diagram illustrating an example of memory contents of memory 130 of the computer system 195 of OSP 198.

For example, the memory may be organized cached on logical and/or physical storage of data according to particular domains. As shown, for a sample domain A there has been an allocation 401 of storage for resource digital rules for domain A, proposal components (PC) 453 (including PC3 463, PC4 464, PC5 465 and PC6 466) for domain A, alignment digital rule(s) 450 for (including A rule1 451, A rule2 452 . . . ) domain A and correction digital rule(s) 440 (including C rule1 441, C rule2 442 . . . ) for domain A. Further data may be similarly stored in allocation 402 for another domain B, and further data may be similarly stored in additional allocations for additional domains. Also, the alignment digital rules may be updated for conditions of the applicable domain, as they are being learned and/or as the domain updates them.

Figure 4B:
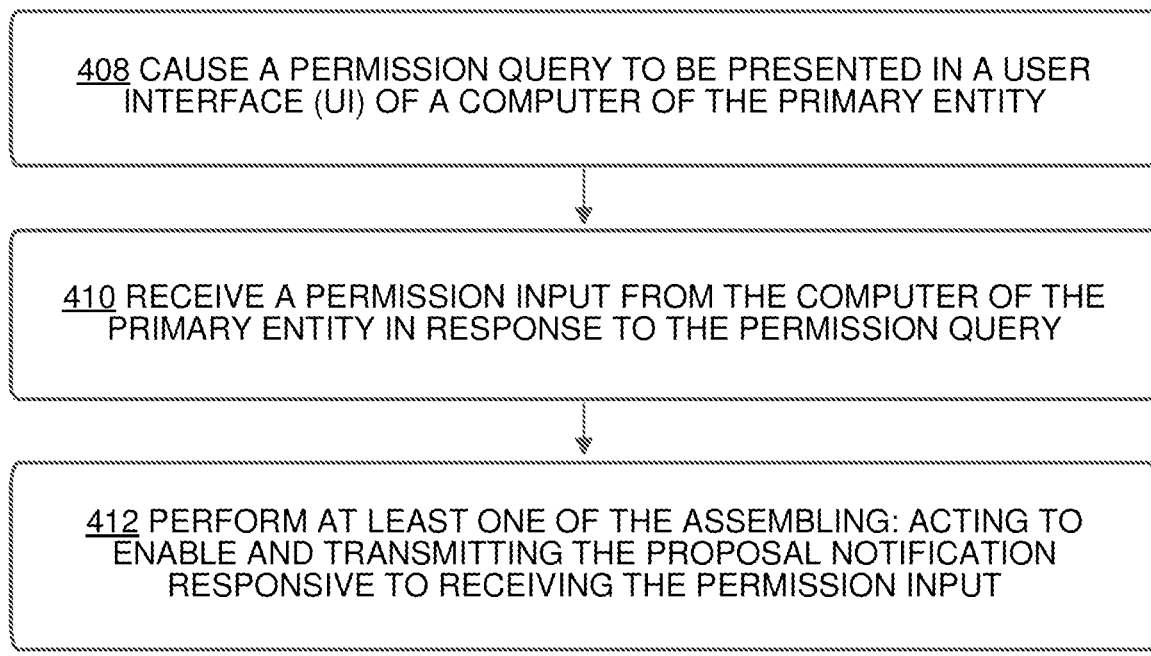
FIG. 4B is a flowchart for illustrating a sample method for assembling, acting to enable and transmitting the proposal notification responsive to receiving permission input, useful in the method of FIG. 2, according to embodiments of the present disclosure, which is an improvement in automated computerized systems.

FIG. 4B is a flowchart for illustrating a sample method 400 for assembling, acting to enable and causing the proposal notification to be transmitted responsive to receiving permission input, useful in the method 200 of FIG. 2, according to embodiments of the present disclosure, which is an improvement in automated computerized systems.

At 408, the OSP 198 causes a permission query to be presented in a User Interface (UI) of a computer of the primary entity that is viewable by a user of the primary entity.

At 410, the OSP 198 receives a permission input from the computer of the primary entity in response to the permission query.

At 412, the OSP 198 performs at least one of the assembling, acting to enable and transmitting the proposal notification responsive to receiving the permission input.

Figure 5:
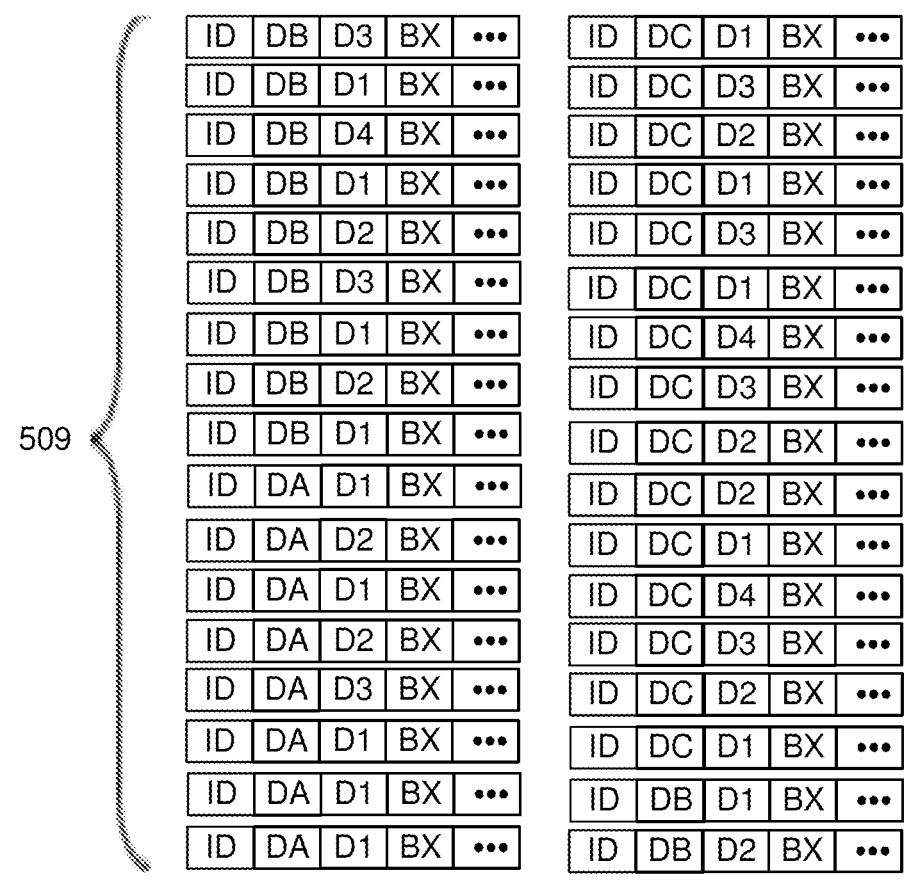

FIG. 5 illustrates an example of a plurality of extracted datasets associated with a plurality of domains, according to embodiments of the present disclosure, which is an improvement in automated computerized systems.

In the embodiment shown in FIG. 5, each dataset represents and includes data corresponding to a relationship instance of the primary entity, such as primary entity 193 in FIG. 1, and a secondary entity, such as secondary entity 196C in FIG. 1. Shown in extracted datasets 509 are individual values for parameter value ID, which is an identifier of the dataset. Also shown is a time value for the dataset, for an applicable time duration. These time values here can be for one of three sample successive time durations, such as DA or DB, or DC. Also shown is a parameter that has a value of one of D1, D2, D3, D4, which may indicate different domains; and a parameter value BX, which is, in the present example, is a numerical base value for an aspect of the dataset. Each dataset may have additional parameters, indicated by the dot-dot-dot. In the present example, the extracted datasets 509 are not necessarily sorted.

Figure 6:
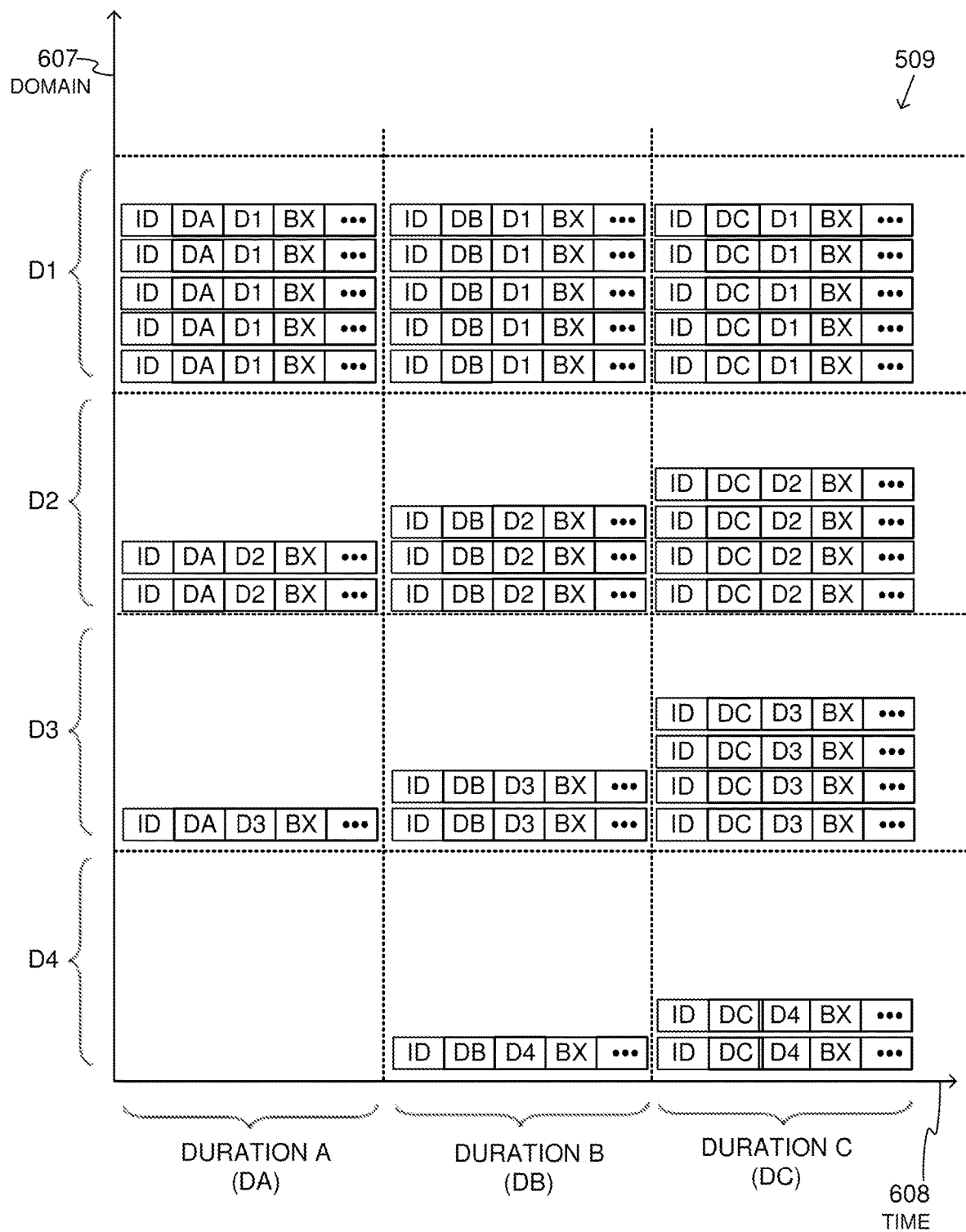
FIG. 6 illustrates the example datasets from FIG. 5 that have been filtered according to various embodiments of the disclosure, which is an improvement in automated computerized systems.

FIG. 6 illustrates the example datasets from FIG. 5 that have been sorted, grouped or otherwise filtered according to various embodiments of the disclosure, which is an improvement in automated computerized systems.

In some embodiments, the sorting, grouping or otherwise filtering of the datasets of the primary entity data in a particular manner enable or otherwise facilitate the primary entity data to be processed by the OSP 198, in order to apply one or more digital rules to the copied data to generate, for a domain resource amount 179, a determination regarding whether a threshold has been crossed for purposes of determining whether the domain resource amount 179 is due to a particular domain, for instance by a determination whether or not an alignment condition of the domain is not met according to an alignment digital rule 150.

In the present example, the copied primary entity data is filtered (e.g., by the OSP 198) such that the datasets are grouped or categorized along a time axis 608 and a domain axis 607. The datasets 509 are shown filtered in such a manner within a matrix in which the horizontal axis 608 of the matrix represents time in terms of the duration of the relationship instance represented by the dataset and the vertical axis 607 of the matrix represents the domain associated with the relationship instance represented by the dataset. This filtering defines a matrix of cells by domain and time duration, and datasets are categorized within the cells. Thus, each cell of the matrix contains the datasets for relationship instances that occurred in a particular time duration, such as a year, and that are associated with a particular domain.

In some embodiments, the matrix shown in FIG. 6 represents a data structure of the primary entity data as generated, filtered and/or stored by the OSP 198, or may represent logical relationships between the datasets as a result of the filtering. In some embodiments, such filtering may be performed by engine 183 of the OSP 198.

Figure 7:
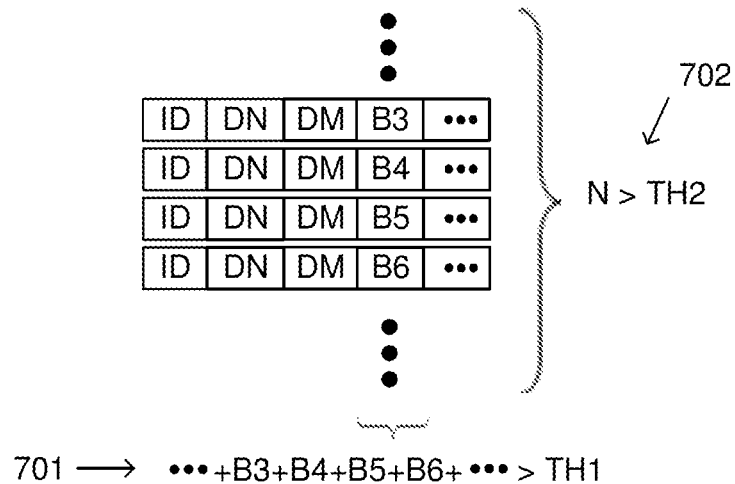
FIG. 7 illustrates an example of application of sample alignment digital rules to datasets according to various embodiments of the disclosure, which is an improvement in automated computerized systems.

FIG. 7 illustrates an example of application of sample alignment digital rules to datasets according to various embodiments of the disclosure, which is an improvement in automated computerized systems.

The filtering of the datasets of the primary entity data into cells, as described with respect to FIG. 6, in which each cell contains the datasets for relationship instances that occurred in a particular duration of time and that are associated with a particular domain, facilitates the primary entity data to be processed by the OSP 198 in order to apply one or more resource digital rules or alignment digital rules (e.g. based on whether a threshold has been met for a particular domain in a particular time duration).

In the present embodiment, the computer system of the OSP 198 applies such alignment digital rules to each cell of the matrix of FIG. 7 as each cell contains datasets for a particular duration and particular domain. In this diagram, the datasets of a single cell are shown as having—or being—in the same duration DN, and also being in the same domain DM. In various embodiments, different alignment digital rules may be applied to different cells associated with different domains, as each domain may have different requirements on which the alignment digital rules are based. For example, as shown in FIG. 7, for each cell in the matrix of FIG. 6, the OSP 198 calculates the sum of the respective base values (represented by parameter value BX in each dataset) of all the datasets in the cell, which represents the sum of the respective base values for the primary entity in the particular time duration and domain associated with that cell. The OSP 198 may then determine whether this sum exceeds a threshold (TH1), represented by inequality 701. For each cell in the matrix of FIG. 6, the OSP 198 may also calculate the total number of datasets (N) in the cell, which represents the total number of relationship instances of the client entity in the domain and duration associated with that cell. The OSP 198 may then determine whether the total number of datasets (N) in the cell exceeds a threshold (TH2), represented by inequality 702. According to the alignment digital rule in the present example, if the sum of the relationship instance amounts for a particular cell exceeds a threshold TH1 and/or the total number of datasets in the cell exceeds threshold TH2 (i.e., if inequality 701 and inequality 702 exist for that particular cell), then the alignment condition is not met. In some embodiments, the acting to enable and the causing the proposal notification to be transmitted is performed responsive to determining that the alignment condition is not met.

Figure 8:
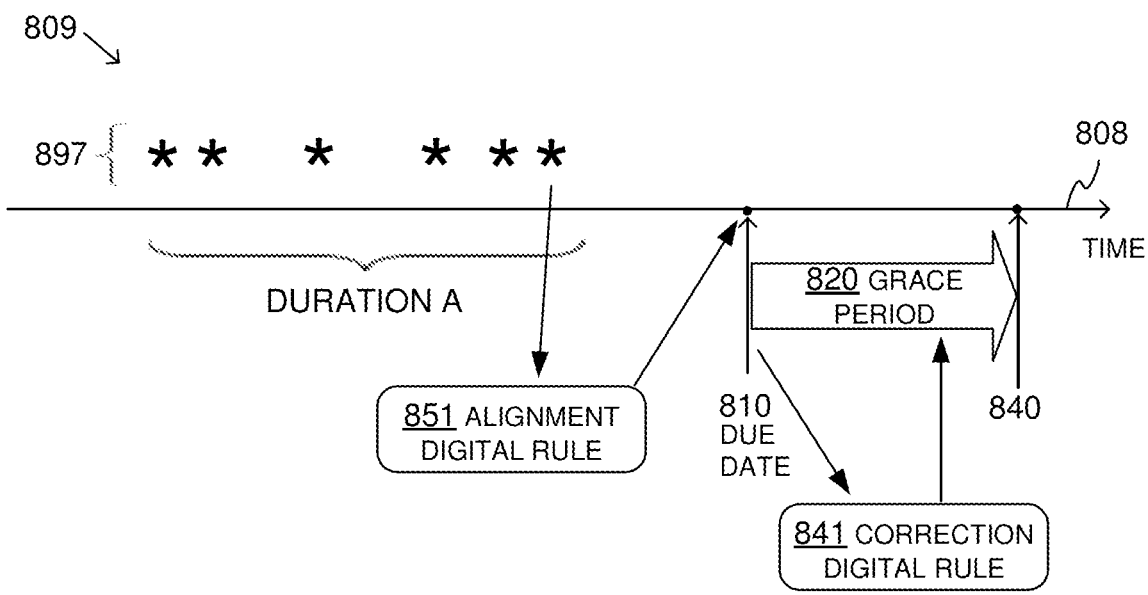
FIG. 8 illustrates a timeline showing how relationship instances that fall within a same duration may be handled, for which a due date is defined according to various embodiments of the disclosure, which is an improvement in automated computerized systems.

FIG. 8 illustrates a timeline 809 showing how relationship instances may be handled that fall within a same time duration, for which a due date is defined according to various embodiments of the disclosure, which is an improvement in automated computerized systems. Shown is a horizontal time axis 808 denoting time. Sample time duration A is denoted on the time axis 808. A plurality of relationship instances that have occurred between the primary entity and a secondary entity are plotted as relationship instance data 897 the time axis 808 according to the date that they occurred on. In this example, all relationship instance data 897 occurred within the time duration A. In some embodiments, the relationship instance data 897 includes at least one date of at least one of the relationship instances. In some embodiments, a due date 810 is determinable by the included date, and the alignment condition of the alignment digital rule 851 is not met if a report about an aspect of the relationship instances has not been filed with an agency of the domain on behalf of the primary entity by the due date 810. In some embodiments, a grace period 820 of the domain to a particular end date 840 is determined from the previously stored correction digital rule (e.g., by the agency 182). A correction eligibility condition is met if the grace period 820 has not elapsed since the due date as defined by a correction digital rule 841.

Figure 9:
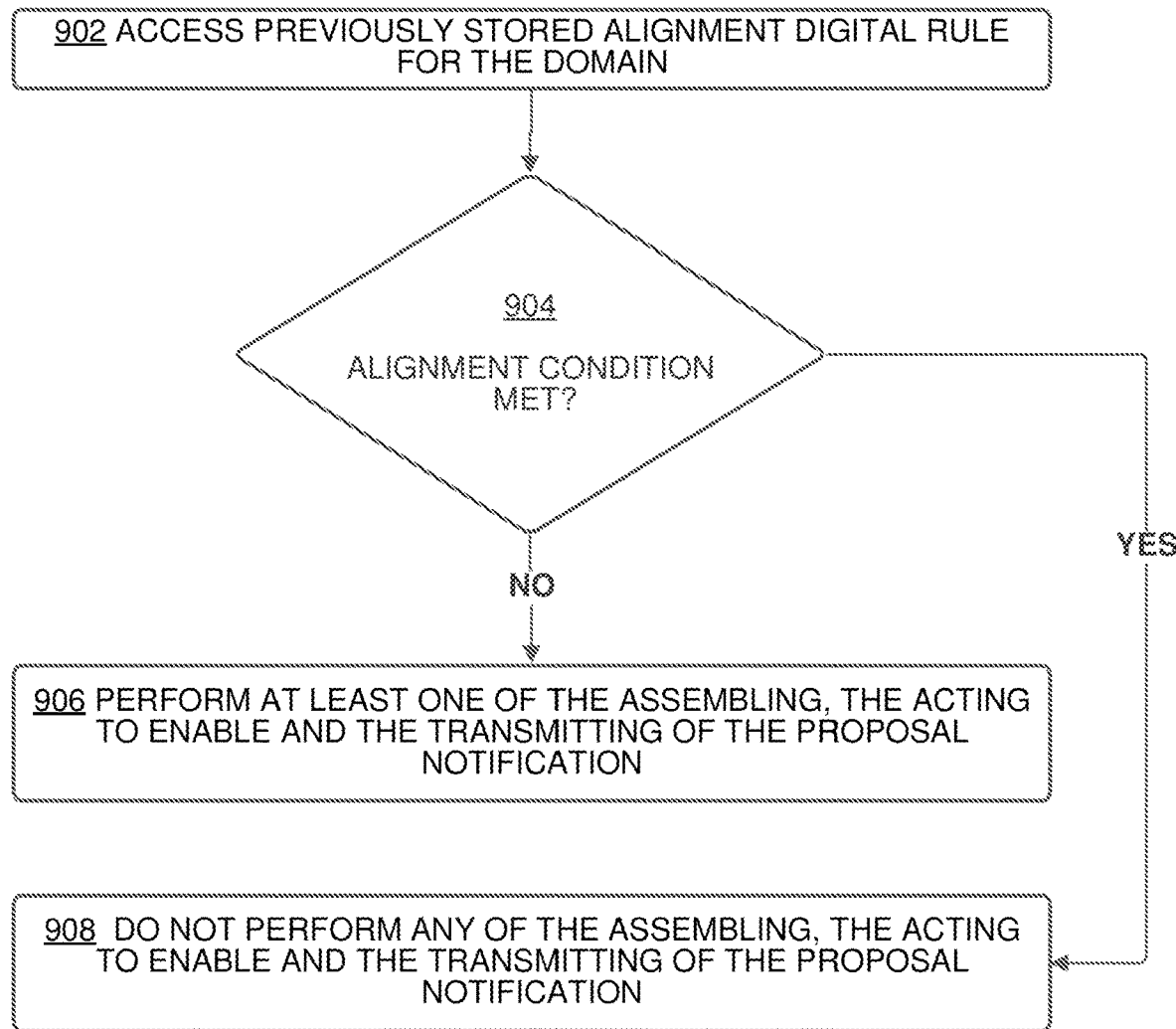
FIG. 9 is a flowchart for illustrating a sample method for performing at least one of the assembling, the acting to enable and the transmitting of the proposal notification that is useful in the method of FIG. 2, according to embodiments of the present disclosure, which is an improvement in automated computerized systems.

FIG. 9 is a flowchart for illustrating a sample method 900 for performing at least one of the assembling, the acting to enable and the transmitting of the proposal notification that is useful in the method of FIG. 2, according to embodiments of the present disclosure, which is an improvement in automated computerized systems.

At 902, the OSP 198 accesses the previously stored alignment digital rule for the domain.

At 904, the OSP 198 determines whether the alignment condition is met by applying the alignment digital rule to at least one of the relationship instance data and the domain resource. If the OSP 198 determines that the alignment condition is not met, then the method proceeds to 904. If the OSP 198 determines that the alignment condition is met, then the method proceeds to 906.

At 906, the OSP 198 performs at least one of the assembling, the acting to enable and the causing of the proposal notification to be transmitted.

At 908, the OSP 198 does not perform any of the assembling, the acting to enable and the causing of the proposal notification to be transmitted.

Figure 10:
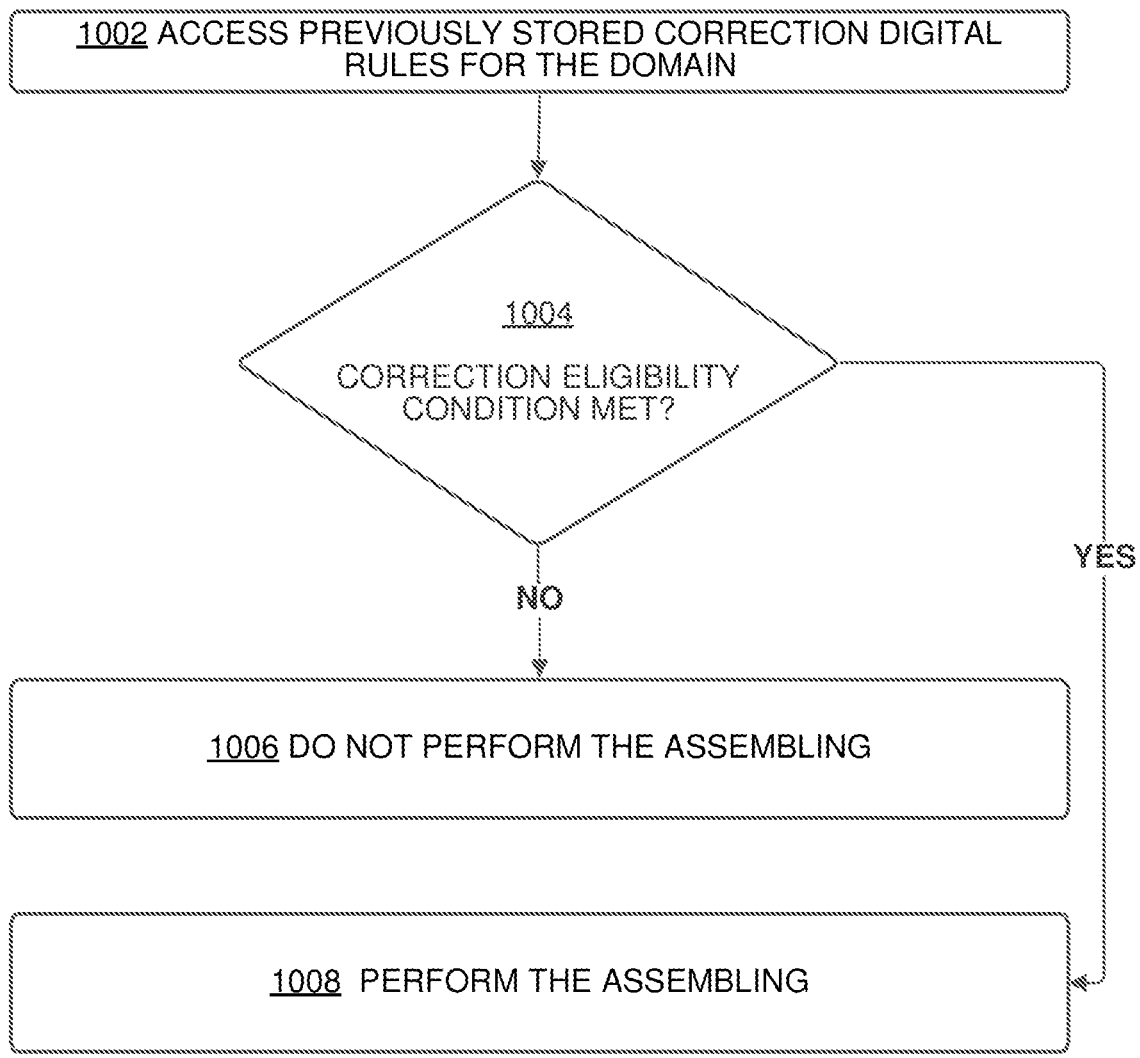
FIG. 10 is a flowchart for illustrating a sample method for performing the assembling responsive to a correction eligibility condition being met that is useful in the method of FIG. 2, according to embodiments of the present disclosure, which is an improvement in automated computerized systems.

FIG. 10 is a flowchart for illustrating a sample method 1000 for performing the assembling responsive to a correction eligibility condition being met that is useful in the method of FIG. 2, according to embodiments of the present disclosure, which is an improvement in automated computerized systems.

At 1002, the OSP 198 accesses the previously stored correction eligibility digital rule for the domain.

At 1004, the OSP 198 determines whether the correction eligibility condition is met by applying the correction eligibility digital rule to at least one of the relationship instance data and the domain resource. If the OSP 198 determines that the correction eligibility condition is not met, then the method proceeds to 1006. If the OSP 198 determines that the correction eligibility condition is met, then the method proceeds to 1008. In some embodiments, the relationship instance data includes at least one date associated with at least one of the relationship instances. A due date is then determined by the included date, a grace period of the domain is input, and the correction eligibility condition is met if the grace period has not elapsed since the due date. Also, some embodiments the relationship instance data includes datasets for the domain, the datasets include respective base values, and the correction eligibility condition is met if a sum of the respective base values is less than a threshold number.

At 1006, the OSP 198 does not perform the assembling of operation 214.

At 1008, the OSP 198 performs the assembling of operation 214. The assembled proposal components may be part of a proposed set, and the proposed set may be for a proposal regarding the primary entity meeting the alignment condition at least in part. Also, in some embodiments, the OSP 198 stores an updated correction digital rule and determines again, by applying the updated correction digital rule to the relationship instance data responsive to the storing, whether or not the correction eligibility condition is met. The assembling is thus performed responsive to the correction eligibility condition being met.

FIG. 11A is a sample view of a User Interface (UI) 1100A in which a notification is presented to a primary entity regarding a determined lack of alignment with a domain's alignment rules and options for proceeding, according to embodiments of the present disclosure, which is an improvement in automated computerized systems. Shown is UI 1100A presented on a screen 1191 of a device. For example, the screen 1191 may be screen 191 of the computer system 190 or other device of the primary entity 193 or user 192 of FIG. 1. UI 1100A may comprise a portion of a UI of the OSP 198 presented to the primary entity 193 or user 192. In various embodiments, the UI 1100A may present an indication that it has been determined by the OSP 198 that there is lack of alignment of the resources produced with respective relationship instances with a particular domain. The UI 1100A may further provide options for proceeding, such as a selectable option for the OSP 198 to proceed for the primary entity to approach the agency of the particular domain anonymously with a proposal to correct the lack of alignment or a selectable option for the primary entity 193 to correct the lack of alignment on their own, or not at all.

Figure 11B:
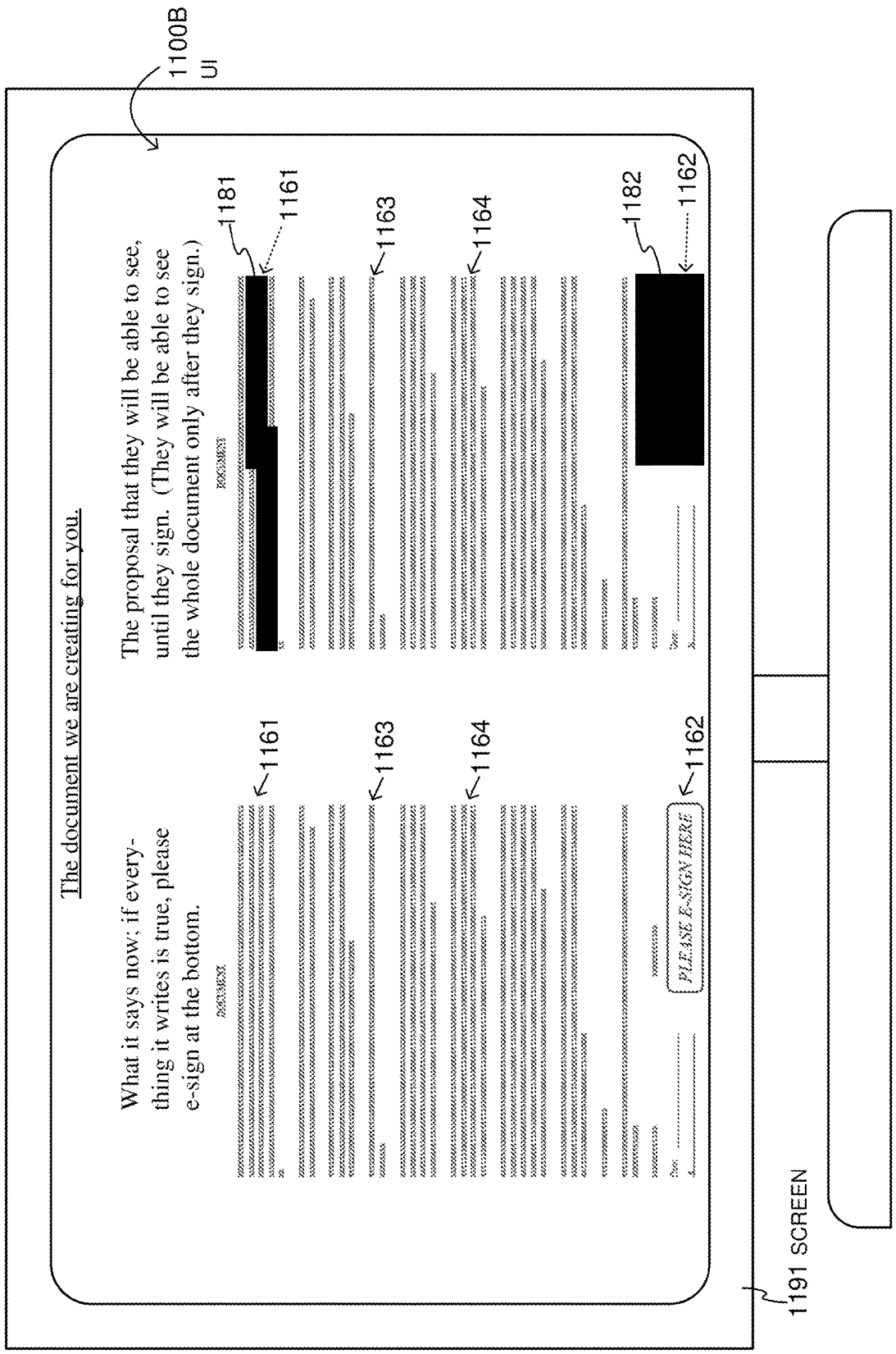
FIG. 11B is a sample view of a User Interface (UI) in which a proposal to be sent to an agency of a domain is presented to the primary entity for signature, according to embodiments of the present disclosure, which is an improvement in automated computerized systems.

FIG. 11B is a sample view of a User Interface (UI) 1100B in which a proposal to be sent to an agency of a domain is presented to the primary entity for signature, according to embodiments of the present disclosure, which is an improvement in automated computerized systems. UI 1100B may be presented as a follow-up to UI 1100A, if the "Click here" of the line before last is clicked. Shown is UI 1100B presented on a screen 1191 of a device. For example, the screen 1191 may be screen 191 of the computer system 190 or other device of the primary entity 193 or user 192 of FIG. 1. UI 1100B may comprise a portion of a UI of the OSP 198 presented to the primary entity 193 or user 192.

UI 1100B is divided into two sides. The left side shows information regarding the proposal; in this example the information is arranged as an agreement with proposal components. One proposal component is a primary identity 1161 as a party to the agreement. Other sample proposal components 1163, 1164 can be clauses to the agreement, and a proposal component 1162 can be a signature area for the primary entity, where the primary entity is to actually sign.

The right side of UI 1100B is intended to comfort the signer that their identity will not be revealed. In particular, the right side also shows the proposal that will be shown to the agency 182, except that proposal components 1161, 1162 are obscured by added respective blots 1181, 1191. As such, UI 1100B promises that these portions will be blocked out, via the blots 1181, 1191, from the agency 182 (primary identity 1161 and primary entity signature area 1162) until the agency 182 signs the document.

Figure 11C:
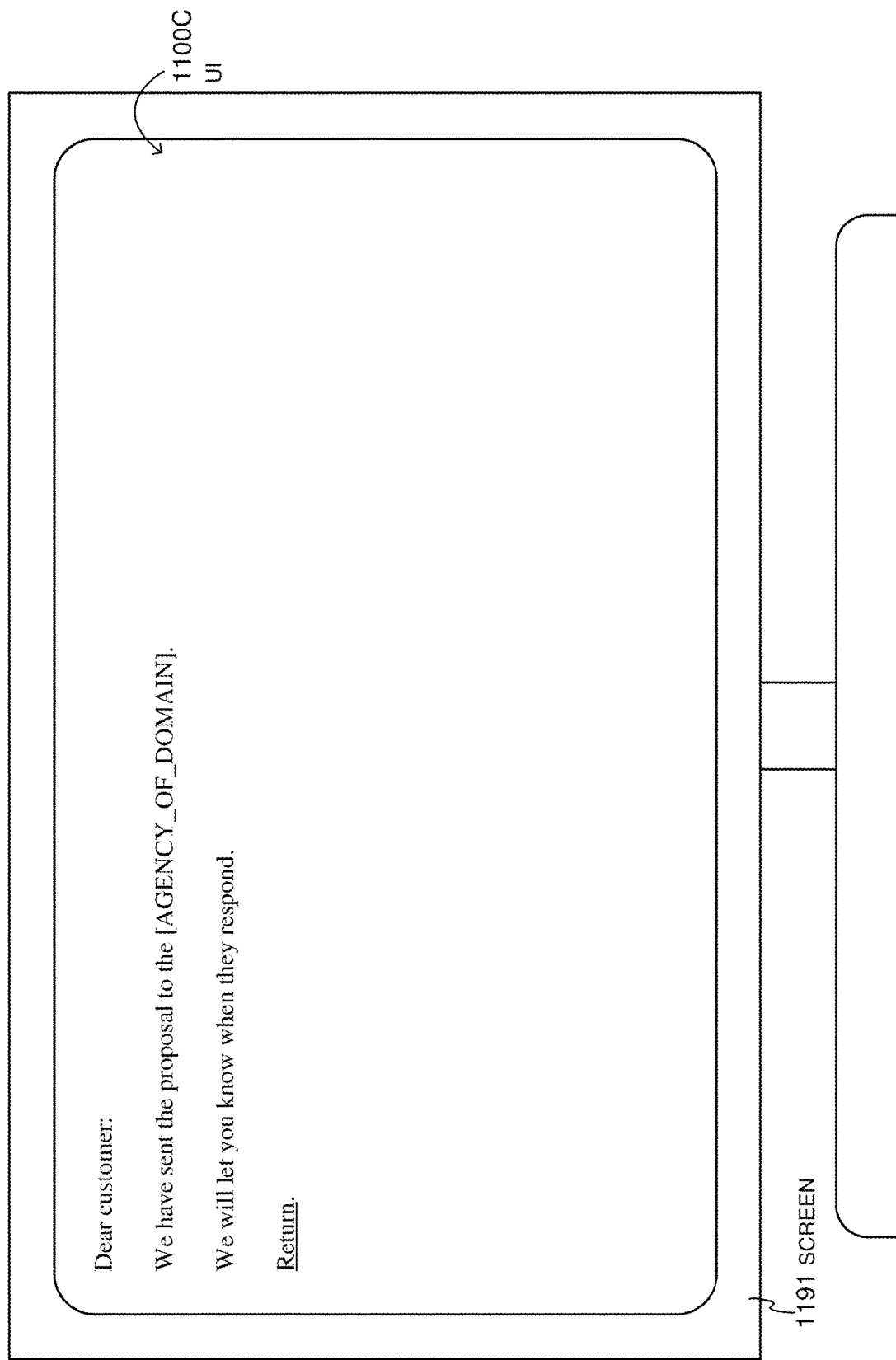
FIG. 11C is a sample view of a User Interface (UI) in which a notification is presented to a primary entity indicating a proposal has been sent to an agency of a domain, according to embodiments of the present disclosure, which is an improvement in automated computerized systems.

FIG. 11C is a sample view of a User Interface (UI) 1100C in which a notification is presented to a primary entity indicating a proposal has been sent to an agency (e.g., agency 182) of a domain, according to embodiments of the present disclosure, which is an improvement in automated computerized systems. Shown is UI 1100C presented on a screen 1191 of a device. For example, the screen 1191 may be screen 191 of the computer system 190 or other device of the primary entity 193 or user 192 of FIG. 1. UI 1100C may comprise a portion of a UI of the OSP 198 presented to the primary entity 193 or user 192. UI 1100C may appear after the user has submitted the proposal shown in FIG. 11B via the UI 1100A and UI 1100B. UI 1100C indicates the proposal has been sent to an agency of a domain and provides a user a selectable option to return to the previous UI or main menu.

Figure 12A:
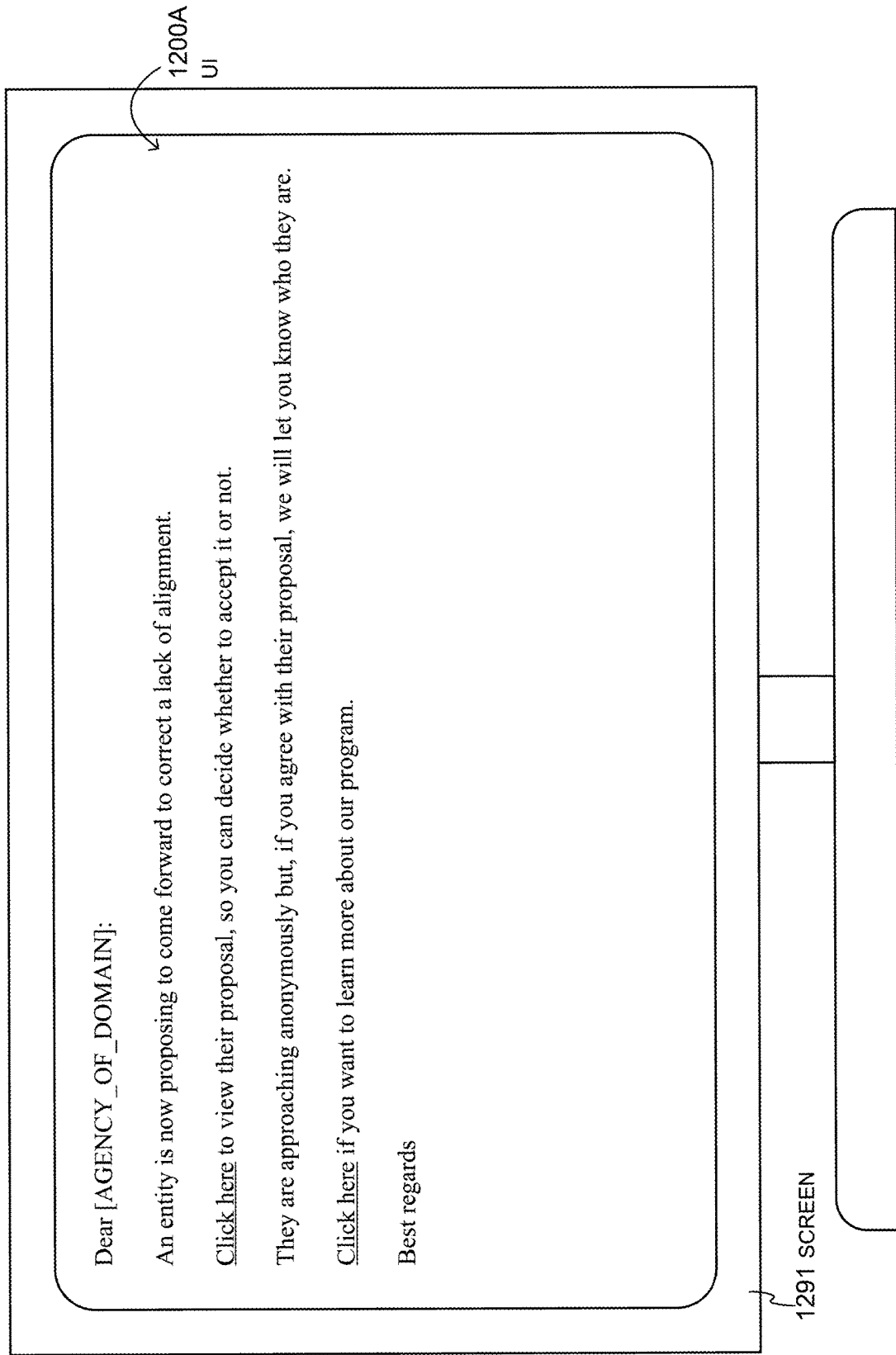
FIG. 12A is a sample view of a User Interface (UI) in which a notification is presented to an agency of a domain indicating a proposal from a primary entity is available to view, according to embodiments of the present disclosure, which is an improvement in automated computerized systems.

FIG. 12A is a sample view of a User Interface (UI) 1200A in which a notification is presented to an agency of a domain indicating a proposal from a primary entity is available to view, according to embodiments of the present disclosure, which is an improvement in automated computerized systems. Shown is UI 1200A presented on a screen 1291 of a device. For example, the screen 1291 may be a screen of the computer system 144 or other device of the agency 182 of FIG. 1. For example, the UI 1200A may provide an option for the agency 182 to review the proposal and may be presented concurrently with, in conjunction with or responsive to the UI 1100C being presented indicating the proposal has been sent to the agency 182.

Figure 12B:
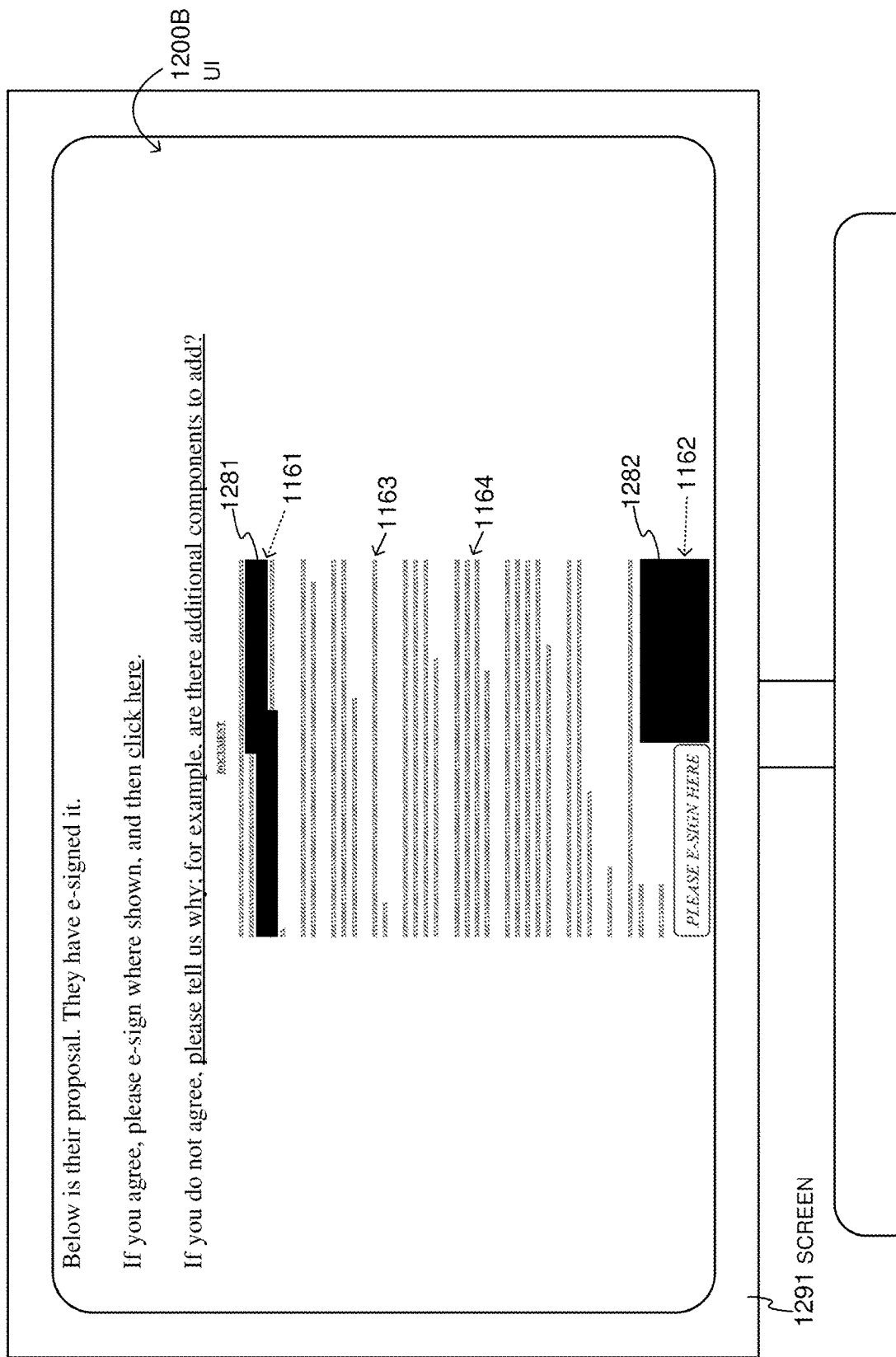
FIG. 12B is a sample view of a User Interface (UI) in which a proposal made from proposal components is presented to an agency of a domain for signature, according to embodiments of the present disclosure, which is an improvement in automated computerized systems.

FIG. 12B is a sample view of a User Interface (UI) 1200B in which a proposal is presented to an agency of a domain for signature, according to embodiments of the present disclosure, which is an improvement in automated computerized systems. Shown is UI 1200B presented on a screen 1291 of a device. For example, the screen 1291 may be screen of the computer system 144 or other device of the agency 182 of FIG. 1. For example, the UI 1200B may be presented responsive to the user selecting the option of UI 1200A to view the proposal.

Provided on the top side of UI 1200B are options the user may select to sign the proposal, or to optionally indicate why the agency 182 does not agree with the proposal if deciding not to sign. On the bottom side, the UI 1200B shows the proposed agreement shown on the right-hand side of UI 1100B, after it has been signed, and with blots 1281, 1282 applied to obscure proposal components 1161, 1162.

Figure 13:
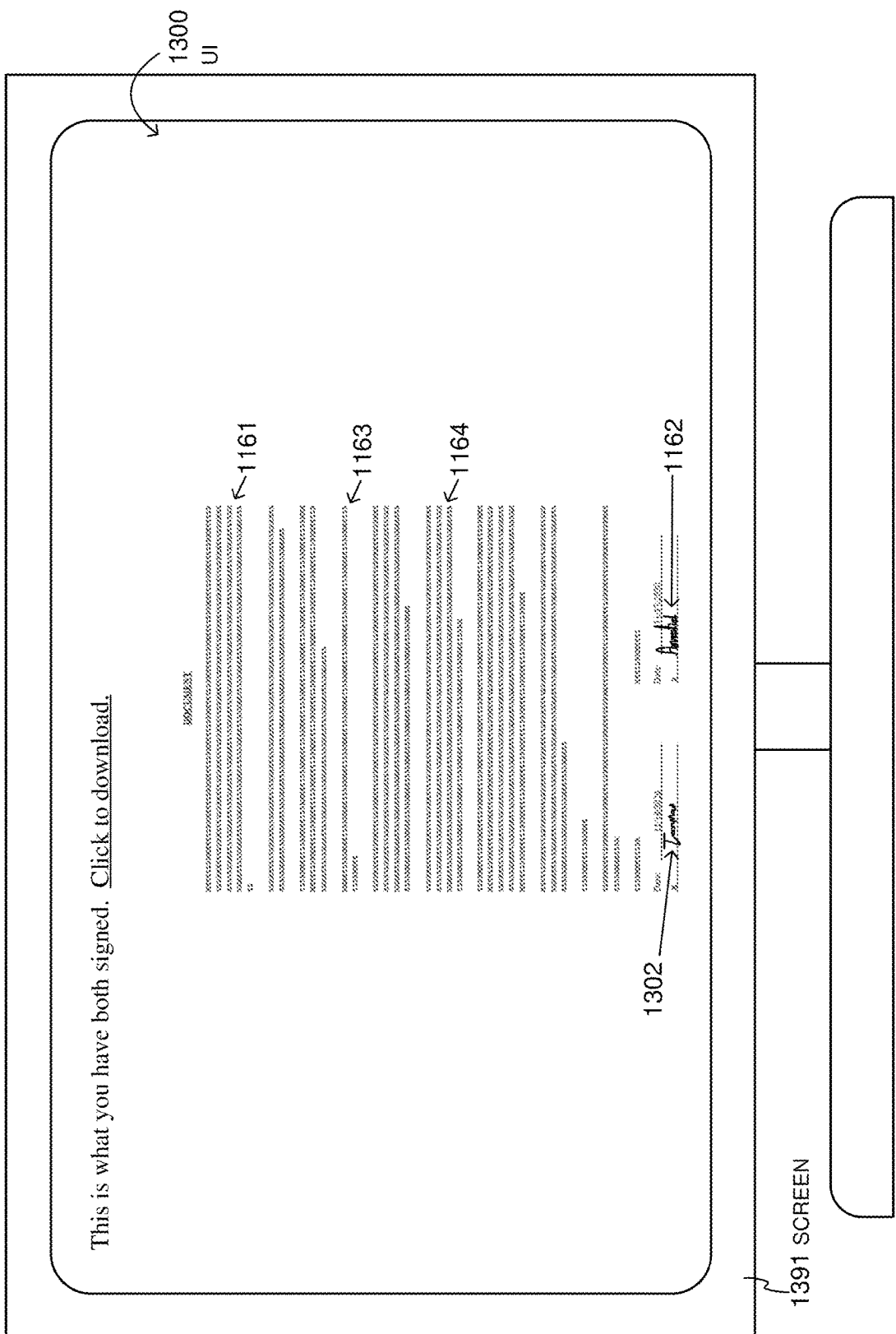
FIG. 13 is a sample view of a User Interface (UI) in which a document is presented to a primary entity and an agency of a domain that has been signed by both the primary entity and the agency of the domain, according to embodiments of the present disclosure, which is an improvement in automated computerized systems.

FIG. 13 is a sample view of a User Interface (UI) 1300 in which a signed proposal is presented to a primary entity and an agency of a domain, according to embodiments of the present disclosure, which is an improvement in automated computerized systems. Shown is UI 1300 presented on a screen 1391 of a device. For example, the screen 1391 may be screen 191 of the computer system 190 or other device of the primary entity 193 or user 192 of FIG. 1. Also, the screen 1391 may be screen of the computer system 144 or other device of the agency 182 of FIG. 1. UI 1300 is presented to the primary entity 193 and agency 182 indicating the proposal has been signed by both the primary entity 193 and agency 182, and thus presents the agency signature and identity 1369 and reveals to the agency 182 the primary entity name 1161 and the primary entity signature and identity 1162 since the proposal has now been signed by agency 182. UI 1300 also shows information regarding the proposal such as proposal component 1163 and proposal component 1164. Also provided on UI 1300 are options the user may select to download the signed proposal.

Figure 14:
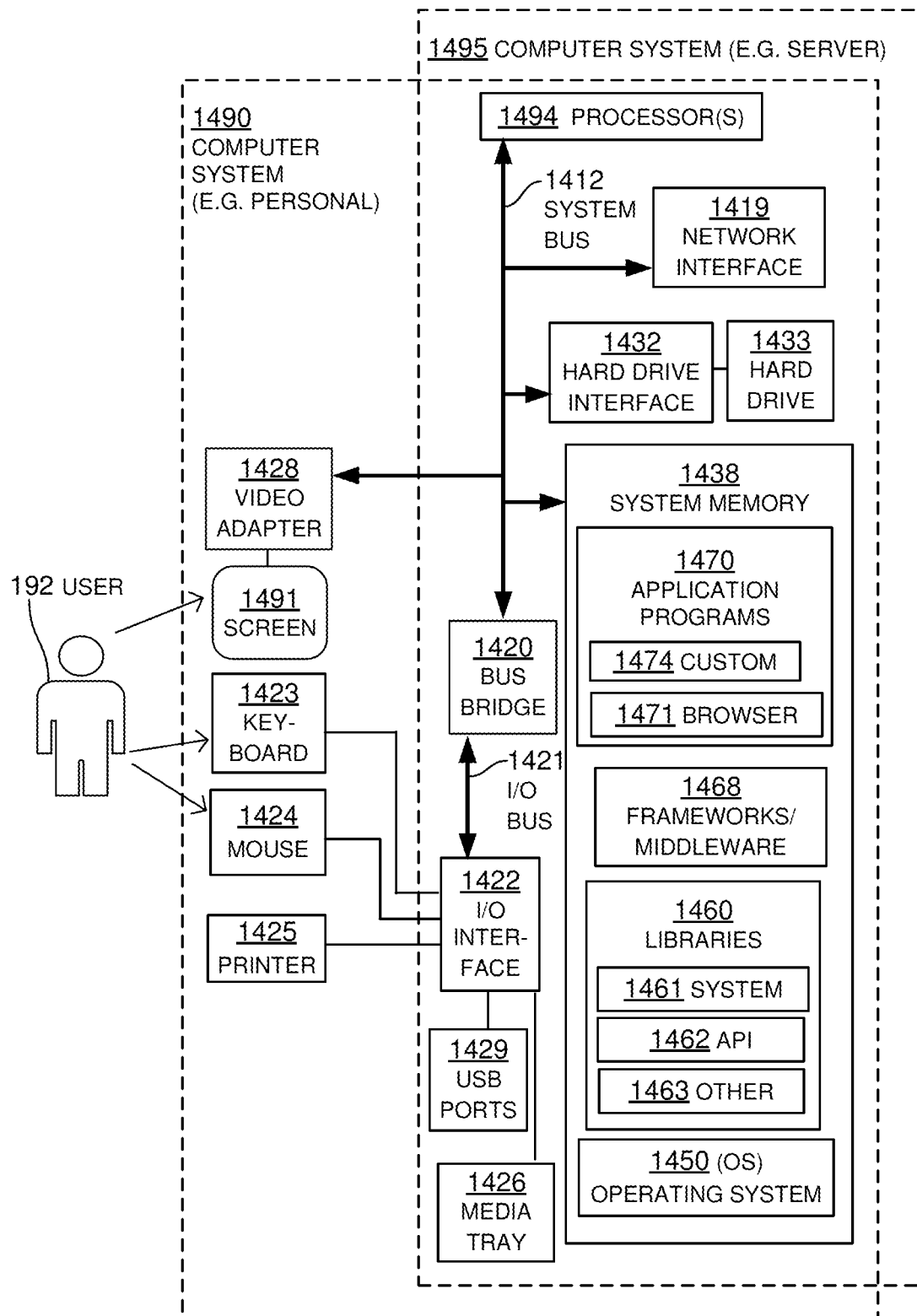
FIG. 14 is a block diagram illustrating components of an exemplary computer system according to some exemplary embodiments, which may read instructions from a machine-readable medium (e.g., a non-transitory computer-readable medium) and perform any one or more of the processes, methods, and/or functionality discussed herein, according to embodiments of the present disclosure, which is an improvement in automated computerized systems.

FIG. 14 is a block diagram illustrating components of an exemplary computer system according to some exemplary embodiments, which may read instructions from a machine-readable medium (e.g., a non-transitory computer-readable medium) and perform any one or more of the processes, methods, and/or functionality discussed herein, according to embodiments of the present disclosure, which is an improvement in automated computerized systems.

In the present example, FIG. 14 is a block diagram illustrating components of a sample computer system 1490 and a sample computer system 1495 according to some exemplary embodiments, which may read instructions from a machine-readable medium (e.g., a non-transitory computer-readable medium) and perform any one or more of the processes, methods, and/or functionality discussed herein. The computer system 1495 may be a server, while the computer system 1490 may be a personal device, such as a personal computer, a desktop computer, a personal computing device such as a laptop computer, a tablet computer, a mobile phone, and so on. Either type may be used for the computer system 195, 144 and 190 of FIG. 1, a computer system that is part of secondary entity 196C and/or a computer system that is part of any entity or system shown in any of the Figures of the present disclosure.

The computer system 1495 and the computer system 1490 have similarities, which FIG. 8 exploits for purposes of economy in this document. It will be understood, however, that a component in the computer system 1495 may be implemented differently than the same component in the computer system 1490. For instance, a memory in a server may be larger than a memory in a personal computer, and so on. Similarly, custom application programs 1474 that implement embodiments may be different, and so on.

The computer system 1495 includes one or more processors 1494. The processor(s) 894 are one or more physical circuits that manipulate physical quantities representing data values. The manipulation can be according to control signals, which can be known as commands, op codes, machine code, etc. The manipulation can produce corresponding output signals that are applied to operate a machine. As such, one or more processors 894 may, for example, include a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

A hardware component such as a processor may also include programmable logic or circuitry that is temporarily configured by software to perform certain operations. For example, a hardware component may include software executed by a general-purpose processor or another type of programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, Application Programming Interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. The hardware components depicted in the computer system 1495, or the computer system 890, are not intended to be exhaustive. Rather, they are representative, for highlighting essential components that can be used with embodiments.

The computer system 1495 also includes a system bus 1412 that is coupled to the processor(s) 1494. The system bus 1412 can be used by the processor(s) 1494 to control and/or communicate with other components of the computer system 1495.

The computer system 1495 additionally includes a network interface 1419 that is coupled to system bus 1412. Network interface 1419 can be used to access a communications network, such as the network 188. Network interface 1419 can be implemented by a hardware network interface, such as a Network Interface Card (NIC), wireless communication components, cellular communication components, Near Field Communication (NFC) components, 5G cellular wireless interfaces, transceivers, and antennas, Bluetooth® components such as Bluetooth® Low Energy, Wi-Fi® components, etc. Of course, such a hardware network interface may have its own software, and so on.

The computer system 1495 also includes various memory components. These memory components include memory components shown separately in the computer system 1495, plus cache memory within the processor(s) 1494. Accordingly, these memory components are examples of non-transitory machine-readable media. The memory components shown separately in the computer system 1495 are variously coupled, directly or indirectly, with the processor(s) 894. The coupling in this example is via the system bus 1412.

Instructions for performing any of the methods or functions described in this document may be stored, completely or partially, within the memory components of the computer system 1495, etc. Therefore, one or more of these non-transitory computer-readable media can be configured to store instructions which, when executed by one or more processors 1494 of a host computer system such as the computer system 895 or the computer system 890, can cause the host computer system to perform operations according to embodiments. The instructions may be implemented by computer program code for carrying out operations for aspects of this document. The computer program code may be written in any combination of one or more programming languages, including an object-oriented programming language such as Java, Smalltalk or the like, and/or conventional procedural programming languages, such as the "C" programming language or similar programming languages such as C++, C Sharp, etc.

The memory components of the computer system 1495 include a non-volatile hard drive 1433. The computer system 1495 further includes a hard drive interface 1432 that is coupled to the hard drive 1433 and to the system bus 1412.

The memory components of the computer system 1495 include a system memory 1438. The system memory 1438 includes volatile memory including, but not limited to, cache memory, registers and buffers. In embodiments, data from the hard drive 433 populates registers of the volatile memory of the system memory 1438.

In some embodiments, the system memory 1438 has a software architecture that uses a stack of layers, with each layer providing a particular functionality. In this example the layers include, starting from the bottom, an Operating System (OS) 1450, libraries 1460, frameworks/middleware 1468 and application programs 1470, which are also known as applications 1470. Other software architectures may include less, more or different layers. For example, a presentation layer may also be included. For another example, some mobile or special purpose operating systems may not provide a frameworks/middleware 1468.

The OS 1450 may manage hardware resources and provide common services. The libraries 1460 provide a common infrastructure that is used by the applications 1470 and/or other components and/or layers. The libraries 1460 provide functionality that allows other software components to perform tasks more easily than if they interfaced directly with the specific underlying functionality of the OS 1450. The libraries 1460 may include system libraries 1461, such as a C standard library. The system libraries 1461 may provide functions such as memory allocation functions, string manipulation functions, mathematical functions, and the like.

In addition, the libraries 1460 may include API libraries 1462 and other libraries 1463, such as for SDKs. The API libraries 1462 may include media libraries, such as libraries to support presentation and manipulation of various media formats such as MPEG4, H.264, MP3, AAC, AMR, JPG, and PNG. The API libraries 1462 may also include graphics libraries, for instance an OpenGL framework that may be used to render 2D and 3D in a graphic content on the screen 1491. The API libraries 1462 may further include database libraries, for instance SQLite, which may support various relational database functions. The API libraries 1462 may additionally include web libraries, for instance WebKit, which may support web browsing functionality, and also libraries for applications 1470.

The frameworks/middleware 1468 may provide a higher-level common infrastructure that may be used by the applications 1470 and/or other software components/modules. For example, the frameworks/middleware 1468 may provide various Graphic User Interface (GUI) functions, high-level resource management, high-level location services, and so forth. The frameworks/middleware 1468 may provide a broad spectrum of other APIs that may be used by the applications 1470 and/or other software components/modules, some of which may be specific to the OS 1450 or to a platform.

The application programs 1470 are also known more simply as applications and apps. One such app is a browser 1471, which is software that can permit the user 192 to access other devices in the internet, for example while using a Graphic User Interface (GUI). The browser 1471 includes program modules and instructions that enable the computer system 1495 to exchange network messages with a network, for example using Hypertext Transfer Protocol (HTTP) messaging.

The application programs 1470 may include one or more custom applications 1474, made according to embodiments. These can be made so as to cause their host computer to perform operations according to embodiments disclosed herein. Of course, when implemented by software, operations according to embodiments disclosed herein may be implemented much faster than may be implemented by a human mind; for example, tens or hundreds of such operations may be performed per second according to embodiments, which is much faster than a human mind can do.

Other such applications 1470 may include Enterprise Resource Planning (ERP) application, accounting applications, financial applications, accounting applications, payment systems applications, database and office applications, contacts application, a word processing application, a location application, a media application, a messaging application, and so on. Applications 1470 may be developed for the Windows™ operating system, and/or by using the ANDROID™ or IOS™ Software Development Kit (SDK) by an entity other than the vendor of the particular platform, and may be mobile software running on a mobile operating system such as IOS™, ANDROID™, WINDOWS® Phone, or other mobile operating systems. The applications 1470 may use built-in functions of the OS 1450, of the libraries 460, and of the frameworks/middleware 1468 to create user interfaces for the user 192 to interact with.

The computer system 1495 moreover includes a bus bridge 1420 coupled to the system bus 1412. The computer system 1495 furthermore includes an input/output (I/O) bus 1421 coupled to the bus bridge 1420. The computer system 1495 also includes an I/O interface 1422 coupled to the I/O bus 1421.

For being accessed, the computer system 1495 also includes one or more Universal Serial Bus (USB) ports 1429. These can be coupled to the I/O interface 1422. The computer system 1495 further includes a media tray 1426, which may include storage devices such as CD-ROM drives, multi-media interfaces, and so on.

The computer system 1490 may include many components similar to those of the computer system 1495, as seen in FIG. 14. In addition, a number of the application programs may be more suitable for the computer system 1490 than for the computer system 1495.

The computer system 1490 further includes peripheral input/output (I/O) devices for being accessed by a user 192 more routinely. As such, the computer system 1490 includes a screen 1491 and a video adapter 1428 to drive and/or support the screen 1491. The video adapter 1428 is coupled to the system bus 1412.

The computer system 1490 also includes a keyboard 1423, mouse 1424, and a printer 1425. In this example, the keyboard 1423, the mouse 1424, and the printer 1425 are directly coupled to the I/O interface 1422. Sometimes this coupling is wireless or may be via the USB ports 1429.

In this context, "machine-readable medium" refers to a component, device or other tangible media able to store instructions and data temporarily or permanently and may include, but is not be limited to: a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable digital versatile disc (DVD), an optical storage device, a magnetic storage device, or any suitable combination of the foregoing. The machine that would read such a medium includes one or more processors 1494.

The term "machine-readable medium" should be taken to include a single medium or multiple media (e.g., a centralized or distributed database, or associated caches and servers) able to store instructions that a machine such as a processor can store, erase, or read. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general or otherwise generic, non-programmed machine into a specialized particular machine programmed to carry out the described and illustrated functions in the manner described.

A computer readable signal traveling from, to, and via these components may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Operational Examples—Use Cases

Figure 15:
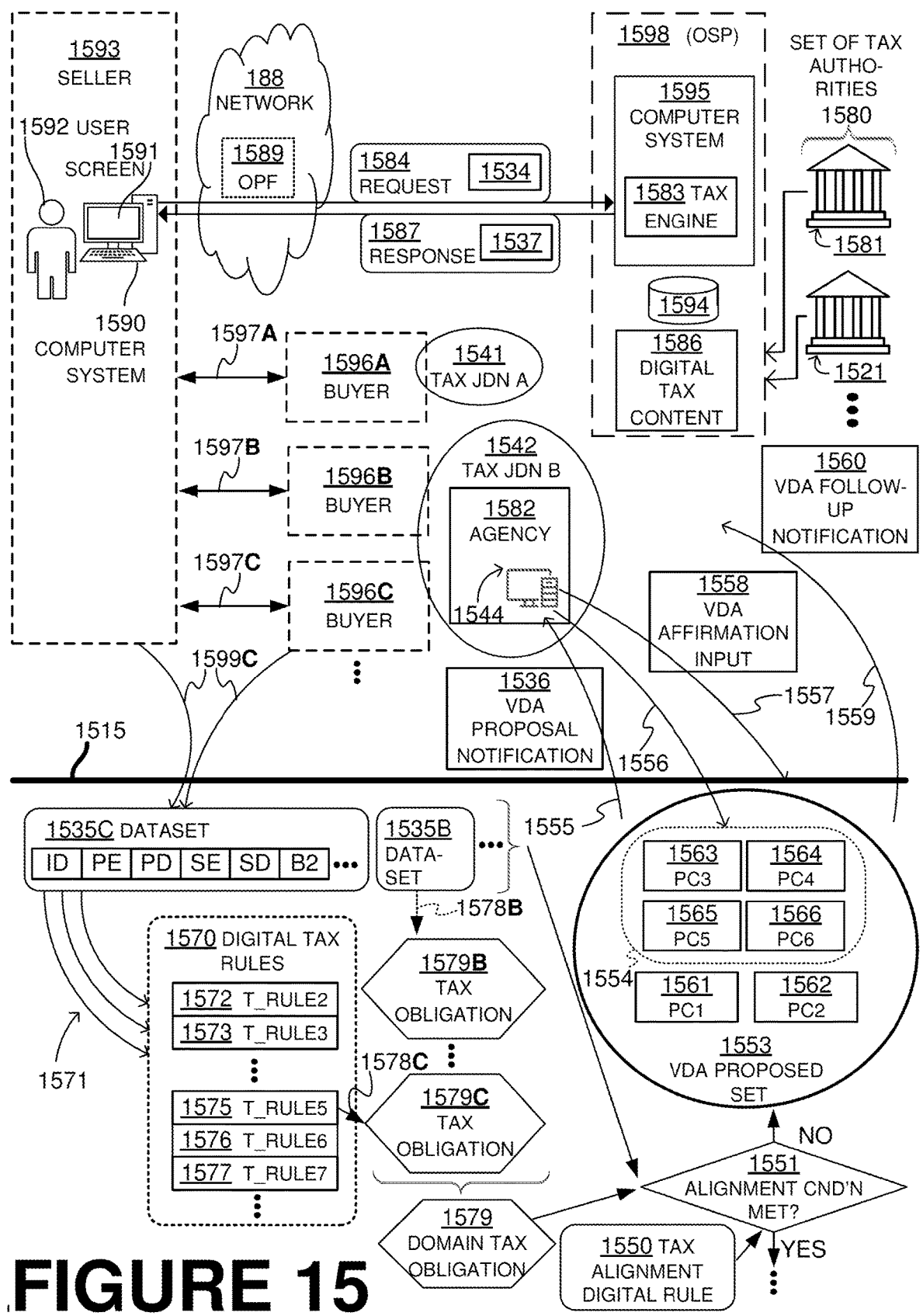
FIG. 15 is a diagram of sample aspects for describing operational examples and use cases of embodiments, according to embodiments of the present disclosure, which is an improvement in automated computerized systems.

The above-mentioned embodiments have one or more uses. Aspects presented below may be implemented as was described above for similar aspects. (Some, but not all, of these aspects have even similar reference numerals.) FIG. 15 is a diagram of sample aspects for describing operational examples and use cases of embodiments, according to embodiments of the present disclosure, which is an improvement in automated computerized systems.

A thick line 1515 separates FIG. 15, although not completely or rigorously, into a top portion and a bottom portion. Above the line 1515 the emphasis is mostly on entities, components, their relationships, and their interactions, while below the line 1515 emphasis is mostly on processing of data that takes place often within one or more of the components above the line 1515.

Above the line 1515 an OSP 1598, a sample computer system 1595 of OSP 1598; a network 188; a seller 1593; a seller computer system 1590 of seller 1593; sample buyers 1596A, 1596B and 1596C, and their respective transactions 1597A, 1597B and 1597C with seller 1593; a tax jurisdiction A 141; a tax jurisdiction B 142; an agency 1582 of tax jurisdiction B 1542; and an sample computer system 1544 of agency 1582, according to embodiments are shown. Agency 1582 of tax jurisdiction B 1542 is also known as a tax authority of tax jurisdiction B 1542. The computer system 1595 includes a tax engine 1583.

As a sample use case, tax statutes, tax rules, and tax rates change often, and new tax rules and tax types are continuously added. Operators of the OSP 1598 research the underlying statutes and tax rules and guidance issued by the tax authorities 1580, use them to generate or obtain digital tax rules 1570 that enable the OSP 1598 to compute tax obligations (also referred to as tax liabilities) for primary entities such as seller 1593. The OSP 1598 may further make the research available to all its primary entities. In addition, the OSP 1598 may keep enhancing its coverage of transaction compliance scenarios by enhancing its content and by building logic to determine increasing numbers of different types of compliance liabilities (e.g. tax types) required to be collected and paid to governing authorities, which are collectively known as tax authorities 1580, and include individual tax authorities 1581, 1521, 1582, and so on. Primary entities trust the OSP 1598 for compliance and may expect the OSP 1598 to take an increasing amount of compliance burden away from their shoulders. However, with more than 10,000 tax jurisdictions in USA alone, it is a mammoth task to stay on top of these changes. For example, different tax jurisdictions (e.g., tax jurisdiction A 1541 and tax jurisdiction B 1542) generally have different rules for when a seller is required to collect and remit sales tax. A tax authority such as a state or even a city may set its own economic nexus rules for when a business is considered to be "engaged in business" with it, and therefore that business is subject to registration and collection of sales taxes. These nexus rules are often based on thresholds indicating a total number of sales transactions and/or a total monetary value of all sales in a given time period. It is a technical challenge for a business, such as seller 1593, to constantly ascertain whether it meets these different nexus requirements in different tax jurisdictions in real time as transactions occur, given the ever-changing amount of sales in various different tax jurisdictions for the business in various time periods. Often, sellers are not aware they are delinquent on their taxes in various tax jurisdictions and unknowingly owe back taxes and penalties.

Thus, to solve the above technical problems, embodiments include functionality that enables the OSP 1598 to operate as an automated intermediary to offer ways (UI, emails, etc.) that enable the tax-delinquent seller 1593 to contact a tax authority (e.g., an agency 1582 associated with tax jurisdiction B) anonymously via the OSP 1598, by clicking a few buttons to answer a few questions and then e-sign. The OSP 1598 offers a UI that assists the seller 1593 by collecting total tax liabilities from various systems of the OSP 1598 to identify the amount of tax liability outstanding for a given tax jurisdiction for a particular period; contacts the tax authority on behalf of the seller 1593 to request a voluntary disclosure agreement (VDA) from the tax authority (e.g., tax authority 1581 via agency 1582) by sending a VDA proposal notification 1536, while maintaining the anonymity of the seller; enables the tax authority 1582 to view VDA proposed set 1553; receives acceptance via VDA affirmation input 1558 from an official of the tax authority (e.g. agency 1582); and then publicizes the VDA via the VDA follow-up notification 1560 to both the seller 1593 and to the agency 1582, revealing the seller 1593 to the agency 1582. In some embodiments, VDAs are contractual agreements reached between a tax authority and parties that are delinquent towards the tax authority. This agreement identifies the terms for curing the delinquency. This agreement will be valid when signed by both parties.

In one embodiment, the seller 1593 prepares a VDA proposal notification 1536 for a tax jurisdiction (e.g., agency 1582) via automated processes of the OSP 1598, by selecting a VDA proposed set of proposal components 1553, in which the seller admits their past tax liability, promises to timely file past due tax returns and pay back taxes, while the tax authority would agree to not request penalties and/or not prosecute criminally. The seller 1593 may e-sign the VDA proposal. Then the OSP 1598 may send the VDA proposal notification 1536 to the tax jurisdiction (e.g., agency 1582). In various embodiments, the tax jurisdiction and its agency or tax authority that receives and signs the VDA proposal, and the computer system(s) thereof, may be considered as one entity and referred to herein interchangeably. The receiving agency 1582 can accept the VDA by logging in to the OSP 1598, clicking, and even e-signing. When both the agency 1582 and the seller 1593 have e-signed the VDA proposal, a VDA has been formed, the agency 1582 learns the name of the seller 1593, and a copy of the VDA is made available to both parties via VDA follow-up notification 1560. Then the taxpayer (seller) files the tax return, etc.

In a VDA, for example, the seller 1593 may promise to pay all prior taxes, interests and penalties, and be compliant in the future. In exchange, the tax authority 1581 may promise to not criminally prosecute the seller 1593. Sometimes, in a VDA, the anonymous seller 1583 is further required to warrant the circumstances of their delinquency (e.g. they got stung by a new requirement such as economic nexus for an out-of-state entity that was previously unknown to them), and/or the approximate range of their liability in arrears (not too large). Such clauses may all be indicated in the VDA sent of proposal components 1553.

The OSP 1598 may intake new seller 1593 sales data from prior transactions, such as transactions 1597A, 1597B and 1597C, and determine, by identifying and applying a tax alignment digital rule 1550, that the seller's economic nexus had been reached in a state in a prior year, which now makes the seller 1593 delinquent. The OSP 1598 shows an extra button, for the seller 1598 to have the OSP 1598 propose an amnesty agreement (VDA) to the tax authority (TA) 1582, without divulging to the TA 1582 who the seller is. The TA 1582 can accept by e-signing the VDA on behalf of tax jurisdiction B 1542.

Traditionally, a tax accountant proposes the VDA to the tax authority 1581, telling them the seller's circumstance but without telling them who their delinquent client is. Of course, if the tax authority 1581 knew in advance who the delinquent client is, they would not need a VDA, or make any promises to a delinquent tax payer. In some cases, the client is out of state, so the tax authority does not know. So, sometimes they go back and forth before reaching an agreement, where the client will pay but the tax authority 1581 will not prosecute. When the tax authority signs the VDA, the seller is revealed. These processes take extra computing resources and burdens the systems of the tax accountant, tax authorities, and sellers. Thus, the automated systems and methods described herein for an OSP generating and transmitting to a third party, on behalf of a primary entity, a proposal of the primary entity while maintaining the anonymity of the primary entity, improve the functioning of computer or other hardware, such as by reducing the processing, storage, and/or data transmission resources needed to perform various tasks, thereby enabling the tasks to be performed by less capable, capacious, and/or expensive hardware devices, enabling the tasks to be performed with less latency and/or preserving more of the conserved resources for use in performing other tasks or additional instances of the same task.

In an example embodiment, the OSP 1598 may propose only a simple VDA to the tax authority 1581. The OSP 1598 may even detect the circumstances of the seller 1593, and propose VDA text that the tax authority 1581 has accepted in the past for sellers under similar circumstances. So, the agency 1582 can accept the agreement proposed by the seller 1593 but, if there is any hiccup or judgement is called for which the OSP 1598 is not prepared, a human accountant is preferably called in. The OSP 1598 enables the parties to do the negotiation, and both to e-sign the VDA, without disclosing one's identity until they both agree. The OSP 1598 may permit agency 1582 to view (the permission indicated by arrow 1556) a subset 1554 of the propose set 1553 of VDA proposal components PC3 1563, PC4 1564, PC5 1565 and PC6 1566). The viewing is either by viewing into a webpage of the OSP 1598, or by sending to the tax authority 1582 a document with these terms. For seller 1593, data learned from the OSP 1598 otherwise tax processing for the seller 1593 can be used to a) validate the seller's eligibility for VDA for the posted requirements of the tax authority 1581, and even populate the VDA proposal notification 1536 and or the electronic document of the VDA, thus improving efficiency of the computerized systems used to process and populate such documents.

Additionally, the OSP 1598 has the ability to leverage OSP 1598 consumer use data previously collected by the OSP 1598 to assist the seller 1593 in preparation of the VDA—in particular the amounts of sales and/or consumer use tax the seller believes they have in arrears to claim as tax due on the VDA. The system may maintain a link to the analysis data as support for the VDA and any audit of those VDA reports. By way of example, the OSP 1598 consumer use data may provide a clear variance between what a vendor charged the seller 1593 and what the tax engine 1583 of the OSP 1598 calculated as the consumer use tax due. These variances can be totaled up and collated within consumer use tax calculation functionality of the OSP 1598 by tax jurisdiction. Those totals by jurisdiction may then feed the VDA proposal notification 1536 with supportable details.

The systems and methods disclosed herein automate away the effort to put together—from scratch—a proposed VDA for a seller 1593, and send it to the tax authority 1581 of a state. The seller 1593 is enabled to move faster towards a VDA, without needing a human intermediary in the vast majority of circumstances, especially those arising from economic nexus with various tax jurisdictions. The tax authority 1581 does not need to cede any authority to be a party to the eventual VDA. The OSP 1593 is uniquely suitable to provide this functionality. In fact, it may be the OSP 1593 that first recognizes and informs an unsuspecting seller that nexus arose and back taxes are due, which carry the risk of penalties. Embodiments may be presented to the seller 1593 immediately after recognizing their liability. The OSP 1598 may auto-populate the incipient VDA document. Operators of the OSP 1598 may invite each tax authority in the set of the tax authorities 1580 to develop a policy of auto-accepting via a respective agency (e.g. agency 1582 for tax authority 1581), such as via VDA affirmation input 1558, assuming that party makes and signs for all the required representations. The invitation can be through a separate window, where the tax authority 1581 enters their requirements for accepting a VDA. The OSP 1598 may present a group of standard requirements to start and let them edit with their own. The OSP 1598 may even have sample accepted individual VDAs from various tax authorities. For example, the OSP software may say: "these have been your requirements before, why not now?" Then each tax authority may: a) decide on fixed questions that are required for the taxpayer to answer "NO" (or "YES"), after which the VDA is granted and there is no discretion to state officials; b) make those questions as few and as basic as possible, so VDA eligibility is easy to check and assert in an e-signed form. VDAs will be granted via the OSP 1598, and previous delinquent sellers will a) register, b) file old returns, c) pay their back taxes. Then tax authority 1581 can audit, also for truthfulness in the VDA declaration.

In some embodiments, tax authorities states may have special clauses they want in their agreement. The OSP 1598 may learn them and put them in the agreement text the OSP 1598 is creating. There may be provision that the tax authority 1598 gives the OSP 1598 feedback. In some embodiments, pricing of the service provided by the OSP 1598 makes it so the seller 1593 does not lose momentum, from a) discovering tax liability to b) filling in an online form requesting a VDA. The OSP 1598 may include the feature regarding detecting delinquency and preparing the VDA under a broader service and make it worth "X" number of "transactions", e.g. per tax authority, so the seller 1598 can keep going without needing to pause.

Operational examples and sample use cases are possible where the attribute of an entity in a dataset is any one of: the entity's name; type of entity; a physical location such as an address; a contact information element; transactions of the entity; an identifier of a specific source of revenue received for a transaction of the entity; characteristics of transactions of the entity; licensure and/or or registration of the entity and/or products or services the entity produces, sells, stores and/or transfers; products or services produced, sold, stored and/or transferred by the entity; types of products or services produced, sold, stored and/or transferred by the entity; a location to which products are sent, shipped or transferred; a location from which products are received; a location of a property owned by the entity; a location of a property owned by the entity within a particular region of other domain; an affiliation; a characterization of another entity; a characterization by another entity; an association or relationship with another entity (general or specific instances); an asset of the entity; a declaration by or on behalf of the entity; and so on. Different resources may be produced in such instances, and so on.

In particular, FIG. 15 is a diagram for an operational example and use case where the resource includes a domain tax obligation 1579 of a primary entity, such as seller 1593 of goods or services and/or a secondary entity, such as buyer 1596A, 1596B or 1596C of goods or services, due to respective corresponding transactions 1597A, 1597B and 1597C. It will be recognized that aspects of FIG. 15 have similarities with aspects of FIG. 1. Portions of such aspects may be implemented as described for analogous aspects of FIG. 1. In particular, a computer system 1595 is shown, which is used to help primary entities, such as a seller 1593 and an associated user 1592, with tax compliance. Further in this example, the computer system 1595 is part of an OSP 1598 that is implemented as a Software as a Service (SaaS) provider, for being accessed by the user 1592 online. Alternately, the functionality of the computer system 1595 may be provided locally to a user.

The user 1592 may be standalone. The user 1592 may use a computer system 1590 that has a screen 1591. In embodiments, the user 1592 and the computer system 1590 are considered part of the seller 1593, which is also known as entity 1593. The seller 1593 can be a business, such as a seller of items, a reseller, and so on. The user 1592 can be an employee, a contractor, or otherwise an agent of the entity 1593. In use cases, the seller 1593 and the buyer 1596C are performing the buy-sell transaction 1597C. The transaction 1597C will have data that is known to the seller 1593, similarly with what was described by the relationship instance 197 of FIG. 1.

In a number of instances, the user 1592 and the seller 1593 use software applications to manage their business activities, such as sales, resource management, production, inventory management, delivery, billing, and so on. The user 1592 and/or the seller 1593 may further use accounting applications to manage purchase orders, reservations, bookings, sales invoices, refunds, payroll, accounts payable, accounts receivable, and so on. Such software applications, and more, may be used locally by the user 1592 or from an Online Processing Facility (OPF) 1589 that has been engaged for this purpose by the user 1592, and/or the seller. In such use cases, the OPF 1589 can be a Mobile Payments system, a Point of Sale (POS) system, an Accounting application, an Enterprise Resource Planning (ERP) provider, an e-commerce provider, an electronic marketplace, a Seller Relationship Management (CRM) system, and so on.

Businesses have tax obligations to various tax authorities of respective domains (e.g., respective tax jurisdictions). A first challenge is in making the related determinations. Tax-related determinations, made for the ultimate purpose of tax compliance, are challenging because the underlying statutes and tax rules and guidance issued by the tax authorities are very complex. There are various types of tax, such as sales tax, use tax, excise tax, value-added tax, lodging tax, and issues about cross-border taxation including customs and duties, and many more. Some types of tax are industry specific. Each type of tax has its own set of rules. Additionally, statutes, tax rules, and rates change often, and new tax rules are continuously added. Compliance becomes further complicated when a taxing authority, such as tax authority 1581 or tax authority 1521 promulgates new tax types and/or tax exemption rules, or removes exemptions, of which the seller 1593 is presently unaware.

Tax jurisdictions are defined mainly by geography. Businesses have tax obligations to various tax authorities within the respective tax jurisdictions. There are various tax authorities, such as that of a country, of a state, of a municipality, of a local district such as a local transit district and so on. So, for example, when a business sells items in transactions that can be taxed by a tax authority, the business may have the tax obligations to the tax authority. These obligations include requiring the business to: a) register itself with the tax authority's taxing agency, b) set up internal processes for collecting sales tax in accordance with the sales tax rules of the tax authority, c) maintain records of the sales transactions and of the collected sales tax in the event of a subsequent audit by the taxing agency, d) periodically prepare a form ("tax return") that includes an accurate determination of the amount of the money owed to the tax authority as sales tax because of the sales transactions, e) file the tax return with the tax authority by a deadline determined by the tax authority, and f) pay ("remit") that amount of money to the tax authority. In such cases, the filing and payment frequency and deadlines are determined by the tax authority.

A technical problem for businesses is that the above-mentioned software applications generally cannot provide tax information that is accurate and current enough for the businesses to be tax compliant with all the relevant tax authorities. The lack of accuracy may manifest itself as errors in the amounts determined to be owed as taxes to the various tax authorities, and it is plain not good to have such errors. For example, businesses that sell products and services have risks whether they over-estimate or under-estimate the sales tax due from a sale transaction. On the one hand, if a seller over-estimates the sales tax due, then the seller collects more sales tax from the buyers than was due. Of course, the seller may not keep this surplus sales tax, but instead must pay it to the tax authorities—if they cannot refund it to the buyers. If a buyer later learns that they paid unnecessarily more sales tax than was due, the seller risks at least harm to their reputation. Sometimes the buyer will have the option to ask the state for a refund of the excess tax by sending an explanation and the receipt, but that is often not done as it is too cumbersome. On the other hand, if a seller under-estimates the sales tax due, then the seller collects less sales tax from the buyers, and therefore pays less sales tax to the authorities than was actually due. That is an underpayment of sales tax that will likely be discovered later, if the tax authority audits the seller. Then the seller may be required to pay the difference, plus fines and/or late fees, because ignorance of the law is not an excuse. Further, one should note that sales taxes are considered trust-fund taxes, meaning that the management of a company can be held personally liable for the unpaid sales tax.

For sales in particular, making correct determinations for sales and use tax is even more difficult. There are a number of factors that contribute to its complexity.

First, some state and local tax authorities have origin-based tax rules, while others have destination-based tax rules. Accordingly, a sales tax may be charged from the seller's location or from the buyer's location.

Second, the various tax authorities assess different, i.e. non-uniform, percentage rates of the sales price as sales tax, for the purchase and sale of items that involve their various tax jurisdictions. These tax jurisdictions include various states, counties, cities, municipalities, special taxing jurisdictions, and so on. In fact, there are over 10,000 different tax jurisdictions in the US, with many partially overlapping.

Third, in some instances no sales tax is due at all because of the type of item sold. For example, in 2018 selling cowboy boots was exempt from sales tax in Texas, but not in New York. This non-uniformity gives rise to numerous individual taxability rules related to various products and services across different tax jurisdictions.

Fourth, in some instances no sales tax is due at all because of who the individual buyer is. For example, certain entities are exempt from paying sales tax on their purchases, so long as they properly create and sign an exemption certificate and give it to the seller for each purchase made. Entities that are entitled to such exemptions may include wholesalers, resellers, non-profit charities, educational institutions, etc. Of course, who can be exempt is not exactly the same in each tax jurisdiction. And, even when an entity is entitled to be exempt, different tax jurisdictions may have different requirements for the certificate of exemption to be issued and/or remain valid.

Fifth, it can be difficult to determine which tax authorities a seller owes sales tax to. A seller may start with tax jurisdictions that it has a physical presence in, such as a main office, a distribution center or warehouse, an employee working remotely, and so on. Such ties with a tax jurisdiction establish the so-called physical nexus. However, a tax authority such as a state or even a city may set its own nexus rules for when a business is considered to be "engaged in business" with it, and therefore that business is subject to registration and collection of sales taxes. These nexus rules may include different types of nexus, such as affiliate nexus, click-through nexus, cookie nexus, economic nexus with thresholds, and so on. For instance, due to economic nexus, a remote seller may owe sales tax for sales made in the jurisdiction that are a) above a set threshold volume, and/or b) above a set threshold number of sales transactions.

To help with such complex determinations and solve such technical problems, the computer system 1595 may be specialized device for tax compliance as disclosed herein. The computer system 1595 may have one or more processors and memory, for example, as was described for the computer system 195 of FIG. 1. The computer system 1595 thus implements a tax engine 1583 to determine sales tax obligations on transactions associated with a particular jurisdiction for sellers based on various criteria of the digital tax rules 1570. The tax engine 1583 can be as described for the service engine 183.

The computer system 1595 may further store locally entity data, i.e. data of user 1592, of entity 1593, any of which/whom may be a seller, and/or a seller or a buyer in a sales transaction in various embodiments. The entity data may include profile data of the seller and transaction data from which a determination of a tax obligation is desired. In the online implementation of FIG. 15, the OSP 1598 has a database 1594 for storing the entity data. This entity data may be inputted by the user 1592, and/or caused to be downloaded or uploaded by the user 1592 from the computer system 1590 or from the OPF 1589, or extracted from the computer system 1590 or from the OPF 1589, and so on. In other implementations, a simpler memory configuration may suffice for storing the entity data.

Digital tax content 1586 is further implemented within the OSP 1598. The digital tax content 1586 can be a utility that stores digital tax rules 1570 and tax alignment digital rules, such as tax alignment digital rule 1550, for use by the tax engine 1583. As part of managing the digital tax content 1586, there may be continuous updates of the digital tax rules and tax alignment digital rules by inputs gleaned from a set 1580 of different tax authorities 1581, 1521, and so on. Updating may be performed by humans, or by computers, and so on. As mentioned above, the number of the different tax authorities in the set of tax authorities 1580 may be very large and the digital tax rules resulting from tax regulations promulgated by such tax authorities in the set 1580, once recognized and stored by the OSP 1598, may be used to determine whether economic nexus thresholds have been met or exceeded, determine whether the seller 1593 is delinquent and provide the associated automated VDA preparation and communication services described herein.

For a specific determination of a tax obligation, the computer system 1595 may receive one or more datasets. A sample received dataset 1535C and 1535B can be similar to what was described respectively for the dataset 135C and 135B of FIG. 1. In this example, the computer system 1590 transmits a request 1584 that includes a payload 1534, and the dataset 1535C is received by the computer system 1595 parsing the received payload 1534. In this example, the single payload 1534 encodes the entire dataset 1535C, but that is not required, as mentioned earlier. The request 1584 may also include particular option selections regarding the one or more predefined services that the OSP 1598 can be configured to perform, such as options regarding receiving notifications about the tax delinquency of the seller 1593. For example, such notifications may be sent responsive to the alignment condition of the tax alignment digital rule 1550 not being met as determined at 1551. In particular, the determination at 1551 may be made based on the OSP 098 identifying and applying alignment digital tax rule 1550 to the domain tax obligation 1579 based on one or more attributes of the transactions 1586B and 1596C (e.g. as indicated by to the datasets 1535C and 1535B).

In some instances, the user 1592 or the seller 1593 may have transactions with buyers. Only three such buyers 1596A, 1596B and 1596C are shown (which may also be referred to herein collectively as buyer 1596). Examples of such transactions are represented by transaction 1597A representing a transaction with buyer 1596A, transaction 1597B representing a transaction with buyer 1596B, and transaction 1597C representing a transaction with s buyer 1596C. However, additional or fewer buyers may be present in various other embodiments. For example, the seller 1593 may have a transaction 1597B with buyer 1596B via an intermediary entity (not shown).

In some instances, the user 1592 and the seller 1593 may have data about one or more buyers, for example, via transactions of the user 1592 or seller 1593 with the secondary entities 1596A, 1596B and 1596C. The seller 1593, an intermediary entity and/or the buyers 1596A, 1596B and 1596C may be referred to as simply entities. One of these entities may have one or more attributes. Such an attribute of such an entity may be any one of its name, type of entity, a physical or geographical location such as an address, a contact information element, an affiliation, a characterization of another entity, a characterization by another entity, an association or relationship with another entity (general or specific instances), an asset of the entity, a declaration by or on behalf of the entity, and so on.

In embodiments, the computer system 1590 generates one or more datasets that characterize the above-mentioned transactions. Sample generated datasets 1535C and 1535B are shown. The datasets 1535C and 1535B may have values that can be numerical, alphanumeric, Boolean, and so on, as needed for what the values characterize. For example, an identity value ID may indicate an identity of the dataset 1535C, so as to differentiate it from other such datasets. At least one of the values of the dataset 1535C may characterize an attribute of a certain one of the entities 1593 and 1596C. (It should be noted that the arrows 1599C describe a correspondence, but not the journey of data in becoming the dataset 1535C.)

In embodiments, stored digital tax rules 1570 and tax alignment digital rule 1550 may be accessed by the computer system 1595. These digital rules 1570 and 1550 are digital in that they are implemented for use by software. For example, these digital rules 1570 and 1550 may be implemented within tax engine 1583. The data portion of these digital rules 1570 and 1550 may alternately be implemented in memories in other places, which can be accessed via the network 188. These digital rules 1570 and 1550 may be accessed responsive to receiving a dataset, such as the dataset 1535C and/or generation of a resource, such as the domain tax obligation 1579.

In embodiments, a certain one of the digital tax rules 1570 may be identified from among the accessed stored rules by the computer system 1595. In particular, values of the dataset 1535C can be tested, according to arrows 1571, against logical conditions of the digital tax rules 1570. In an example embodiment, one or more alignment digital rules, including alignment digital rule, 1550 may be stored that indicate requirements for the domain tax obligation 1579 to meet an alignment condition of a particular tax jurisdiction (e.g., tax jurisdiction B 1542 in the present example). For example, such requirements may be based on one or more attributes of the transactions 1597B and 1597C and/or the domain tax obligation 1579. Thus, values of the domain resource 1579 can also be tested against logical conditions of the tax alignment digital rule 1550. Also, tax alignment digital rule 1550 may be identified from other stored tax alignment digital rules based on the identified tax jurisdiction (tax jurisdiction B 1542 in the present example) and/or one or more attributes of the identified tax jurisdiction. In this example, the certain tax rule T_RULE5 1575 is identified, which is indicated also by the beginning of an arrow 1578C. Identifying may be performed in a number of ways depending on how the digital tax rules 1570 are implemented.

The tax engine 1583 may communicate with various other systems, programs, entities and remote devices. The tax engine 1583 may be designed to take advantage of existing protocols. While REST API can be used over nearly any protocol, it usually takes advantage of HTTP (Hyper Text Transfer Protocol) when used for Web APIs. This architecture enables the seller 1593 to directly consume a REST API from their particular application, without using a connector. The particular application of the remote device may be able to fetch internally from the remote device the details required for the service desired from the OSP 1598, and thus send or push the request 1584 to the tax engine 1583. The tax engine 1583 in turn determines the requested tax obligations 1579B, 1579C, . . . for individual transactions within a domain, and the domain tax obligation 1579 for the domain.

In this example, the dataset 1535C has been received because it is desired to determine any tax obligations arising from the buy-sell transaction 1597C. As such, the sample received dataset 1535C has values that characterize attributes of the buy-sell transaction 1597C. Accordingly, in this example the sample received dataset 1535C has a value ID for an identity of the dataset 1535C and/or the transaction 1597C. The dataset 1535C also has a value PE for the name of the seller 1593 or the user 1592, which can be the seller 1593 making sales transactions, some online. The dataset 1535C further has a value PD for relevant data of the seller 1593 the user 1592, or the transaction, such as calendar year of the transaction, an address, place(s) of business, prior nexus determinations with various tax jurisdictions, and so on. The dataset 1535C also has a value SE for the name of the buyer 1596C. The dataset 1535C further has a value SD for relevant data of the buyer 1596C, and so on. The dataset 1535C has a value B2 for the sale price of the item sold.

The dataset 1535C may have fewer values or have additional values, as indicated by the dot-dot-dot in the dataset 1535C. These values may characterize further attributes, such as characteristics of the item being sold, data identifying of or otherwise relating to a license or registration required for the transaction, a date and possibly also time of the transaction 1597C, and so on.

The digital tax rules 1570 have been created so as to accommodate tax rules that the set 1580 of different tax authorities 1581, 1521, etc., promulgate within the boundaries of their tax jurisdictions. In FIG. 15, five sample digital tax rules are shown, namely T_RULE2 1572, T_RULE3 1573, T_RULE5 1575, T_RULE6 1576 and T_RULE7 1577. Additional digital tax rules 1570 are suggested by the vertical dot-dot-dots. Similarly with FIG. 1, some of these digital tax rules may be digital main rules that determine the tax obligations 1579C and 1579B, while others can be digital precedence rules that indicate economic thresholds, determine when economic thresholds are crossed or which of the digital main rules is to be applied in the event of conflict. In some use cases, digital main tax rules may be about a sales tax or use tax being owed due to the transaction 1597C at a certain percentage of the purchase price. Digital precedence rules may be digital tax rules that determine whether particular digital tax rules are to be applied for origin-based or destination-based jurisdictions, how to override for diverse taxability of individual items, for temporary tax holidays, for exemptions from having to pay sales tax based on who the buyer is, and also based on nexus, and so on. In the present example, digital precedence rules may be digital tax rules that determine whether particular digital tax rules are to be applied and may include or comprise the alignment digital tax rules, such as alignment digital tax rule 1550.

Similarly with FIG. 3, these digital tax rules 1570, including alignment digital tax rule 1550, can be implemented or organized in different ways. In some use cases they can be organized with conditions and consequents, such as was described earlier in this document. Such conditions may relate to geographical boundaries, sources of revenue, effective dates, types of goods or services being sold, and so on, for determining where and when a digital tax rule or tax rate is to be applied. These conditions may be expressed as logical conditions with ranges, dates, other data, and so on. Values of the dataset 1535C can be iteratively tested against these logical conditions according to arrows 1571. In such cases, the consequents may indicate one or more economic thresholds and tax obligations, such as to indicate different types of taxes that are due, rules, rates, exemption requirements, reporting requirements, remittance requirements, etc.

In this example, a certain digital tax rule T_RULE5 1575 is shown as identified and used, which is indicated also by arrow 1578C. Identifying may be performed responsive to the values of the dataset 1535C, which are shown as considered for digital tax rules 1570 by arrows 1571. For example, it can be recognized that a condition of the digital tax rule T_RULE5 1575 is met by one or more of the values of the dataset 1535C.

In the present example, the tax service engine 1583 computes tax obligations (tax obligation 1579C and tax obligation 1579B in the present example) for each of the respective datasets (dataset 1535C and dataset 1535B of the identified tax jurisdiction B 1542 in the present example). The tax engine 1583 then computes a domain tax obligation 1579 based on those resources. For example, the domain tax obligation 1579 may be a sum of the transaction amounts of dataset 1535C and dataset 1535B and/or indicate the total number of transactions associated with the identified tax jurisdiction (tax jurisdiction B 1542 in the present example) represented by 1535C and dataset 1535B.

Then tax engine 1583 then identifies and applies the tax alignment digital rule 1550 to the transaction data comprising dataset 1535C and dataset 1535B and the domain tax obligation 1579 to determine whether or not an alignment condition of tax jurisdiction B 1542 is met. If the alignment condition is not met, the then tax engine 1583 assembles VDA proposal components 154 from a previously stored set of VDA proposal components 1553. The tax engine 1583 acts to enable specific ones (subset 1554) of the set 1553 of assembled VDA proposal components 1554 (e.g., specific proposal components PC3 1563, PC4 1564, PC5 1565 and PC6 1566) to be viewable by the agency 1582 of tax jurisdiction B 1542. However, VDA proposal components PC1 1561 and PC2 1562 are not selected to be to be viewable (per arrow 1556) by the agency 1582 of tax jurisdiction B 1542 at least temporarily, until the proposal is accepted. These not viewable proposal components PC1 1561 and PC2 1562 may be the name and signature of the primary entity.

In the present example, the tax engine 1583 then transmits a VDA proposal notification 1536 to the computer 1544 of an agency 1582 of the tax jurisdiction B 1542. The VDA proposal notification 1536 indicates how the enabled specific VDA proposal components 1554 may be viewed by a user of a computer 1544 of the agency 1582 and further requests a VDA affirmation input 1558 from a computer 144 of the agency 1582. The VDA proposal notification 1536 can be about an aspect of a VDA proposal including the specific VDA proposal components 1554. In particular, the VDA proposal notification 1536 may inform about the aspect of the specific VDA proposal components 1554, namely that they have been determined, where they can be found, what it they are, and so on. The VDA proposal notification 1536 notification is formatted and transmitted in a manner such that the recipient of the VDA proposal notification 1536 understands what it is being provided.

The tax engine 1583 then receives the VDA affirmation input 1558 via an electronic communication 1557 from a computer system 1544 of the agency 1582 in response to the VDA proposal notification 1536. The tax engine 1583 then effectuates one or more VDA follow-up notifications 1560 to the seller 1593 and the agency 1582 via an electronic communication 1559 that publishes the VDA to both the seller 1593 and the agency 1582 and reveals the identity of the seller 1593.

The VDA proposal notification 1536 can be transmitted to one of an output device and another device. The output device may be the screen of a local user or a remote user. The proposal notification 1536 may thus cause a desired image, message, or other such notification to appear on the screen, such as within a Graphical User Interface (GUI) and so on. The other device can be the remote device, from which the dataset 1535C was received, as in the example of FIG. 1. In particular, the computer system 1595 may cause the notification 1536 to be communicated by being encoded as a payload 1537, which is carried by a response 1587. The response 1587 may be transmitted via the network 188 responsive to the received request 1584. The response 1587 may be transmitted to the computer system 1590, or to OPF 1589, and so on. As such, the other device can be the computer system 1544, computer system 1590, or the OPF 1589, or the screen 1591 of the user 1592, and so on. In this example, the single payload 1537 encodes the entire notification 1536, but that is not required. Similarly with what is written above about encoding datasets in payloads, the notification 1536 instead may be provided via two or more payloads, or in other cases the notification 136 and at least one other notification may be included in the same single payload.

Figure 16:
FIG. 16 illustrates an example of a plurality of sample extracted datasets associated with a plurality of tax jurisdictions, according to embodiments of the present disclosure, which is an improvement in automated computerized systems.

FIG. 16 illustrates an example of a plurality of extracted datasets 1609 associated with a plurality of tax jurisdictions, according to embodiments of the present disclosure, which is an improvement in automated computerized systems.

In the embodiment shown in FIG. 16, each dataset represents and includes data corresponding to a transaction of the primary entity, such as seller 1593 in FIG. 15, which is a provider of goods or services, and a secondary entity (e.g., a recipient of the goods or services), such as buyer 1596C in FIG. 15. Shown in extracted datasets 1609 are individual values for parameter value ID, which is an identifier of the dataset, parameter value DY, which is, in the present example use case, the calendar year in which the transaction occurred and, in this example, has the one of the values 18, 19 and 20 for the calendar years 2018, 2019 and 2020; parameter value BX, which is, in the present example use case, the amount of the transaction; and parameter value ST, which is, in the present example use case, the domain (e.g., state) associated with the transaction and, in this example, has the one of the values IL (Illinois), CA (California), NY (New York) and NJ (New Jersey). Each dataset may have additional parameters, indicated by the dot-dot-dot. In the present example, the extracted datasets 1609 have not been specially sorted.

Figure 17:
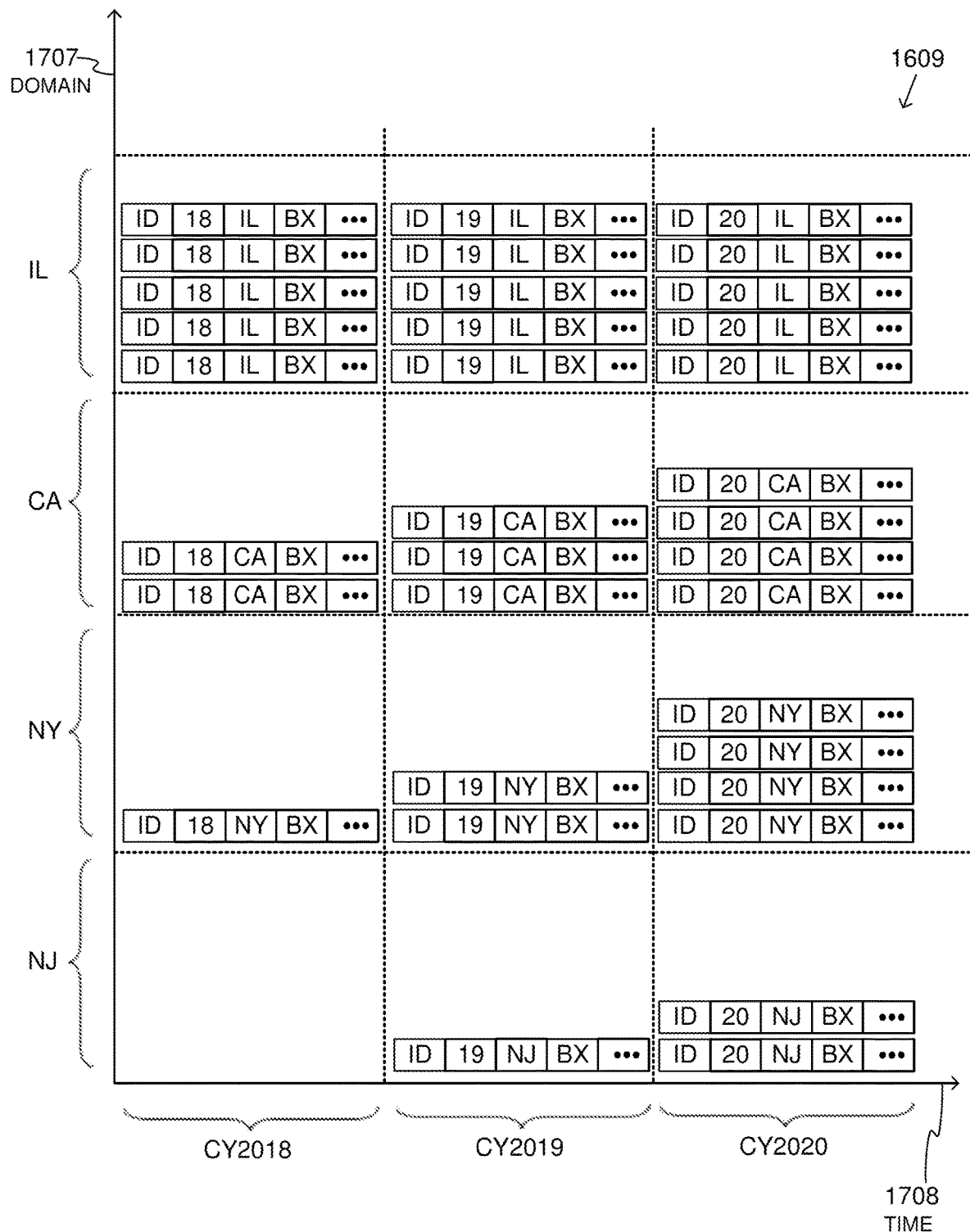
FIG. 17 illustrates the sample datasets from FIG. 16 after they have been filtered according to various embodiments of the disclosure, which is an improvement in automated computerized systems.

FIG. 17 illustrates the example datasets from FIG. 16 that have been sorted, grouped or otherwise filtered according to various embodiments of the disclosure, which is an improvement in automated computerized systems.

In some embodiments, the sorting, grouping or otherwise filtering of the datasets 1609 of the seller data in a particular manner enable or otherwise facilitate the seller data to be processed by the OSP 1598 in order to apply one or more digital tax rules 1570 to the copied data to generate a domain tax obligation 1579, a determination regarding whether a threshold has been crossed for purposes of determining whether a resource is due to a particular tax jurisdiction, and/or a determination whether or not an alignment condition of the tax jurisdiction is met according to an tax alignment digital rule 1550. In the present example, the copied seller data is filtered (e.g., by the OSP 1598) such that the datasets are grouped or categorized by the parameter value DY (calendar year of the transaction) and the parameter value ST (domain associated with the transaction).

The datasets 1609 are shown filtered in such a manner within a matrix in which the horizontal axis 1708 of the matrix represents time in terms of the calendar year of the transaction represented by the dataset and the vertical axis 1707 of the matrix represents the domain (e.g., tax jurisdiction) associated with the transaction represented by the dataset. This filtering defines a matrix of cells by tax jurisdiction and calendar year or tax year, and datasets are categorized within the cells. Thus, each cell of the matrix contains the datasets for transactions that occurred in a particular year and that are associated with a tax jurisdiction.

In some embodiments, the matrix shown in FIG. 17 represents a data structure of the client data as generated, filtered and/or stored by the OSP 1598, or may represent logical relationships between the datasets as a result of the filtering. In some embodiments, such filtering may be performed by a tax engine 1583 of the OSP 1098. In some embodiments, the OSP 1598 may extrapolate from, or interpret the filtered datasets to detect, relevant trends, patterns or other information relevant to the client entity (e.g., that the seller 1593 has crossed one or more thresholds for economic nexus one or more of those states).

Figure 18:
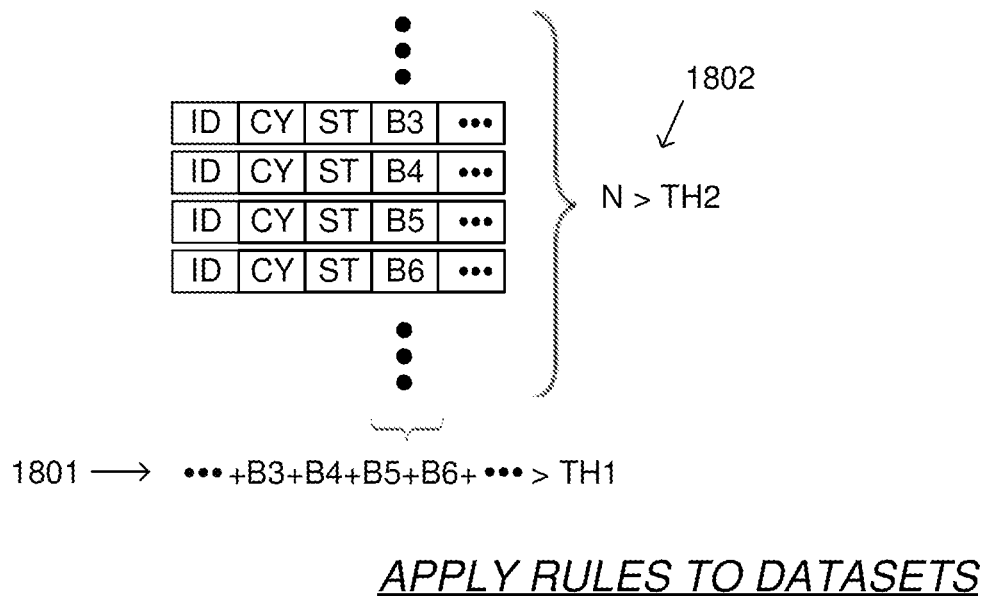
FIG. 18 illustrates an example of application of tax rules to datasets according to various embodiments of the disclosure, which is an improvement in automated computerized systems.

FIG. 18 illustrates an example of application of tax rules to datasets according to various embodiments of the disclosure, which is an improvement in automated computerized systems.

The filtering of the datasets of the seller data into cells, as described with respect to FIG. 17, in which each cell contains the datasets for transactions that occurred in a particular year and that are associated with a particular domain or tax authority, facilitate the seller data to be processed by the OSP 1598 in order to apply one or more digital rules based on whether a nexus threshold has been met for particular domain in a particular calendar year. For example, such may be useful for a client entity or OSP 1598 to determine whether the seller is subject to sales tax regulations for a particular tax jurisdiction and is obligated to collect and remit sales tax for particular domain.

In the present example, the stored digital rules (including tax alignment digital rule 1550) facilitate determining whether an economic nexus is established for purposes of remitting transaction tax in the certain domain (e.g. tax jurisdiction). However, different states have different thresholds for determining whether there is an economic nexus, which provides a problem for retailers in determining whether they are compliant with the tax rules in various jurisdictions, especially when the retailers have ever changing total revenue and numbers of transactions in various different domains (e.g., tax jurisdictions).

For example, the digital rules applied by the OSP 1598 may be based on regulations regarding a monetary amount of sales that are associated with each of various tax jurisdictions (e.g., states) and/or a volume of sales transactions that are associated with each of various tax jurisdictions. In an embodiment, the regulation may indicate the client entity is obligated to collect and remit sales tax in a particular tax jurisdiction if a particular economic nexus is met. For example, this particular economic nexus may be that within a particular calendar year, the total number of transactions exceed a particular threshold and the sum of the transaction amounts of all those transactions in that calendar year exceed another threshold. Thus, the digital rule based on the regulation will test the datasets representing those transactions to determine whether the thresholds are met for those datasets.

In FIG. 18, the datasets of a single cell are shown as having—or being—in the same time duration CY, and also being in the same tax authority (domain) ST. In the present embodiment, the computer system of the OSP 1598 applies such a digital rule to each cell of the matrix of FIG. 17, as each cell contains datasets for a particular year and particular tax jurisdiction. In various embodiments, different digital rules may be applied to different cells associated with different domains, as each domain (e.g., tax jurisdiction)

may have different tax regulations on which the digital rules are based. For example, as shown in FIG. 18, for each cell in the matrix of FIG. 17, the OSP 1598 calculates the sum of the transaction amounts (represented by parameter value BX in each dataset) of all the datasets in the cell, which represents the monetary amount of sales for the client entity in the particular year and domain associated with that cell. The OSP 1598 then determines whether this sum exceeds a threshold (TH1), represented by inequality 1801. For each cell in the matrix of FIG. 17, the OSP 1598 may also calculate the total number of datasets (N) in the cell, which represents the total number of transactions of the seller in the domain and calendar year associated with that cell. The OSP 1598 then determines whether the total number of datasets (N) in the cell exceeds a threshold (TH2), represented by inequality 1802 seen in FIG. 18. According to the digital rule in the present example, if the sum of the transaction amounts for a particular cell exceeds a threshold TH1 and the total number of datasets in the cell exceeds threshold TH2 (i.e., if inequality 1801 and inequality 1802 exist for that particular cell), then the economic nexus for the tax jurisdiction and year associated with that particular cell is met and the OSP 1598 may as a result determine that the seller is delinquent of such associated tax obligations have not yet been met.

Figure 19:
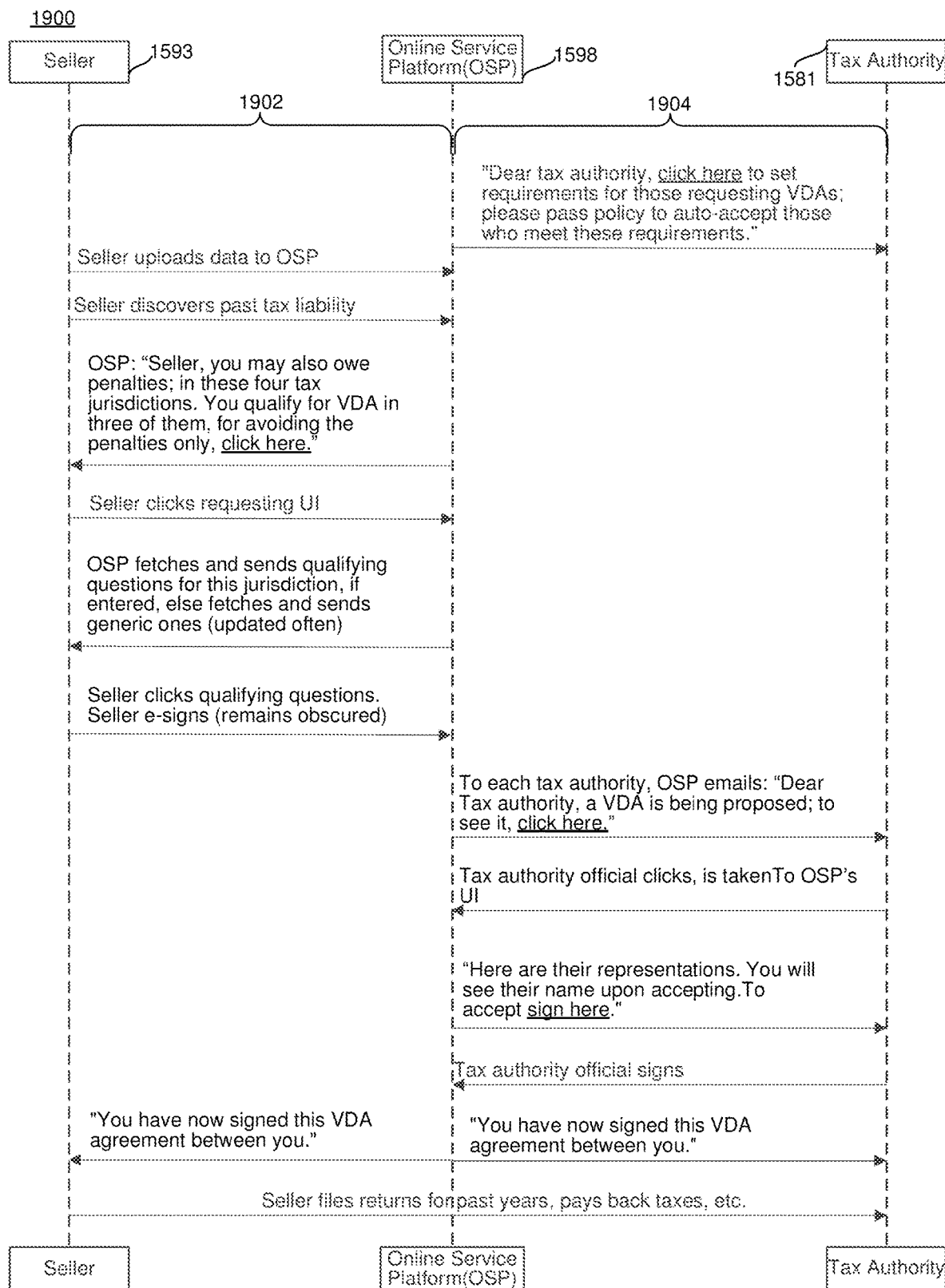
FIG. 19 is a sequence diagram illustration of an example sequence of communications between the seller, the OSP and the tax authority according to various embodiments of the disclosure, which is an improvement in automated computerized systems.

FIG. 19 is a sequence diagram illustration of an example sequence of communications 1900 between the seller 1593, the OSP 1598 and the tax authority 1581 according to various embodiments of the disclosure, which is an improvement in automated computerized systems. Example communications between the seller 1593, the OSP 1598 and the tax authority 1581 are shown as they occur in order from top to bottom. Arrows indicate the direction of the communication from one entity to another. Communications 1902 are those between the seller 1593 and the OSP 1598, and communications 1904 are those between the OSP 1598 and the tax authority 1581, 1582, etc., with the OSP 1598 acting as intermediary between the seller 1593 and the tax authority 1581.

Figure 20A:
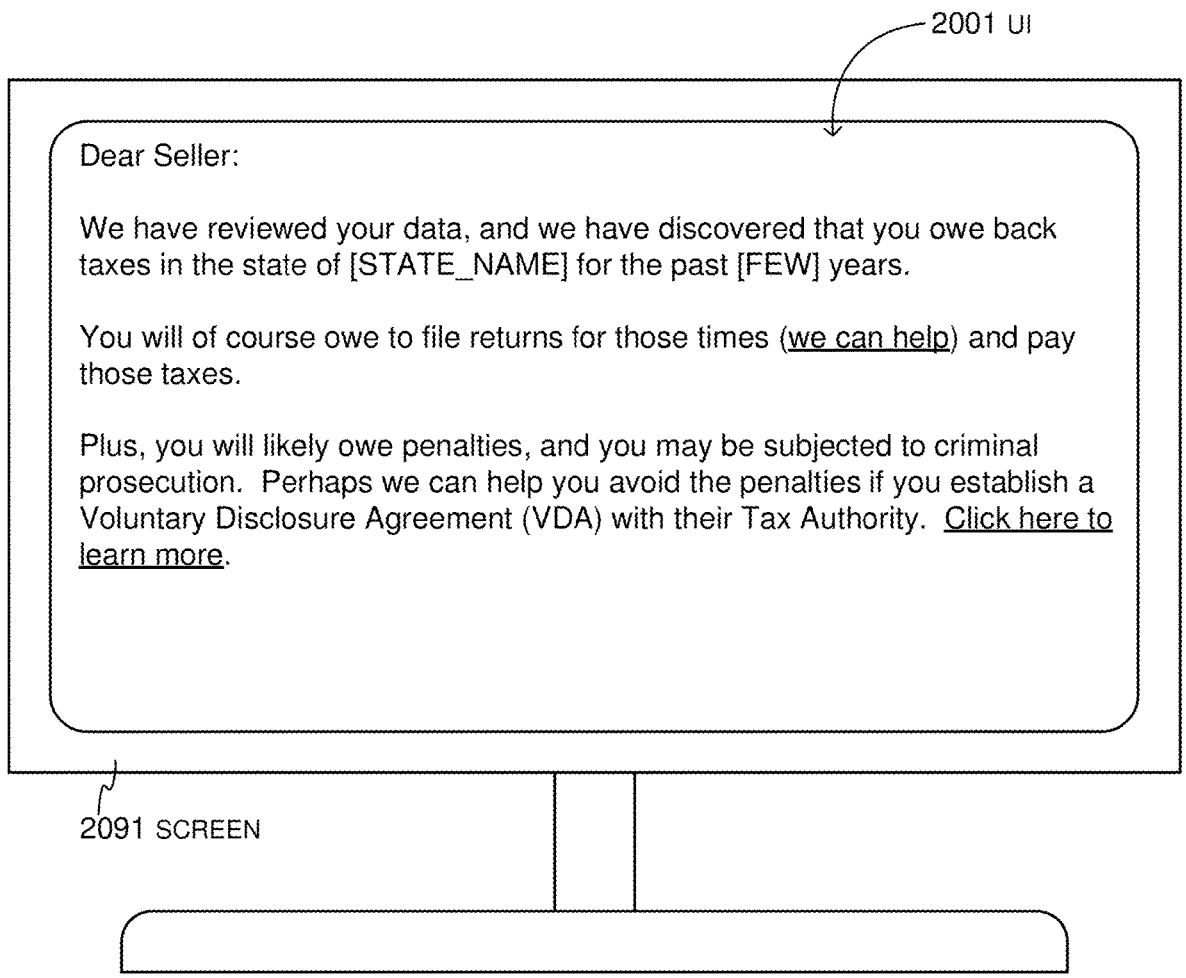
FIG. 20A is a sample view of a User Interface (UI) in which a notification is presented to a seller regarding discovered back taxes due in a tax jurisdiction and options for proceeding, according to embodiments of the present disclosure, which is an improvement in automated computerized systems.

FIG. 20A is a sample view of a User Interface (UI) 2001 in which a notification 2091 is presented to a seller 1593 regarding discovered back taxes due in a tax jurisdiction and options for proceeding, according to embodiments of the present disclosure, which is an improvement in automated computerized systems. Shown is UI 2001 presented on a screen 2091 of a device. For example, the screen 2091 may be screen 1591 of the computer system 1590 or other device of the seller 1593 or user 1592 of FIG. 15. UI 2001 may comprise a portion of a UI of the OSP 1598 presented to the seller 1593 or user 1592.

The UI of FIG. 20A is simplified. In fact, the OSP 1598 could discern more; for example, it could show something like the following, some of which could further be hyperlinks:

"Dear customer:

Thank you for uploading your data. Upon reviewing it, we just determined you owe back taxes in some states. You will of course have to a) file returns (we can help) and b) pay those taxes.

Plus, you will likely owe interest and penalties. Worryingly, you may be subjected to criminal prosecution.

In many states you can avoid the criminal prosecution if you approach them—anonymously via an intermediary—and establish a type of amnesty agreement that is called a Voluntary Disclosure Agreement (VDA) with their Tax Authority. Click here to learn more about VDAs.

Perhaps you can use our system as such an intermediary to approach them for establishing VDAs. From the data you gave us: you owe returns and taxes in the following three categories of states: GREEN, YELLOW AND RED A) GREEN: VDA PREDICTABLE FOR YOU VIA OUR SYSTEM: The following states have established guidelines for reaching a simple VDA with them and a policy of accepting proposals according to them. Per the data you gave us, you qualify:

[STATE_21] [AMT_OWED_21] Click here to start the VDA process with this state using our system.

[STATE_22] [AMT_OWED_22] Click here to start the VDA process with this state using our system.

. . .

B) YELLOW: VDA MAY BE POSSIBLE FOR YOU VIA OUR SYSTEM: The following states have not established guidelines for reaching a VDA with them, but our system enables you to approach them anonymously, and propose VDAs with them with proposals that many of them accept; it is possible that these states will accept also your proposals:

[STATE_31] [AMT_OWED_31] Click here to approach this state for a simple VDA.

[STATE_32] [AMT_OWED_32] Click here to approach this state for a simple VDA.

. . .

C) RED: YOU SHOULD NOT TRY A VDA THROUGH OUR SYSTEM: The following states have established guidelines for automatically reaching simple VDAs with them, and YOU DO NOT QUALIFY:

[STATE_41] [AMT_OWED_41] Click here to contact a professional to advise you for this state.

[STATE_42] [AMT_OWED_42] Click here to contact a professional to advise you for this state.

. . ."

As more and more states 1) respond, and as a result b) create and enter their own requirements with a policy to auto-accept them, more will move from category B to category A.

Figure 20B:
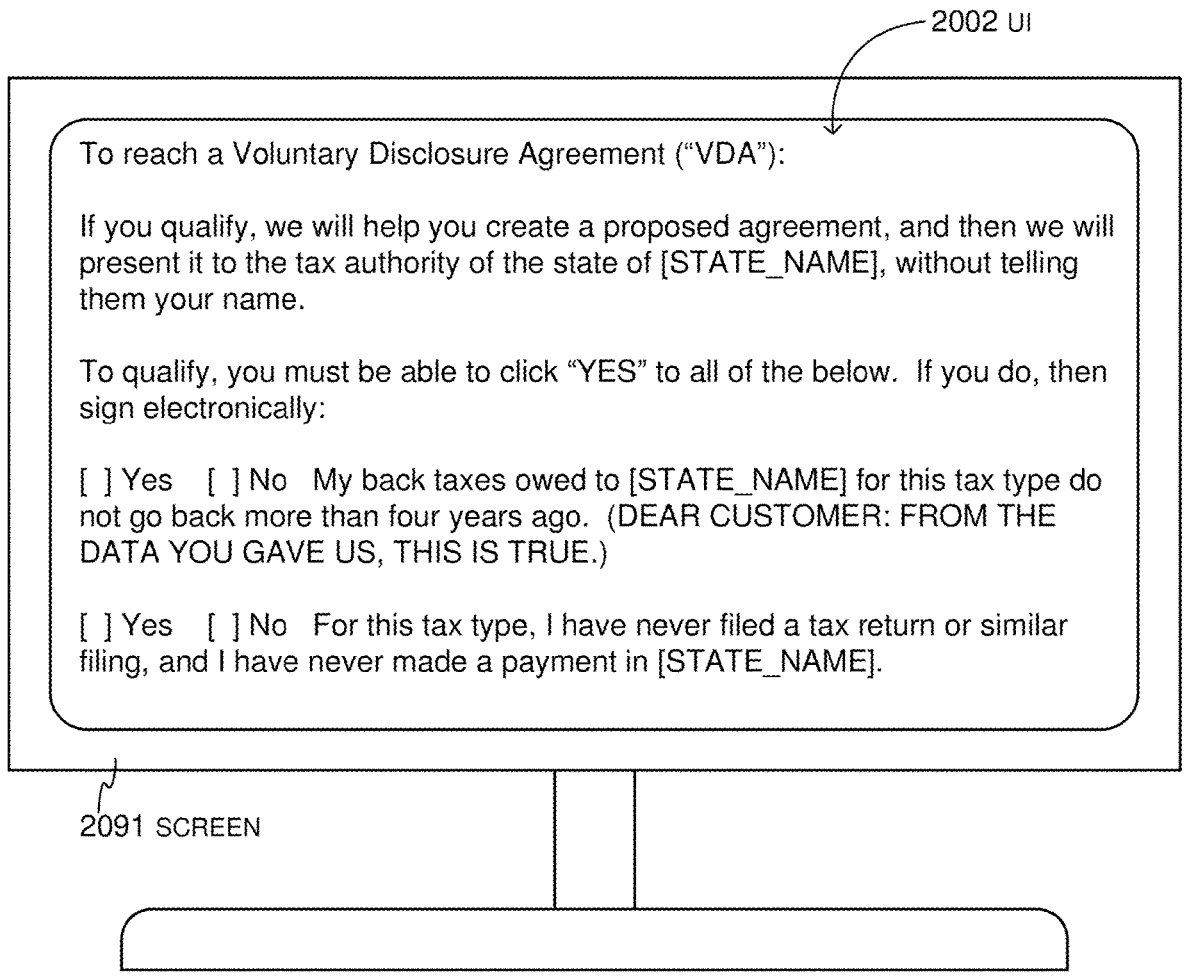
FIG. 20B is a sample view of a User Interface (UI) in which a questionnaire is presented to a seller regarding qualifications for creating a voluntary disclosure agreement (VDA), according to embodiments of the present disclosure, which is an improvement in automated computerized systems.

FIG. 20B is a sample view of a User Interface (UI) 2002 in which a questionnaire is presented to a seller regarding qualifications for creating a voluntary disclosure agreement (VDA), according to embodiments of the present disclosure, which is an improvement in automated computerized systems. Shown is UI 2002 presented on a screen 2091 of a device. UI 2002 may comprise a portion of a UI of the OSP 1598 presented to the seller 1593 or user 1592. Shown are various questions in response to which the seller 1593 must respond "YES" via the UI 2002 in order to qualify for the OSP 1598 to generate and present a proposed VDA.

FIG. 20C is a sample view of a User Interface (UI) 2003 in which a further portion of a questionnaire started in FIG. 20B and an option to view a generated VDA is presented to a seller, according to embodiments of the present disclosure, which is an improvement in automated computerized systems. Shown is UI 2003 presented on a screen 2091 of a device. UI 2003 may comprise a portion of a UI of the OSP 1598 presented to the seller 1593 or user 1592. Once answers the questions presented in UI 2002 and UI 2003, the user may select an option via the UI 2003 to view the full VDA generated by the OSP 1593.

FIG. 20D is a sample view of a User Interface (UI) 2004 in which options to sign and send the VDA of FIG. 20C is presented to a seller, according to embodiments of the present disclosure, which is an improvement in automated computerized systems. Shown is UI 2004 presented on a screen 2091 of a device. UI 2004 may comprise a portion of a UI of the OSP 1598 presented to the seller 1593 or user 1592. The information provided in UI 2004 identifying the seller 1593 may be initially blocked from view by the agency 1582 until the agency accepts the proposed VDA.

Figure 20E:
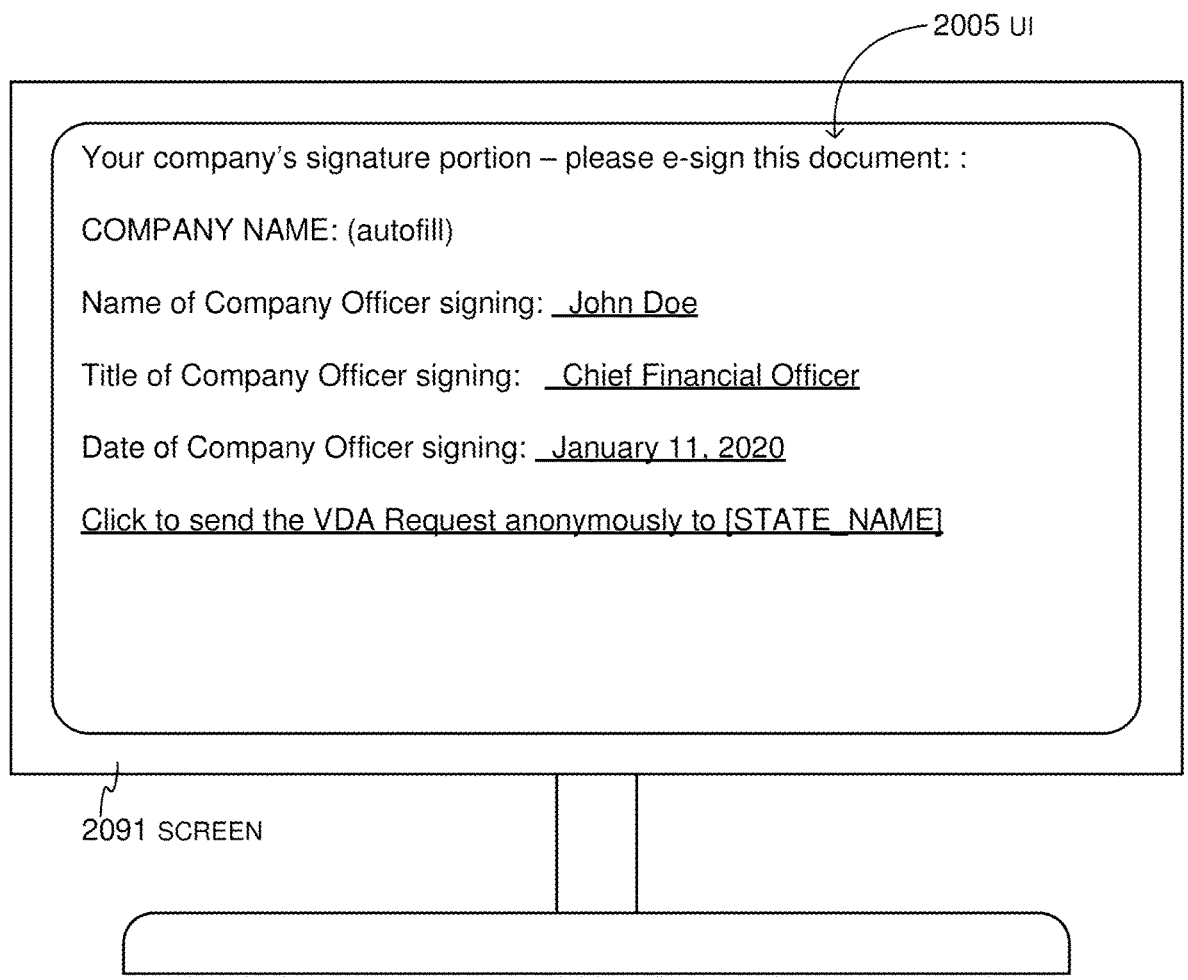
FIG. 20E is a sample view of a User Interface (UI) in which signature information fields of the UI of FIG. 20D are shown filled out and an option to send the VDA of FIG. 20C is presented to a seller, according to embodiments of the present disclosure, which is an improvement in automated computerized systems.

FIG. 20E is a sample view of a User Interface (UI) 2005 in which signature information fields of the UI 2004 of FIG. 20D are shown filled out; after they are filled out an option to send the VDA of FIG. 20C is presented to a seller, according to embodiments of the present disclosure, which is an improvement in automated computerized systems. Shown is UI 2005 presented on a screen 2091 of a device. UI 2005 may comprise a portion of a UI of the OSP 1598 presented to the seller 1593 or user 1592. After the seller 1593 has completed signature information fields shown, a selectable UI element to send the VDA proposal notification anonymously to the agency 1582 may be activated for selection by the seller 1593.

Figure 21:
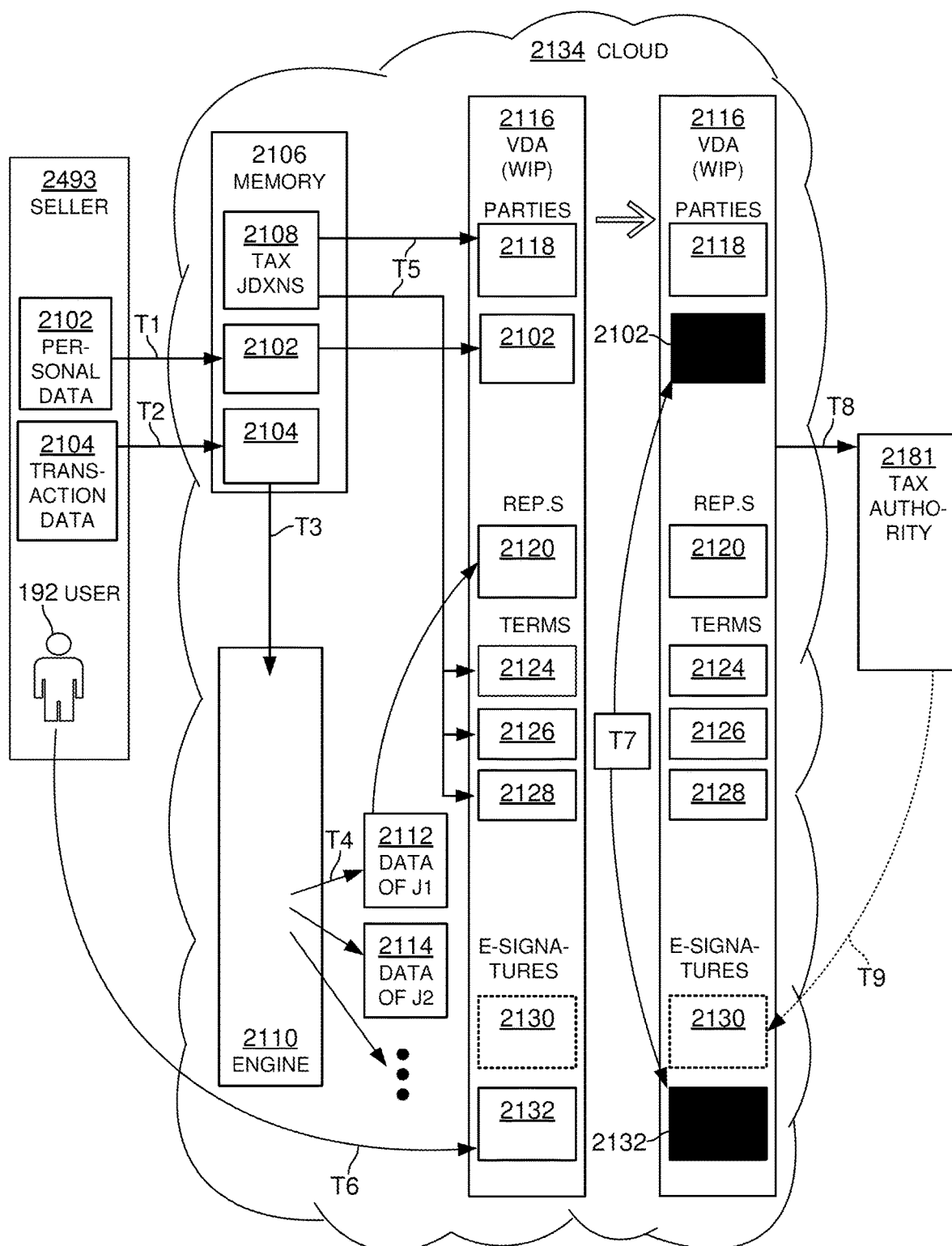
FIG. 21 is a block diagram illustrating elements of showing an example of how a VDA may be assembled according to embodiments of the present disclosure, which is an improvement in automated computerized systems.

FIG. 21 is a block diagram illustrating elements of showing an example of operations at various times for how a VDA may be assembled according to embodiments of the present disclosure, which is an improvement in automated computerized systems. Such operations may be performed in the cloud 2134 and relevant data stored in memory of the OSP 1593 in the cloud 2134.

For example, at time T1 the user 192 associated with the seller 2493 may provide personal data 2102 identifying the seller 2493 and this is assembled into the VDA work in progress (WIP) 2116.

At time T2 the user 192 may provide transaction data 2104, which is stored in memory 2106 in the cloud 2134. The transaction data 2104 may be a collection of datasets, one for each transaction. A sample such collection was datasets 1535B, 1535C, . . . in FIG. 15. Another such collection was datasets 1609 in FIG. 16.

At time T3, the engine 2110 extracts transaction data from transaction data 2104.

At time T4, the engine 2110 selects relevant transaction data for particular tax jurisdictions, such as data of tax jurisdiction J1 2112, data of tax jurisdiction J2 2114 and data of other relevant tax jurisdictions represented by the dot, dot, dot. Such selections have been seen by the filtering operations of FIGS. 6 and 17. Then the engine 2110 may determine a total liability for each jurisdiction and assemble such data into the VDA WIP 2116 to form seller representations 2120 in the VDA WIP 2116. Sometimes the representations are first checked to see if they are acceptable to the tax authority.

At time T5, the OSP 1593 extracts data identifying the applicable tax jurisdiction 2118 and the VDA terms 2124, 2126 and 2128 requested by the applicable tax jurisdiction 2118 from information stored in memory 2106 regarding tax jurisdictions 2108 and includes the data identifying the applicable tax jurisdiction 2118. These data may include the names and addresses of the jurisdictions, the name of a director in the office, and so on, The OSP may also include the VDA terms 2124, 2126 and 2128 in the VDA WIP 2116, as proposal components. At time T5, the OSP 1593 also includes the personal data 2102 identifying the seller 2493 in the VDA WIP 2116.

At time T6, the user 192 electronically signs the VDA WIP 2116, first version on behalf of the seller 2493 as requested, and the seller signature 2132 is electronically affixed to or otherwise associated with the VDA WIP 2116.

To prepare the VDA WIP 2116 for sending to the tax authority 2181, at time T7, the OSP 1598 prepares a second version of the VDA WIP 2116 where it blacks out or otherwise masks or redacts the seller signature 2132 before sending the VDA WIP 2116 to the tax authority 2181. An example of such redacting or blacking out was shown with blots 1281, 1282 in FIG. 12B.

At time T8 the tax authority 2181 is enabled to see the VDA 2116 (second version, with the blots), but cannot identify the seller 2493.

At time T9, if approved after viewing the second version of the VDA WIP 2116, the tax authority 2181 then electronically signs the VDA WIP 2116 (e.g., via an agency) and the tax authority signature 2130 is electronically affixed to or otherwise associated with the VDA WIP 2116.

Figure 22A:
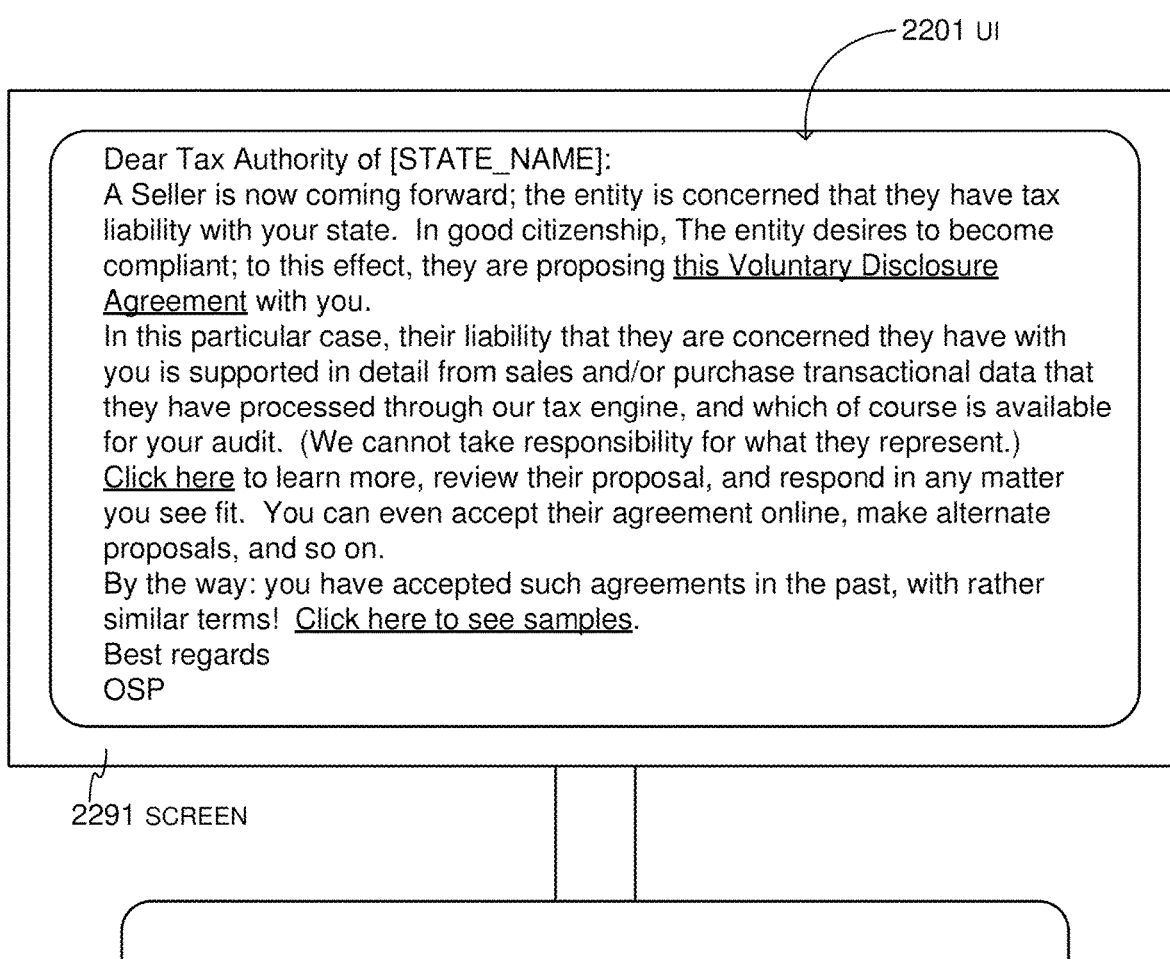
FIG. 22A is a sample view of a User Interface (UI) in which a proposal notification is presented to a tax authority, according to embodiments of the present disclosure, which is an improvement in automated computerized systems.

FIG. 22A is a sample view of a User Interface (UI) 2201 in which a VDA proposal notification 1536 is presented to a tax authority 1581, such as a state (e.g., via agency 1582), according to embodiments of the present disclosure, which is an improvement in automated computerized systems. Shown is UI 2201 presented on a screen 2291 of a device. The screen 2291 may be a screen of the computer system 1544 or other device of the agency 1582 of FIG. 15. For example, the UI 2201 may provide an option for the agency 1582 to review the proposed VDA document, and respond to the proposal. In the event that a user of the computer 1544 at the tax agency 1582 may hesitate and need confidence in the decision to accept, as presented in the last paragraph of the UI 2201, the user may be offered an option to see sample VDAs made by the tax jurisdiction B 1542 in the past, and which can be similar to the ones proposed.

Figure 22B:
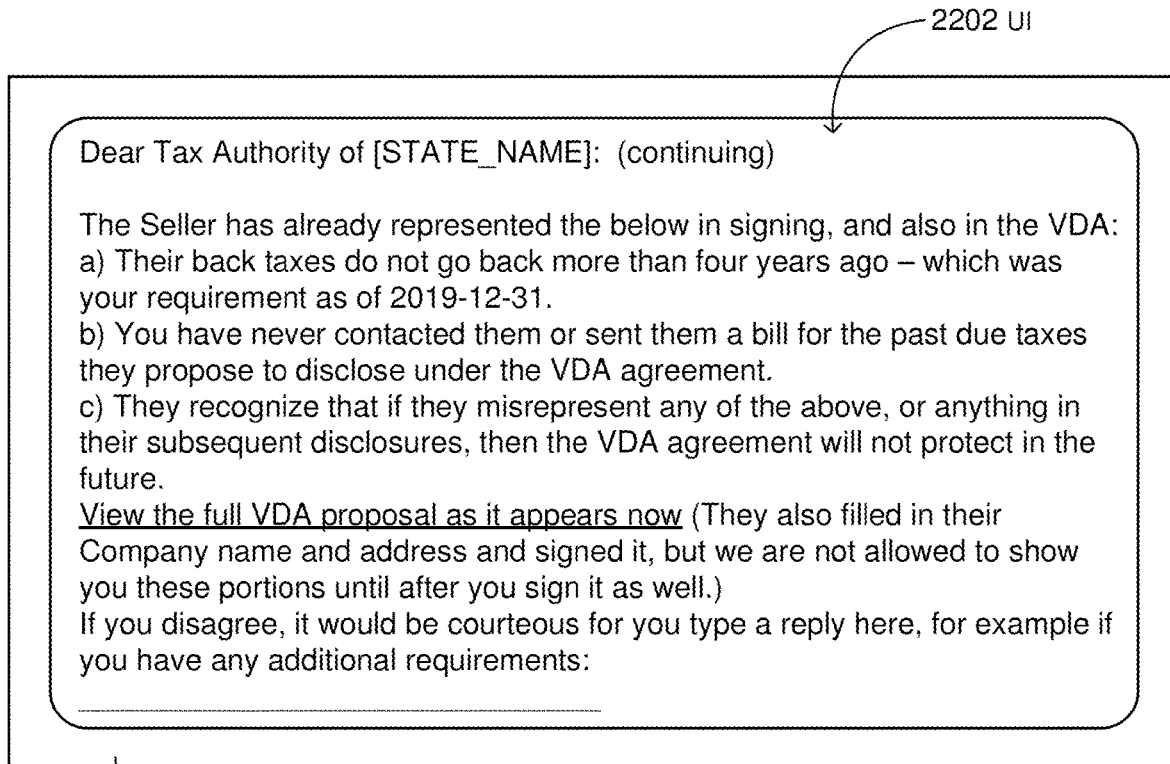
FIG. 22B is a sample view of a User Interface (UI) in which more instructions about the proposal notification of FIG. 22A are presented to a tax authority, according to embodiments of the present disclosure, which is an improvement in automated computerized systems.

FIG. 22B is a sample view of a User Interface (UI) 2202 in which more instructions about the VDA proposal notification of FIG. 22A are presented to tax authority 1581 (e.g., via agency 1582), according to embodiments of the present disclosure, which is an improvement in automated computerized systems. Shown is UI 2202 presented on a screen 2291 of a device. The screen 2291 may be a screen of the computer system 1544 or other device of the agency 1582 of FIG. 15. For example, the UI 2202 may be a continuation screen of UI 2201 and present important terms of the proposed VDA relevant to the particular tax authority 1581 and provide a selectable option for the agency 1582 to view the full proposed VDA.

Figure 22C:
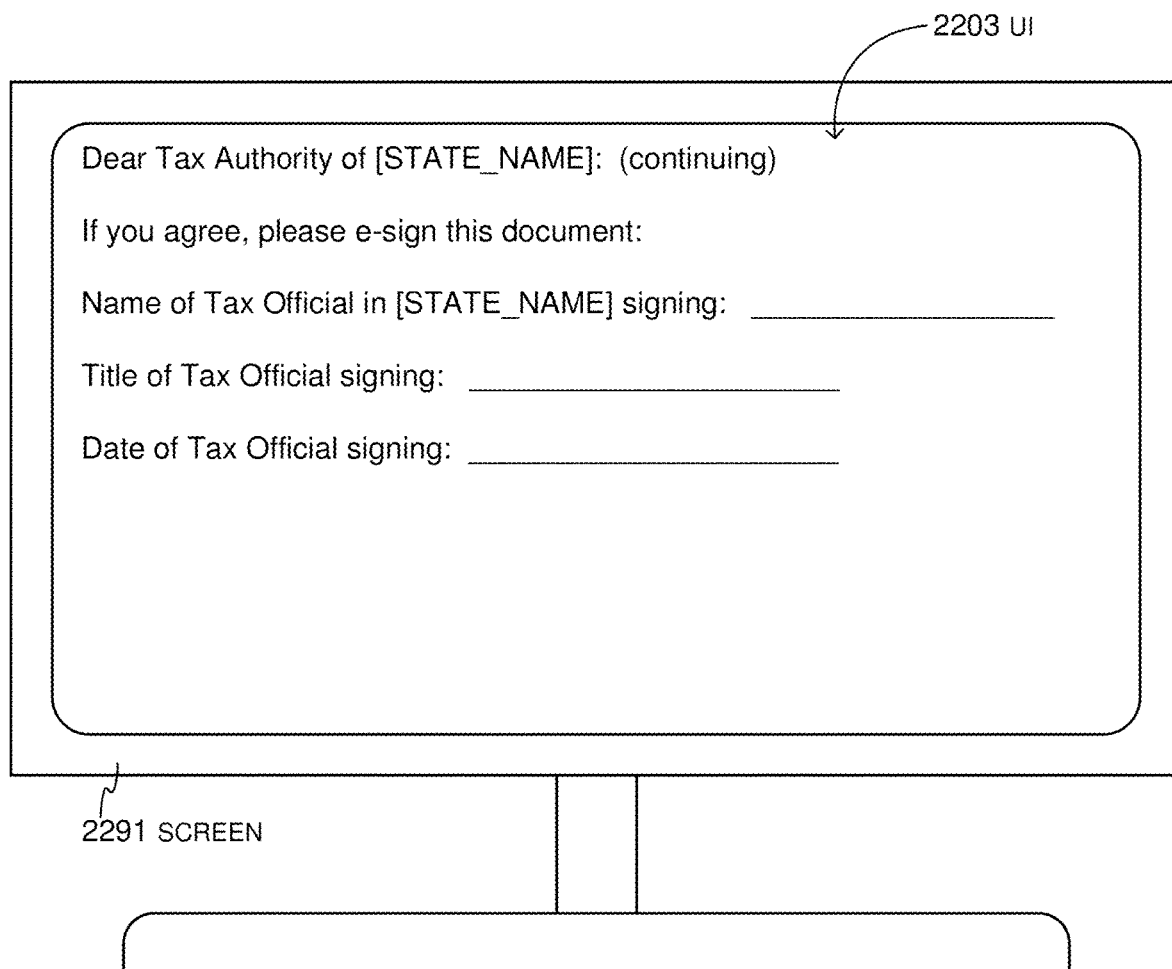
FIG. 22C is a sample view of a User Interface (UI) in which an option that permits the tax authority to e-sign, accepting the proposal of FIG. 22A is presented to the tax authority, according to embodiments of the present disclosure, which is an improvement in automated computerized systems.

FIG. 22C is a sample view of a User Interface (UI) 2203 in which an option that permits the tax authority to e-sign, accepting the VDA proposal of FIG. 22A is presented to the tax authority 1581, according to embodiments of the present disclosure, which is an improvement in automated computerized systems. Shown is UI 2203 presented on a screen 2291 of a device. The screen 2291 may be a screen of the computer system 1544 or other device of the agency 1582 of FIG. 15. For example, the UI 2203 may provide signature fields including name, title and date associated with the electronic signature of the tax authority 1581 that may be initiated via the UI 2203 and completed via an electronic signature process provided by the OSP 1598.

Figure 22D:
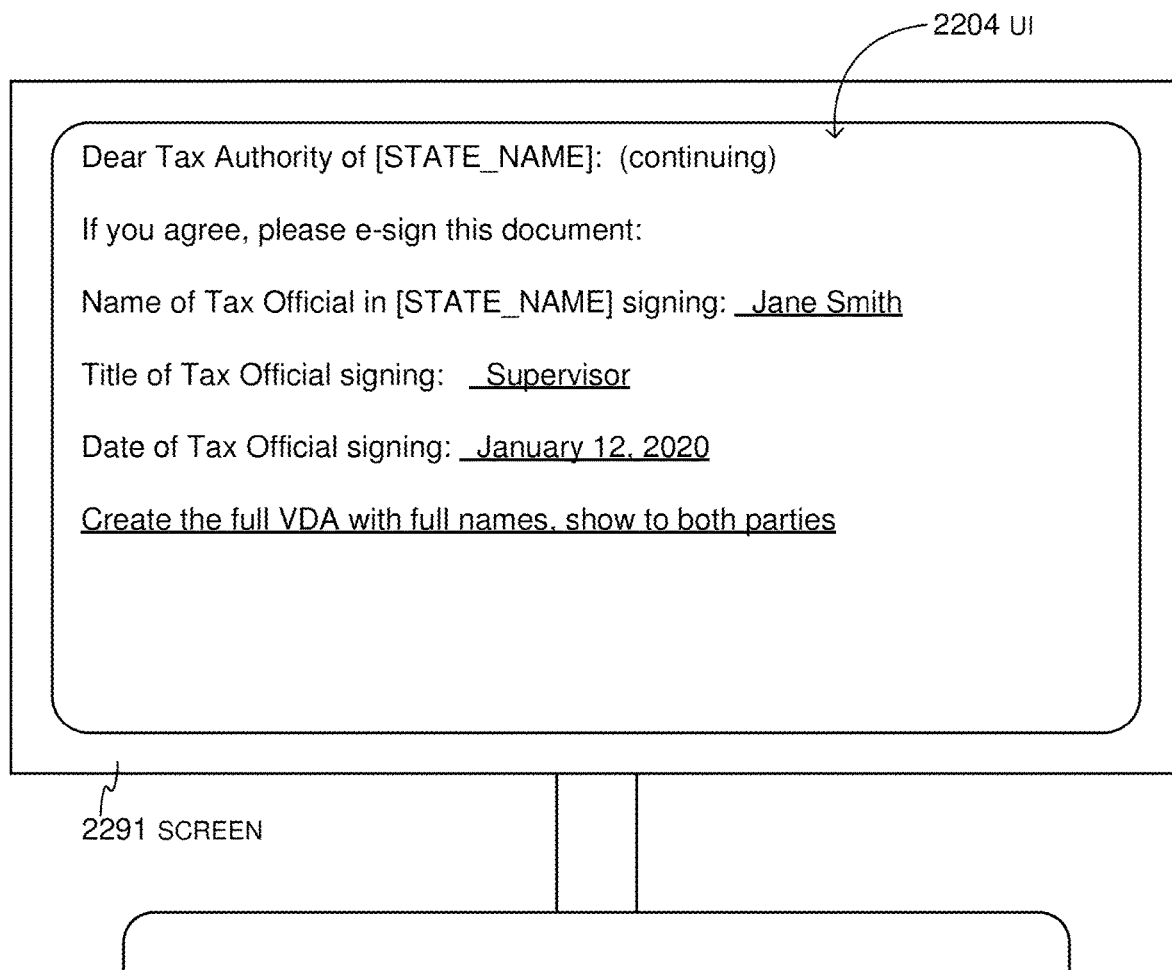
FIG. 22D is a sample view of a User Interface (UI) presenting a sample of what happens when the tax authority has e-signed, the proposal of FIG. 22A, according to embodiments of the present disclosure, which is an improvement in automated computerized systems.

FIG. 22D is a sample view of a User Interface (UI) 2204 presenting a sample of what happens when the tax authority has e-signed, the VDA proposal of FIG. 22A, according to embodiments of the present disclosure, which is an improvement in automated computerized systems. Shown is UI 2204 presented on a screen 2291 of a device. The screen 2291 may be a screen of the computer system 1544 or other device of the agency 1582 of FIG. 15. For example, the UI shows the signature fields name, title and date completed with information resulting from the electronic signature of the proposed VDA agreement and also a selectable option to create the full VDA with full names (and the seller name revealed on the VDA) to show to both parties.

Figure 23:
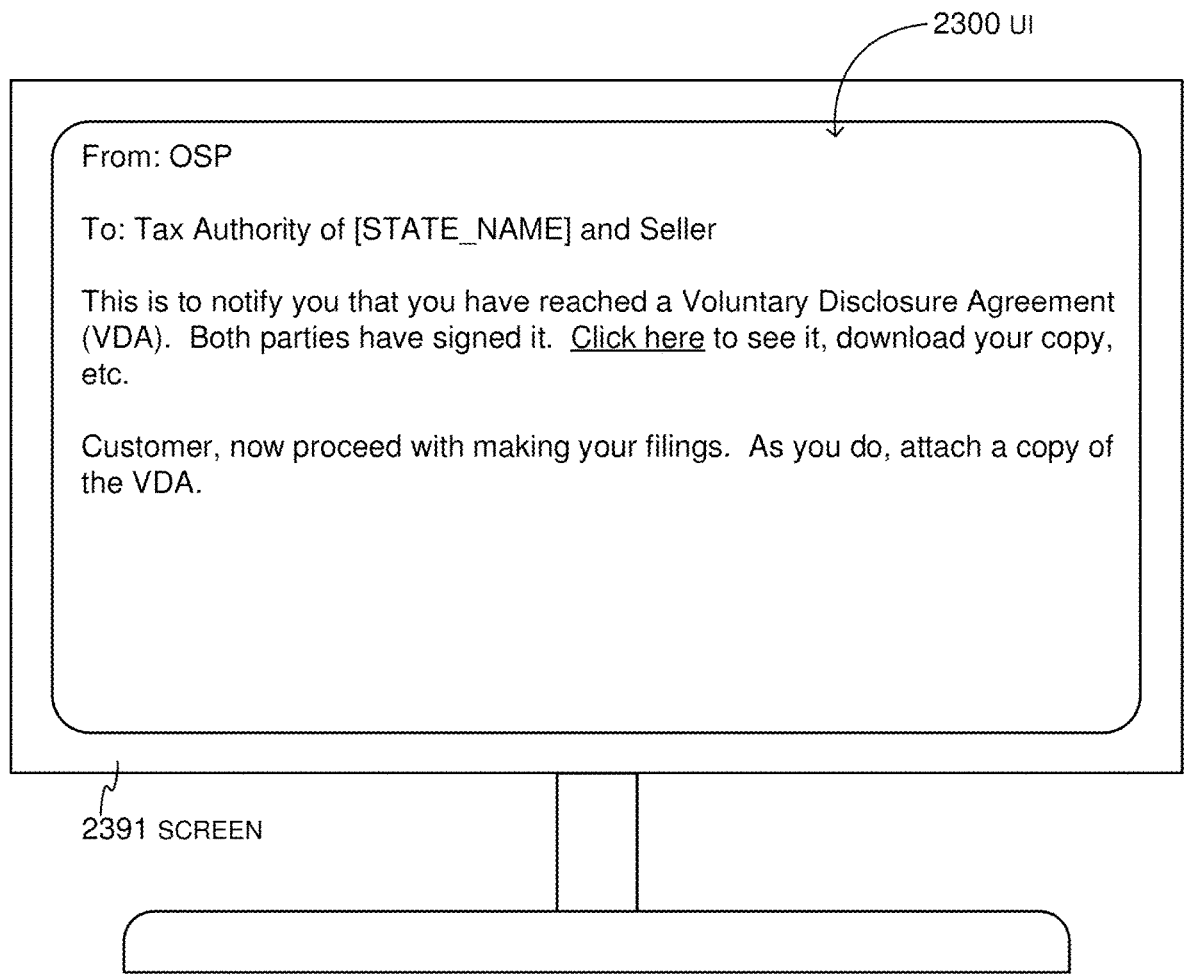
FIG. 23 is a sample view of a User Interface (UI) showing a sample follow-up notification, notifying directly both the seller and the tax authority that a VDA has been reached between the seller and the tax authority, according to embodiments of the present disclosure, which is an improvement in automated computerized systems.

FIG. 23 is a sample view of a User Interface (UI) 2300 showing a sample follow-up notification, notifying directly both the seller 1593 and the tax authority 1581 (e.g., via agency 1582), that a VDA has been reached between the seller 1593 and the tax authority 1581, according to embodiments of the present disclosure, which is an improvement in automated computerized systems. For example, the screen 2391 may be screen 1591 of the computer system 1590 or other device of the seller 1593 or user 1592 of FIG. 15. Also, the screen 2391 may be screen of the computer system 1544 or other device of the agency 1582 of FIG. 15. UI 2300 is presented to the seller 1593 and agency 1582 indicating the VDA proposal has been signed by both the seller 1593 and agency 1582, and thus presents to both parties the option to view and/or download the signed VDA.

FIGS. 24A-24D show a sample VDA that could be reached between a seller and a tax authority, according to embodiments of the present disclosure, which is an improvement in automated computerized systems. For example, the UIs 2400A, 2400B, 2400C and 2400D shown in FIGS. 24-24D, respectively, show portions of the sample VDA and may represent a VDA that is viewed or downloaded responsive to the user selecting the option provided in UI 2300 of FIG. 23 to view and/or download the signed VDA.

The embodiments described above may also use synchronous or asynchronous primary entity-server computing techniques, including software as a service (SaaS) techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, primary entity-server, or peer-to-peer, running on one or more computer systems each having one or more CPUs. Some embodiments may execute concurrently and asynchronously, and further communicate using message passing techniques. Equivalent synchronous embodiments are also supported. Also, other functions could be implemented and/or performed by each component/module, and in different orders, and by different components/modules, yet still achieve the functions of the systems and methods described herein.

In addition, programming interfaces to the data stored by the systems described herein and to other system components described herein may be available by mechanisms such as through C, C++, C#, and Java APIs; libraries for accessing files, databases, or other data repositories; through scripting languages such as JavaScript and VBScript; or through Web servers, FTP servers, or other types of servers providing access to stored data. The databases described herein and other system components may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality may be provided by each component/module, or existing functionality could be distributed amongst the components/modules in different ways, yet still achieve the functions described herein.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A computer system including at least:
one or more processors; and
a non-transitory computer-readable storage medium having stored thereon instructions which, when executed by the one or more processors, result in operations including at least:
receiving relationship instance data of a primary entity relating to previous relationship instances of the primary entity with secondary entities;
identifying a domain of at least one of the secondary entities from the received data;
assembling, by automatically, at least some of previously stored proposal components, in which:
the assembled proposal components are part of a proposed set, and at least one of the proposal components of the proposed set is thus assembled by looking up previously stored proposal components for the domain;
acting to enable specific ones of the assembled proposal components to be viewable by a third party, the specific proposal components not including an identity of the primary entity;
causing a proposal notification to be transmitted to a computer of an agency of the domain, the proposal notification indicating how the enabled specific proposal components may be viewed by a user of a computer of the agency, the proposal notification further requesting an affirmation input from a computer of the agency, in which at least one of the assembling, the acting to enable and the causing the proposal notification to be transmitted is performed responsive to determining that an alignment condition is not met;
receiving an affirmation input from a computer of the agency in response to the transmitted proposal notification; and
effectuating one or more follow-up notifications.

2. The system of claim 1, in which:
the relationship instance data includes datasets for the domain, and
the alignment condition is not met if the datasets are more than a threshold number.

3. The system of claim 1, in which:
the relationship instance data includes datasets for the domain,
the datasets include respective base values, and
the alignment condition is not met if a sum of the respective base values exceeds a threshold number.

4. The system of claim 1, in which:
the relationship instance data includes at least one date of at least one of the relationship instances,
a due date is determinable by the included date, and
the alignment condition is not met if a report has not been filed with an agency of the domain on behalf of the primary entity by the due date about an aspect of the relationship instances.

5. The system of claim 4, in which:
the relationship instance data includes datasets for the domain, and
the alignment condition is not met if the datasets are more than a threshold number.

6. The system of claim 4, in which:
the relationship instance data includes datasets for the domain, and
the alignment condition is not met if the datasets are more than a threshold number.

7. The system of claim 1, in which the operations further include:
causing a permission query to be presented in a User Interface (UI) of a computer of the primary entity that is viewable by a user of the primary entity; and
receiving a permission input from the computer of the primary entity in response to the permission query, and
in which at least one of the assembling, acting to enable and causing the proposal notification to be transmitted is performed responsive to receiving the permission input.

8. The system of claim 1, in which the operations further include:
accessing a previously stored correction digital rule for the domain;
determining, by applying the correction digital rule to the relationship instance data, whether or not a correction eligibility condition of the domain is met, and
in which the assembling is performed responsive to the correction eligibility condition being met.

9. The system of claim 8, in which the operations further include:
storing an updated correction digital rule; and
determining again, by applying the updated correction digital rule to the relationship instance data responsive to the storing, whether or not the correction eligibility condition is met, and
in which the assembling is performed responsive to the correction eligibility condition being met.

10. The system of claim 8, in which:
the relationship instance data includes at least one date associated with at least one of the relationship instances,
a due date is determined from an alignment digital rule and the included date,
a grace period of the domain is determined from the previously stored correction digital rule, and
the correction eligibility condition is met if the grace period has not elapsed since the due date.

11. The system of claim 8, in which:
the relationship instance data includes datasets for the domain,
the datasets include respective base values, and
the correction eligibility condition is met if a sum of the respective base values is less than a threshold number.

12. The system of claim 1, in which:
the assembled proposal components are part of a proposed set, and
the proposed set being for a proposal regarding the primary entity meeting the alignment condition at least in part.

13. The system of claim 1, in which the operations further include:
accessing a previously stored correction digital rule for the domain, and
in which a certain proposal component is thus assembled by applying the previously stored correction digital rule.

14. The system of claim 1, in which the operations further include:
updating the previously stored proposal components;
assembling again, by automatically and in response to the updating, another proposed set of at least some of the previously stored proposal components; and
causing a permission query to be presented in a User Interface (UI) of a computer of a user of the primary entity along with proposal components of the other proposed set.

15. The system of claim 1, in which the operations further include:
receiving primary entity data of the primary entity, the primary data including the identity of the primary entity; and
storing the primary entity data, and
in which the assembled proposal components are part of a proposed set and the proposed set includes the identity of the primary entity.

16. The system of claim 1, in which the operations further include:
deriving a relevant number from the relationship instance data or a domain resource, and
in which the assembled proposal components are part of a proposed set and the proposed set includes the relevant number.

17. The system of claim 1, in which the operations further include:
causing at least one of the assembled proposal components to be presented in a User Interface (UI) of a computer of a user of the primary entity.

18. The system of claim 17, in which the operations further include:
receiving an electronic signature from the user of the primary entity as one more of the assembled proposal components, and
in which the specific ones of the assembled proposal components that are enabled to be viewable by a third party do not include the received an electronic signature from the user of the primary entity.

19. The system of claim 1, in which:
the assembled proposal components are assembled in a proposal document.

20. The system of claim 19, in which the operations further include:
receiving an electronic signature to the proposal document from the user.

21. The system of claim 1, in which:
the acting to enable includes preparing a proposal webpage with the specific proposal components, and
the proposal notification provides a link to the proposal webpage.

22. The system of claim 1, in which:
the acting to enable includes preparing a proposal webpage with the specific proposal components and an indication of a non-shown portion of an identity of the primary entity, and
the proposal notification provides a link to the proposal webpage.

23. The system of claim 1, in which:
the acting to enable includes preparing a proposal document with the specific proposal components, and
the proposal notification provides a link that leads to opening the proposal document.

24. The system of claim 1, in which:
the acting to enable includes preparing a proposal document with the specific proposal components and an indication of a non-shown portion of an identity of the primary entity, and
the proposal notification provides a link that leads to opening the proposal document.

25. The system of claim 1, in which:
the acting to enable includes preparing a proposal document with the specific proposal components, and
the proposal notification includes an email has the proposal document as an attachment.

26. The system of claim 1, in which:
the specific proposal components further include a promise that the identity of the primary entity will be revealed responsive to the affirmation input being received.

27. The system of claim 1, in which:
the proposal notification includes a promise that the identity of the primary entity will be revealed responsive to the affirmation input being received.

28. The system of claim 1, in which the operations further include:
verifying the received affirmation input against a validity criterion, and
in which the effectuating is performed automatically responsive to the verifying.

29. The system of claim 1, in which:
the proposal notification enables a representative of the domain to provide an electronic signature, and the affirmation input includes the provided electronic signature.

30. The system of claim 1, in which:
the acting to enable includes preparing a proposal document that includes the specific proposal components,
the proposal notification enables a representative of the domain to affix an electronic signature to the proposal document, and
the affirmation input includes the proposal document with the affixed electronic signature by the representative.

31. The system of claim 1, in which
the affirmation input includes an electronic signature by a representative of the domain; and
in which the operations further include:
consulting a registry of approved domain representatives; and
verifying that the electronic signature is from one of the approved domain representatives, and
in which the effectuating is performed automatically responsive to the verifying.

32. The system of claim 1, in which:
at least one of the one or more follow-up notifications about the received affirmation input is sent to a computer of the primary entity.

33. The system of claim 1, in which:
at least one of the one or more follow-up notifications about the identity of the primary entity is sent to a computer of the agency.

34. The system of claim 1, in which:
at least one of the one or more follow-up notifications is sent concurrently to both a computer of the primary entity and to a computer of the agency.

35. The system of claim 1, in which the operations further include:
preparing a final document that lists the assembled proposal components, the identity of the primary entity, an electronic signature by a user of a computer of the primary entity, an identity of the domain and an electronic signature by a representative of the domain; and
making the final document available to a user of a computer of the primary entity and to a user of a computer of the agency.

36. The system of claim 1, in which the operations further include:
receiving, in response to the transmitted proposal notification, a negation input instead of an affirmation input; and
transmitting, in response to the received negation input, a negation notification to a computer of the primary entity.

37. The system of claim 36, in which:
along with the negation input, a counterproposal indication is included, and
the counterproposal indication is transmitted together with the negation notification.

* * * * *